(12) United States Patent
Yahata et al.

(10) Patent No.: US 10,770,115 B2
(45) Date of Patent: *Sep. 8, 2020

(54) RECORDING MEDIUM, PLAYBACK METHOD, AND PLAYBACK DEVICE

(71) Applicant: PANASONIC INTELLECTUAL PROPERTY CORPORATION OF AMERICA, Torrance, CA (US)

(72) Inventors: Hiroshi Yahata, Osaka (JP); Kazuhiro Mochinaga, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,132

(22) Filed: Dec. 13, 2019

(65) Prior Publication Data

US 2020/0118596 A1 Apr. 16, 2020

Related U.S. Application Data

(63) Continuation of application No. 16/255,933, filed on Jan. 24, 2019, now Pat. No. 10,553,253, which is a (Continued)

(30) Foreign Application Priority Data

Sep. 4, 2015 (JP) ................. 2015-175197

(51) Int. Cl.
*G11B 27/32* (2006.01)
*G11B 27/10* (2006.01)
(Continued)

(52) U.S. Cl.
CPC ............ *G11B 27/102* (2013.01); *G11B 20/10* (2013.01); *G11B 27/105* (2013.01); *G11B 27/32* (2013.01);
(Continued)

(58) Field of Classification Search
None
See application file for complete search history.

(56) References Cited

U.S. PATENT DOCUMENTS 6,088,506 A 7/2000 Yoshio et al.
10,236,030 B2 * 3/2019 Yahata ................. H04N 9/8045
(Continued)

FOREIGN PATENT DOCUMENTS

CN 103597812 A 2/2014
EP 3208802 A1 8/2017
(Continued)

OTHER PUBLICATIONS

International Search Report, dated Jan. 19, 2016, in International Application No. PCT/JP2015/005327.
(Continued)

*Primary Examiner* — Eileen M Adams
(74) *Attorney, Agent, or Firm* — Greenblum & Bernstein, P.L.C.

(57) ABSTRACT

A playback method of reading out and playing streams from a recording medium is provided. A stream file. including a first luminance video and a second luminance video, a playlist file, first and second combination information, elementary streams that can be played together with the first luminance video, and elementary streams that can be played together with the second luminance video are recorded in the recording medium. The playback method includes, when playing the first luminance video, reading out any one of the elementary streams listed in the first combination information of the playlist file, and playing at the same time with the first luminance video, and when playing the second luminance video, reading out any one of the elementary streams
(Continued)

listed in the second combination information of the playlist file, and playing at the same time with the second luminance video.

2 Claims, 51 Drawing Sheets

Related U.S. Application Data continuation of application No. 16/127,507, filed on Sep. 11, 2018, now Pat. No. 10,236,030, which is a continuation of application No. 15/589,021, filed on May 8, 2017, now Pat. No. 10,102,879, which is a continuation of application No. PCT/JP2015/005327, filed on Oct. 23, 2015.

(60) Provisional application No. 62/080,634, filed on Nov. 17, 2014.

(51) Int. Cl.
| | | |
|---|---|---|
| *G11B 20/10* | (2006.01) | |
| *H04N 5/85* | (2006.01) | |
| *H04N 9/804* | (2006.01) | |
| *H04N 9/82* | (2006.01) | |
| *H04N 9/87* | (2006.01) | |

(52) U.S. Cl.
CPC .............. *G11B 27/329* (2013.01); *H04N 5/85* (2013.01); *H04N 9/8045* (2013.01); *H04N 9/8211* (2013.01); *H04N 9/8233* (2013.01); *H04N 9/8715* (2013.01)

(56) References Cited

U.S. PATENT DOCUMENTS

| | | | | |
|---|---|---|---|---|
| 2010/0322592 | A1* | 12/2010 | Casagrande | ........... H04N 5/147 386/241 |
| 2011/0150421 | A1* | 6/2011 | Sasaki | ................ G11B 27/3027 386/241 |
| 2013/0148029 | A1* | 6/2013 | Gish | ........................ G09G 5/02 348/708 |
| 2014/0125696 | A1 | 5/2014 | Newton et al. | |
| 2014/0282722 | A1* | 9/2014 | Kummer | ................ G11B 27/28 725/35 |
| 2017/0264940 | A1 | 9/2017 | Schwesinger et al. | |

FOREIGN PATENT DOCUMENTS

| | | |
|---|---|---|
| JP | 9-282848 | 10/1997 |
| JP | 2014-528182 A | 10/2014 |
| WO | 2010/146847 A1 | 12/2010 |

OTHER PUBLICATIONS

Extended European Search Report, dated Feb. 8, 2018, from the European Patent Office (EPO) for the related European Patent Application No. 15860717.6.

Chinese Search Report, dated Mar. 12, 2019, for the related Chinese Patent Application No. 201580030305.X (English Language Translation).

* cited by examiner

FIG. 24

| | | | |
|---|---|---|---|
| 0 | Language Code | 11 | Player audio mixing mode for Karaoke |
| 1 | Audio stream number | 12 | Country code for parental management |
| 2 | Subtitle stream number | 13 | Parental level |
| 3 | Angle number | 14 | Player configuration for Video |
| 4 | Title number | 15 | Player configuration for Audio |
| 5 | Chapter number | 16 | Language code for AST |
| 6 | Program number | 17 | Language code ext. for AST |
| 7 | Cell number | 18 | Language code for STST |
| 8 | Key name | 19 | Language code ext. for STST |
| 9 | Navigation timer | 20 | Player region code |
| 10 | Current playback time | 21 | reserved |
| | | 22 | reserved |
| | | 23 | Player status |
| | | 24 | reserved |
| | | 25 | reserved |
| | | 26 | reserved |
| | | 27 | reserved |
| | | 28 | reserved |
| | | 29 | reserved |
| | | 30 | reserved |
| | | 31 | reserved |
| | | 32 | reserved |

NAL units of the first access unit in a GOP

NAL units of the non-first access unit in a GOP

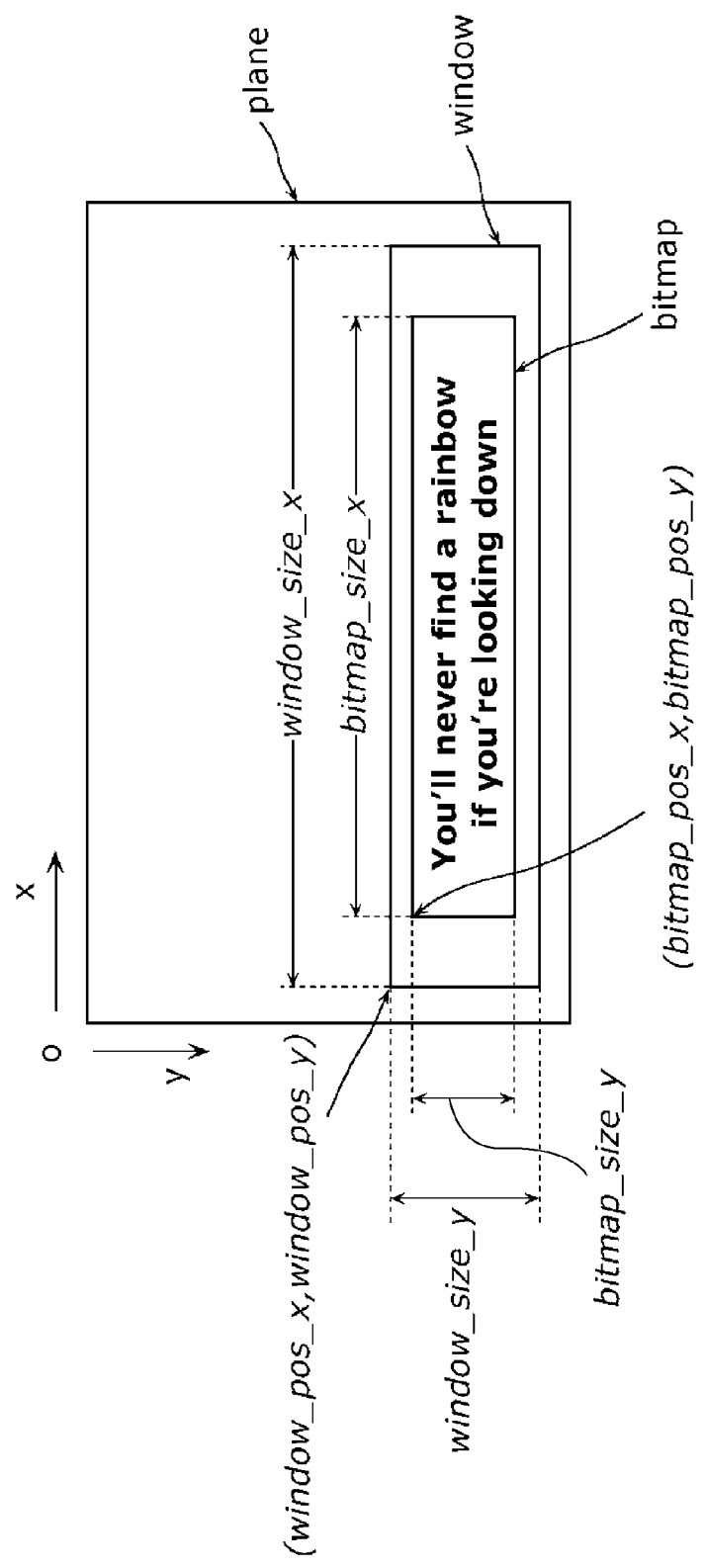

FIG. 41A

```
BD.INFO(){
  DiscInfo()
  Extension(){
    Disc_Type(){
      disc_type
    }
    HDR_meta()
  }
}
```

FIG. 41B

```
XXX.PL(){
  CellList(){
    Cell#0()
    ..
  }
  SubPLList(){
    SubPL#0()
    ..
  }
  EventList()
  Extension(){
    HDR_meta()
    CombiExt()
  }
}
```

FIG. 41C

```
YYY.VOBI(){
  VOB_type
  Attribute(){
    SysRate
    V_Number
      Video#0()
    ..
    A_Number
      Audio#0()
    ..
    Subtitle_Number
      Subtitle#0()
    ..
  }
  TMAP()
  Extension(){
    HDR_meta()
    TMAPExt()
  }
}
```

FIG. 42A

```
Cell#n(){
  VOBName
  CC
  In
  Out
  ..
  Combi()
}
```

FIG. 42B

```
Combi(){
  Video#0(){
    VideoPID
    VideoFormat
    ..
  } ..
  EnhVideo#0(){
    EnhVideoPID
    EnhVideoBitDepth
    EnhVideoMaxLum
    ..
  } ..
  Audio#0(){
    AudioPID
    Coding
    Ch.
  } ..
  Subtitle#0(){
    SubtitlePID
    Language
  } ..
}
```

FIG. 42C

```
SubPL#n(){
  SubPL_type
  SubCellList(){
    SubCell#0(){
      VOBName
      In
      Out
      CellNum
    }
    ..
  }
}
```

RECORDING MEDIUM, PLAYBACK METHOD, AND PLAYBACK DEVICE

CROSS-REFERENCE TO RELATED APPLICATIONS

This application is a continuation of pending U.S. application Ser. No. 16/255,933, filed Jan. 24, 2019, which is a continuation of U.S. application Ser. No. 16/127,507, filed Sep. 11, 2018 now U.S. Pat. No. 10,236,030 issued Mar. 19, 2019, which is a continuation of U.S. application Ser. No. 15/589,021, filed May 8, 2017 now U.S. Pat. No. 10,102,879 issued Oct. 16, 2018, which is a continuation of PCT application PCT/JP2015/005327, filed on Oct. 23, 2015, which claims benefit of U.S. Provisional Application No. 62/080,634, filed Nov. 17, 2014, and claims priority of Japanese Patent Application No. 2015-175197, filed Sep. 4, 2015. The disclosure of these documents, including the specifications, drawings, and claims are incorporated herein by reference in their entirety.

BACKGROUND

1. Technical Field

The present disclosure relates to a recording medium in which is recorded an encoded video stream, a playback method of the video stream, and a playback device.

2. Description of the Related Art

Technology relating to digital versatile discs (DVD) has conventionally been disclosed (e.g., Japanese Unexamined Patent Application Publication No. 9-282848).

SUMMARY

In one general aspect, the techniques disclosed here feature a recording medium in which is recorded a stream file including first luminance video expressed by luminance of a first dynamic range, and second luminance video expressed by luminance of a second dynamic range that is broader than the first dynamic range, and a playlist file for controlling playback of the stream file. First and second combination information, representing combinations of elementary streams that each can be played at the same time in a same playback section, is described in the playlist file. Elementary streams that can be played at the same time as the first luminance video in this playback section are listed in the first combination information. Elementary streams that can be played at the same time as the second luminance video in this playback section are listed in the second combination information. The number of elementary streams of a predetermined type listed in the first combination information and the number of elementary streams of a predetermined type listed in the second combination information each in the same playback section are equal. According to the above form, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 24 is a diagram illustrating a list of system parameters (SPRM);

FIG. 29A illustrates the flow of processing relating to a time event in a BD-ROM player, and FIG. 29B illustrates the flow of processing relating to a user event in a BD-ROM player;

FIG. 40 is a diagram illustrating the relationship between parameters used in subtitle display control;

FIGS. 41A through 41C are diagrams for describing management information and the content thereof;

FIGS. 42A through 42C are diagrams illustrating the data structure of a database file;

DETAILED DESCRIPTION

Underlying Knowledge Forming Basis of the Present Disclosure

However, further improvement was needed with the aforementioned Japanese Unexamined Patent Application Publication No. 9-282848. The present Inventors found that a problem occurs relating to the technology mentioned in the "Related Art". This problem will be described below in detail.

Most representative of information recording media recording video data is the DVD (hereinafter, may also be referred to as "Standard Definition" (SD-DVD)). A conventional DVD will be described below.

Figure 1:
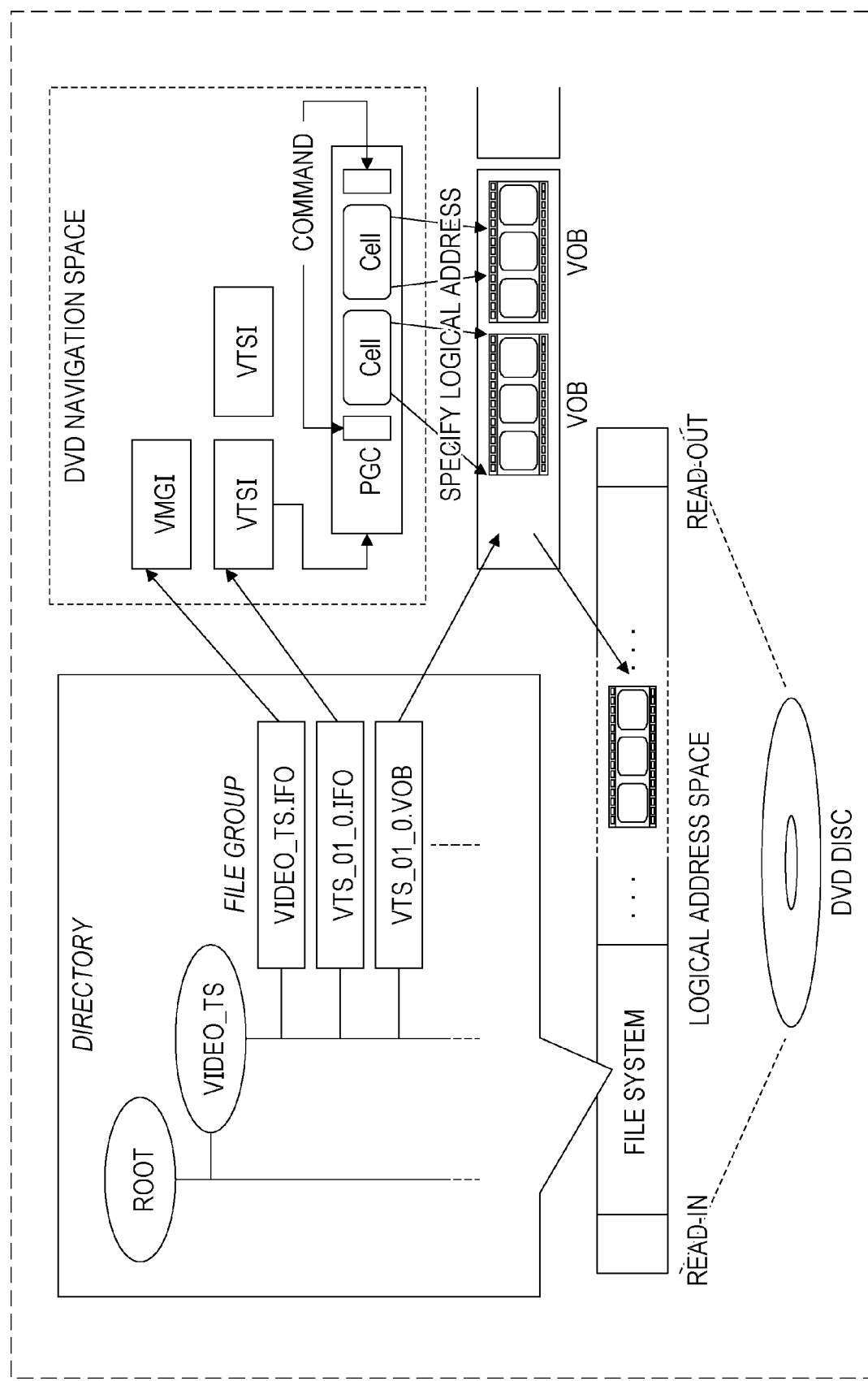
FIG. 1 is a diagram illustrating an SD-DVD structure.

FIG. 1 is a diagram illustrating the structure of an SD-DVD. As illustrated to the lower side of FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files. There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

VIDEO_TS.IFO Disc play control information file

VTS_01_0.IFO Video title set #1 play control information file

VTS_01_0.VOB Video title set #1 stream file

As shown in the above example, two suffixes are stipulated. "IFO" is a suffix indicating that the file has play control information recorded therein, and "VOB" is a suffix indicating that the file has an MPEG stream, which is audiovisual (AV) data, recorded therein.

Play control information is information attached to the AV data, such as information to realize interactivity employed with the DVD (technology to dynamically change playing in response to user operations), metadata, and so forth. Play control information is commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD. Now, "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programming information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to JavaScript (a registered trademark) and so forth executed in browsers to display Web pages, for example. However, while JavaScript (registered trademark) performs window or browser control (e.g., opening a new browser window, etc.) besides logical operations, DVD command differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
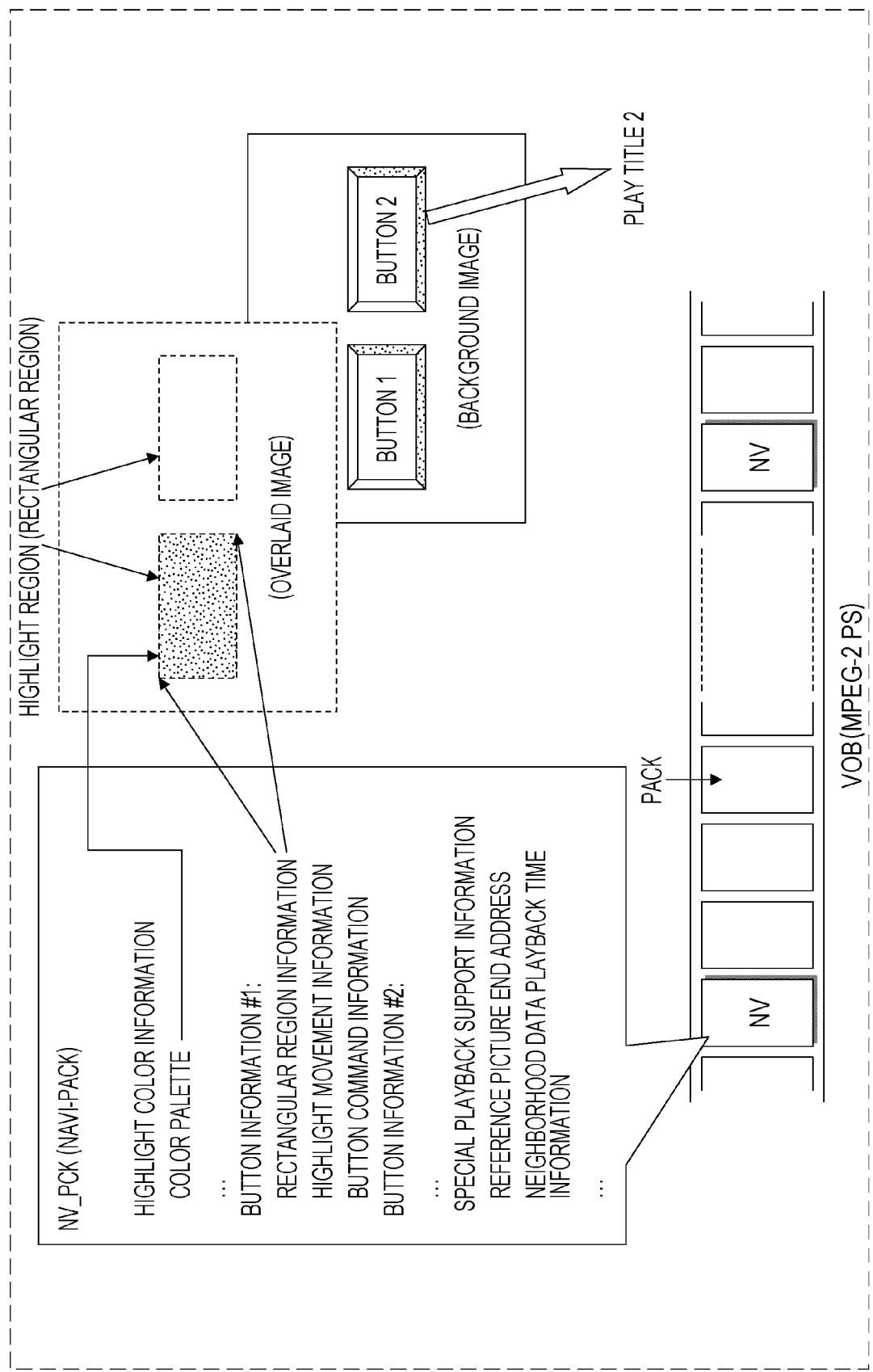
FIG. 2 is a schematic diagram for describing navigation information embedded in an MPEG stream, which is AV data.

FIG. 2 is an overview for describing navigation information embedded in an MPEG stream, which is AV data. Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller.

Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows. That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
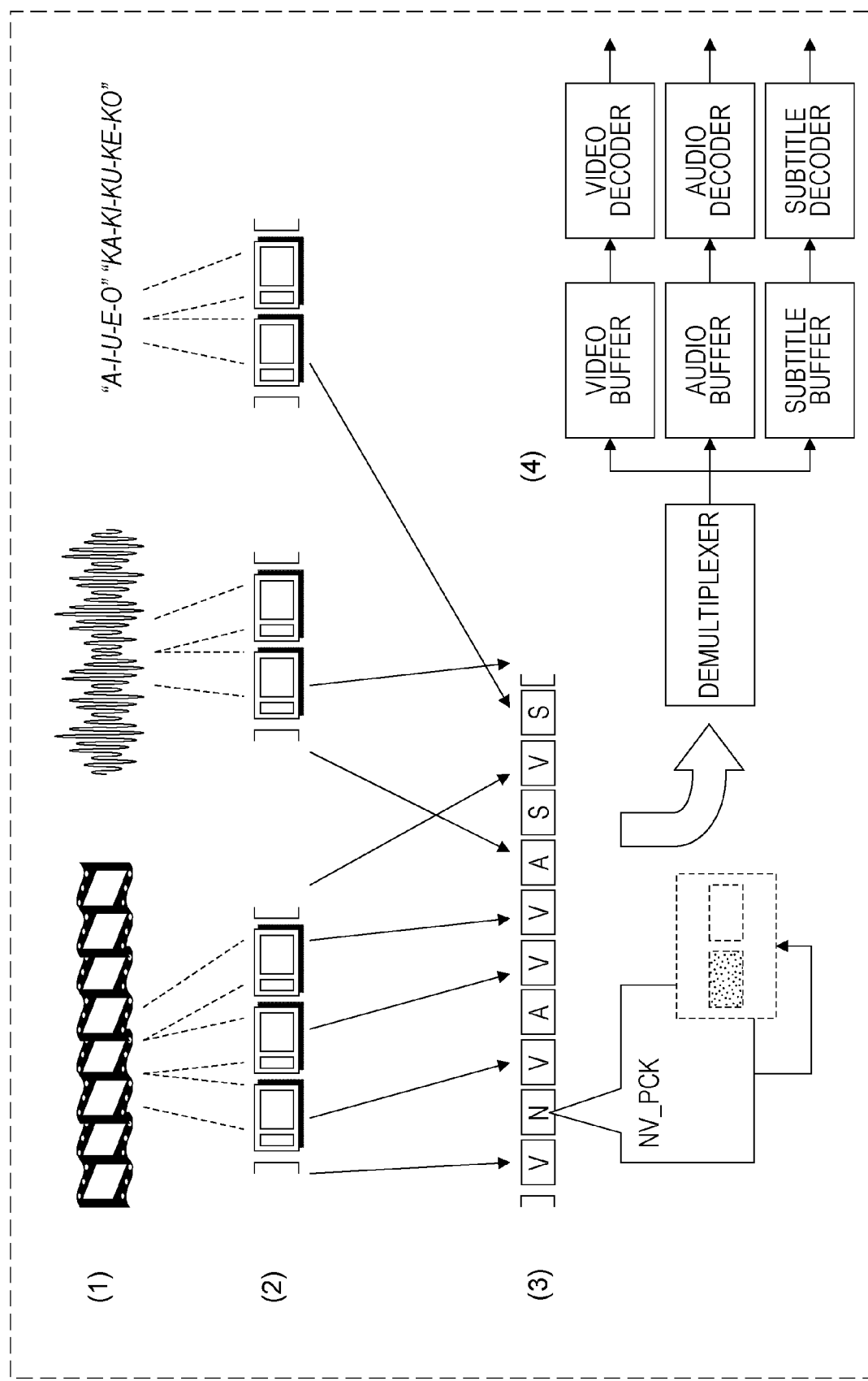
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing.

These decoder buffers have different sized according to each of the individual elementary streams, having 232 kB for video, 4 kB for audio, and 52 kB for subtitles. Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same time.

Now, in a large-capacity recording media such as a Blu-ray (registered trademark) disc, there is a possibility that extremely high-definition video information can be stored. Note that Blu-ray (registered trademark) disc, is also called BD or BD-ROM.

For example, it is conceivable that video information such as 4K (video information having resolution of 3840×2160 pixels) or HDR (high-luminosity video information, generally called High Dynamic Range) may be stored in a BD. Note that conventional standard-luminance video information is generally called SDR (Standard Dynamic Range).

Now, there are BDs where both HDR and SDR are recorded, in order to play contents on both HDR-compatible televisions and HDR-incompatible (only compatible with SDR) televisions. In such BDs, superimposing standard-luminance subtitles or graphics on high-luminance video results in insufficient luminance for the subtitles or graphics, so playback control of the streams is performed corresponding to each of SDR and HDR. Also, in environments compatible with HDR playback, control is performed where HDR video is played, and in environments incompatible with HDR playback, control is performed where SDR video is played.

However, there is an issue that the users will be confused if there is difference in subtitles, menus, audio, and so forth played at the same time as the video, between HDR-compatible playback environments and HDR-incompatible playback environments. The dynamic range of luminance of each of video, subtitles, and menus differs between HDR-compatible playback environments and HDR-incompatible playback environments. However, if a situation occurs where subtitles are played in HDR-compatible playback environments but subtitles are not played in HDR-incompatible playback environments, the user will be provided with different viewing experiences other than viewing with regard to luminance. Also, even if subtitles are played in each playback environment, if the languages of the subtitles are different, such as Japanese and English for example, the user will be provided with different viewing experiences. The Present Inventors studied the following improvement measures to solve the above problem.

A recording medium according to an aspect of the present disclosure is a recording medium in which is recorded a stream file including first luminance video expressed by luminance of a first dynamic range, and second luminance video expressed by luminance of a second dynamic range that is broader than the first dynamic range, and a playlist file for controlling playback of the stream file. First and second combination information, representing combinations of elementary streams that each can be played at the same time in a same playback section, is described in the playlist file. Elementary streams that can be played at the same time as the first luminance video in this playback section are listed in the first combination information. Elementary streams that can be played at the same time as the second luminance video in this playback section are listed in the second combination information. The number of elementary streams of a predetermined type listed in the first combination information and the number of elementary streams of a predetermined type listed in the second combination information each in the same playback section are equal. Note that the first luminance video is SDR video for example, and the second luminance video is HDR video for example. The stream file is a VOB stream file, for example. The first and second combination information is CombiExt_for_Cell( ) and Combi( ), respectively, for example.

Accordingly, the number of elementary streams of the same type is the same in the first and second combination information. Thus, in a case of playing the first luminance video for example, an elementary stream of the same type as the elementary stream played at the same time as the second luminance video, can be played at the same time as the first luminance video. That is to say, elementary streams of the same type can be played in both a playback environment compatible with the second luminance video (HDR video) and a playback environment incompatible with the second luminance video (HDR video). As a result, users can be provided with the same viewing experiences other than viewing with regard to luminance, regardless of the playback environment, and accordingly user confusion can be reduced.

Also, of M (where M is an integer of 1 or more) of elementary streams of the predetermined type listed in the first combination information, and M of elementary streams of the predetermined type listed in the second combination information, each in the same playback section, an attribute of a same N'th (where N is any integer of one or more but M or less) elementary stream in each may be the same. An elementary stream of the predetermined type is, for example, a subtitle stream, and the attribute is language of the subtitles.

Accordingly, subtitles of a desired language (e.g., Japanese) can be displayed on the display without understanding each of the first and second combination information is being played. That is to say, regardless of which of the first and second combination information is being played, the program can display Japanese subtitles, for example, by specifying an N'th subtitle stream.

Also for example, the elementary stream of the predetermined type may be a menu stream, and the attribute may be language of a menu.

Accordingly, menus of a desired language (e.g., Japanese) can be displayed on the display without understanding each of the first and second combination information is being played. That is to say, regardless of which of the first and second combination information is being played, the program can display Japanese menus, for example, by specifying an N'th menu stream.

Also for example, the elementary stream of the predetermined type may be an audio stream, and the attribute may be audio encoding format, number of audio channels, audio sampling frequency, and language of audio.

Accordingly, audio of a desired encoding format and number of channels and so forth can be played, without understanding each of the first and second combination information is being played. That is to say, regardless of which of the first and second combination information is being played, the program can play a desired encoding format and number of channels and so forth, by specifying an N'th audio stream.

A playback device according to an aspect of the present disclosure is a playback device that reads out and plays streams from a recording medium in which is recorded a stream file including first luminance video expressed by luminance of a first dynamic range, and second luminance video expressed by luminance of a second dynamic range that is broader than the first dynamic range, and a playlist file for controlling playback of the stream file. First and second combination information, representing combinations of elementary streams that each can be played at the same time in a same playback section, is described in the playlist file. Elementary streams that can be played at the same time as the first luminance video in this playback section are listed in the first combination information. Elementary streams that can be played at the same time as the second luminance video in this playback section are listed in the second combination information. The number of elementary streams of a predetermined type listed in the first combination information and the number of elementary streams of a predetermined type listed in the second combination information each in the same playback section being equal. In a case of playing the first luminance video, the playback device reads out one of the elementary streams listed in the first combination information of the playlist file, and plays at the same time of the first luminance video, and in a case of playing the second luminance video, reads out one of the elementary streams listed in the second combination information of the playlist file, and plays at the same time of the second luminance video.

Accordingly, in a case of the playback device playing the first luminance video for example, an elementary stream of the same type as the elementary stream played at the same time as the second luminance video, can be played at the same time as the first luminance video. As a result, users can be provided with the same viewing experiences as a case where the second luminance video is played, other than viewing with regard to luminance, and accordingly user confusion can be reduced.

Also, of M (where M is an integer of 1 or more) of elementary streams of the predetermined type listed in the first combination information, and M of elementary streams of the predetermined type listed in the second combination information in the playback section, each in the same playback section, an attribute of a same N'th (where N is any integer of one or more but M or less) elementary stream in each may be the same. The playback device may play an elementary stream of the same attribute that is the predetermined type, in both a case of playing the first luminance video and a case of playing the second luminance video, by specifying an N'th elementary stream.

Accordingly, users can be provided with the same viewing experiences other than viewing with regard to luminance, in both a case where the first luminance video is played and a case where the second luminance video is played.

These general or specific aspects may be realized by a device, method, system, integrated circuit, computer program, or computer-readable recording medium such as a CD-ROM, and may be realized by any combination of a system, method, integrated circuit, computer program, and recording medium.

Preferred embodiments to carry out the present disclosure will be described below with reference to the attached drawings. It should be noted that the second embodiment is the closest to the disclosure in Claim 1 of the present application, the basic configuration of the information recording medium and so forth in the second embedment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
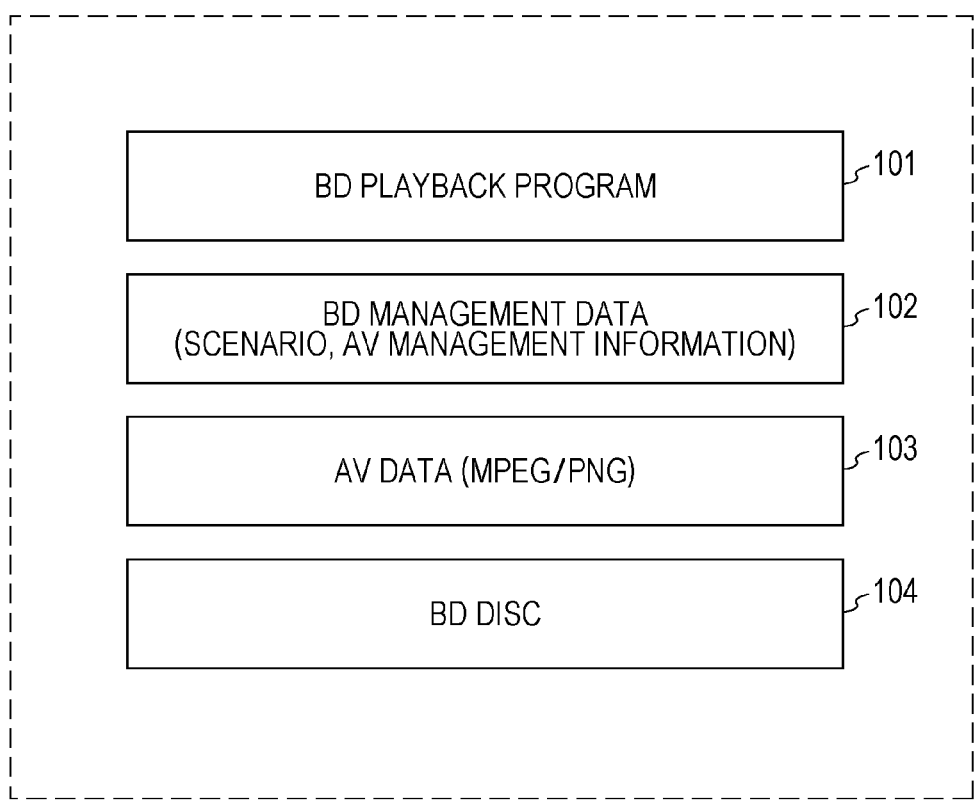
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CR-ROMs and DVD-ROMs, as a matter of course.

Figure 5:
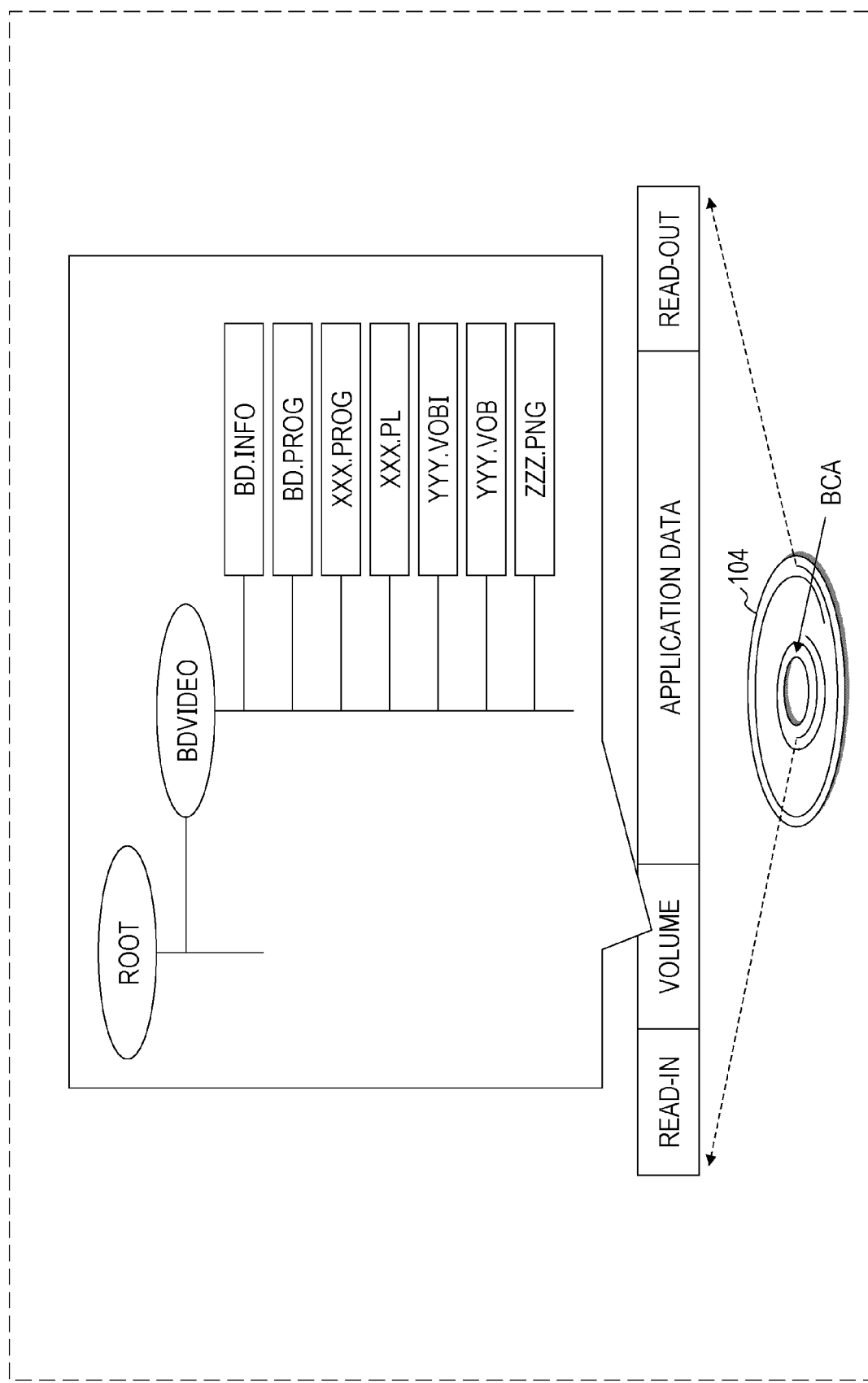
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BCA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded.

The following seven types of files are recorded beneath the BDVIDEO directory.

BD.INFO (Fixed Filename)

This is one of "BD management information", and is a file in which is recorded information relating to the entire BD-ROM. The BD-ROM player reads out this file first.

BD.PROG (Fixed Filename)

This is one of "BD playback programs", and is a file in which is recorded a program relating to the entire BD-ROM.

XXX.PL ("XXX" is Variable, Suffix "PL" is Fixed)

This is one of "BD management information", and is a file in which is recorded playlist (Play List) information that records a scenario. Each playlist has one file.

XXX.PROG ("XXX" is Variable, Suffix "PROG" is Fixed)

This is one of "BD playback programs", and is a file in which is recorded a program for each aforementioned playlist. The correlation to the playlist is identified by the file body name ("XXX" matches).

YYY.VOB ("YYY" is Variable, Suffix "VOB" is Fixed)

This is one of "AV data", and is a file in which is recorded a VOB (the same as the VOB described in the example of the conventional art). One VOB corresponds to one file.

YYY.VOBI ("YYY" is Variable, Suffix "VOBI" is Fixed)

This is one of "BD management information", and is a file in which is recorded management information relating to the VOB which is AV data. The correlation to the VOB is identified by the file body name ("YYY" matches).

ZZZ.PNG ("ZZZ" is Variable, Suffix "PNG" is Fixed)

This is one of "AV data", and is a file in PNG (an image format standardized by the World Wide Web Consortium (W3C) and is pronounced "ping") which is image data for configuring subtitles and menu screens. One PNG image corresponds to one file.

Player Configuration

Figure 6:
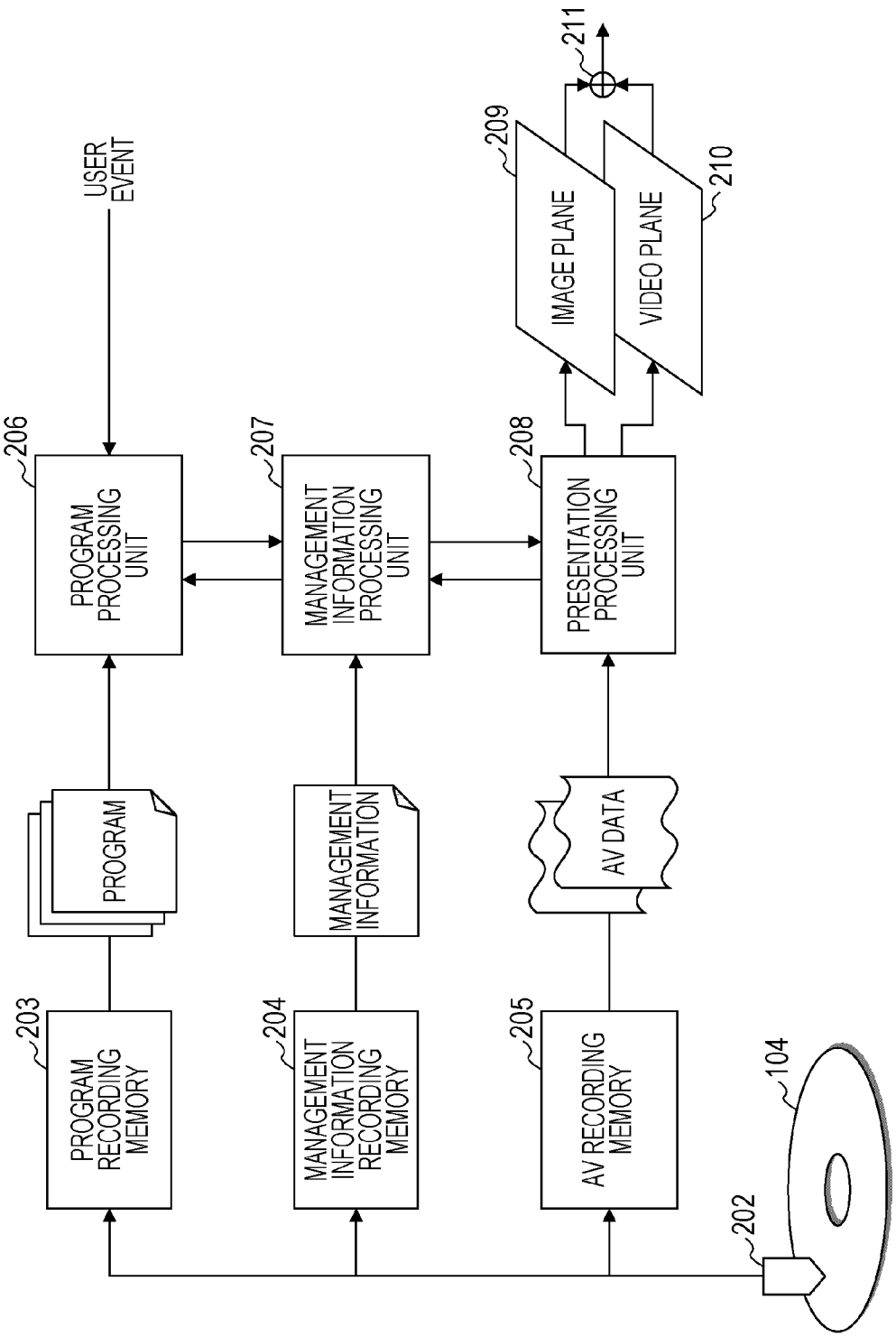
FIG. 6 is a diagram illustrating an overview of a basic configuration of a BD-ROM player that plays BD-ROMs.

Next, the configuration of a player that plays the BD-ROM 104 will be described with reference to FIGS. 6 and 7. FIG. 6 is a schematic diagram illustrating the basic configuration of a BD-ROM player that plays the BD-ROM 104. The BD-ROM player illustrated in FIG. 6 reads out data on the BD-ROM 104 via an optical pickup 202. The data that is read out is stored in dedicated memory in accordance with the type of each data.

The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, instructions of AV data to be played are given to the presentation processing unit 208.

The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a television (TV) or the like.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303.

The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308.

The demultiplexer 310 extracts VOB data recorded in the track buffer 309, based on the time obtained from the clock 307. Further, video data included in the VOB data is sent to the video processor 312, and the audio data to the sound processor 313.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX.PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to e handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX.PROG") is executed by the program processor 302. The program processor 302 processes a BD program in a case where an event has been sent from the scenario processor 305 or a case where an event has been sent from the UO manager 303. In a case where a request has been sent from the user by a remote controller key, the UO manager 303 generates an event corresponding to this request, and sends to the program processor 302. Playback of a BD-ROM is performed by the operations of the components as described above.

Application Space

Figure 8:
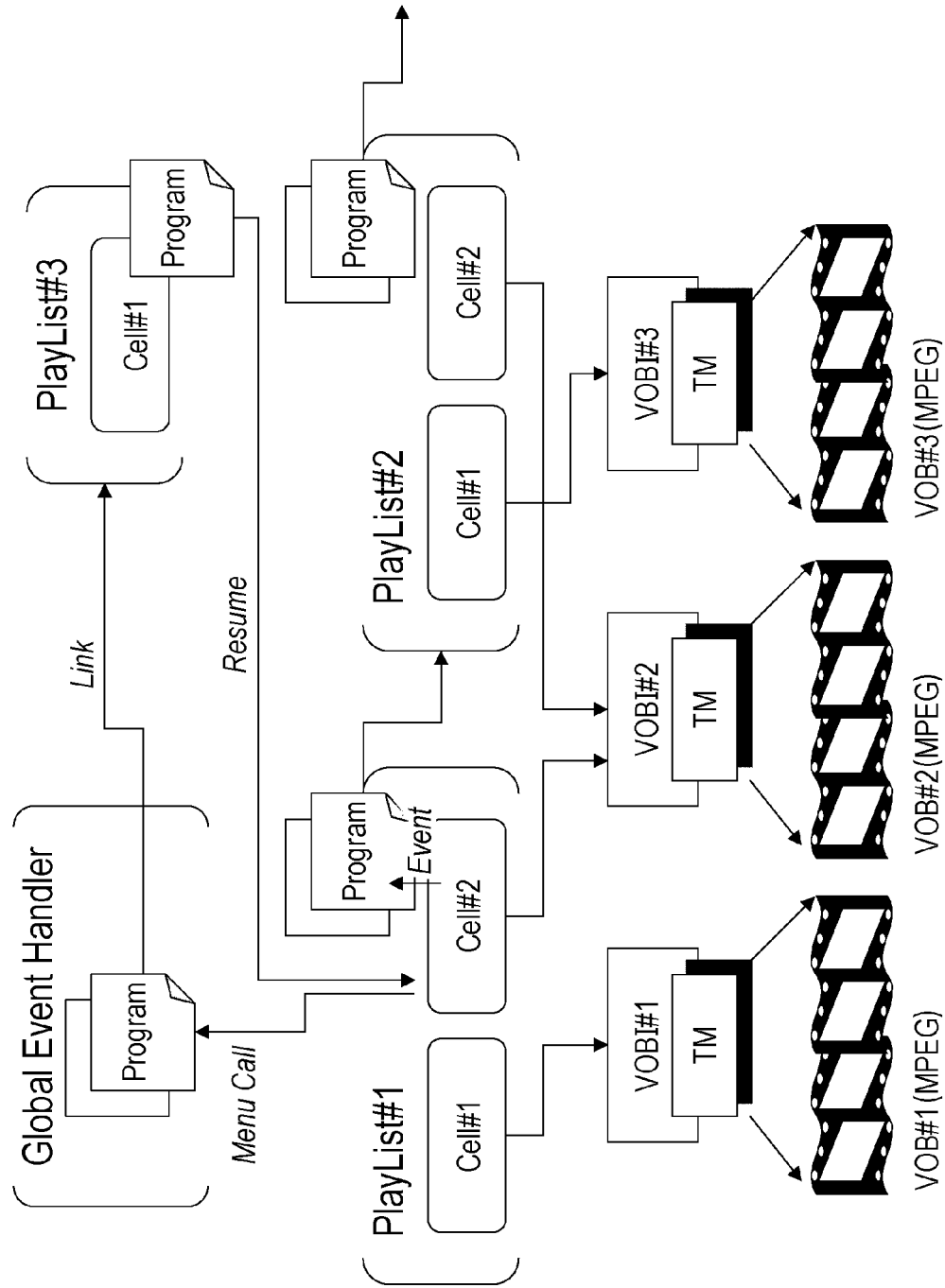
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program. As long as there is no dynamic scenario according to a program, the playlist is simply playing the individual cells in order, and playback of the playlist ends at the point that playback of all cells has ended.

On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point where the audio or subtitles was changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
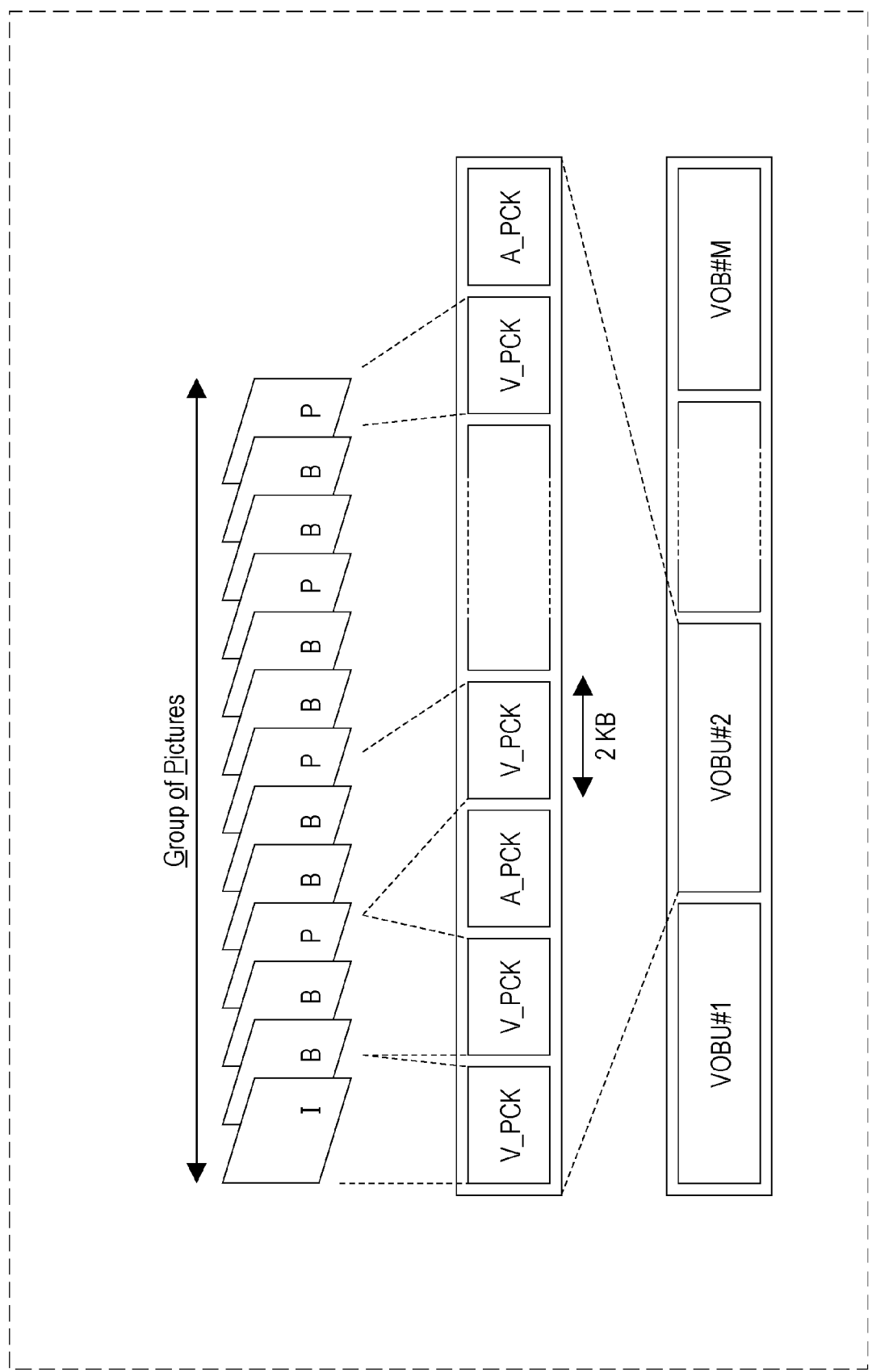
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
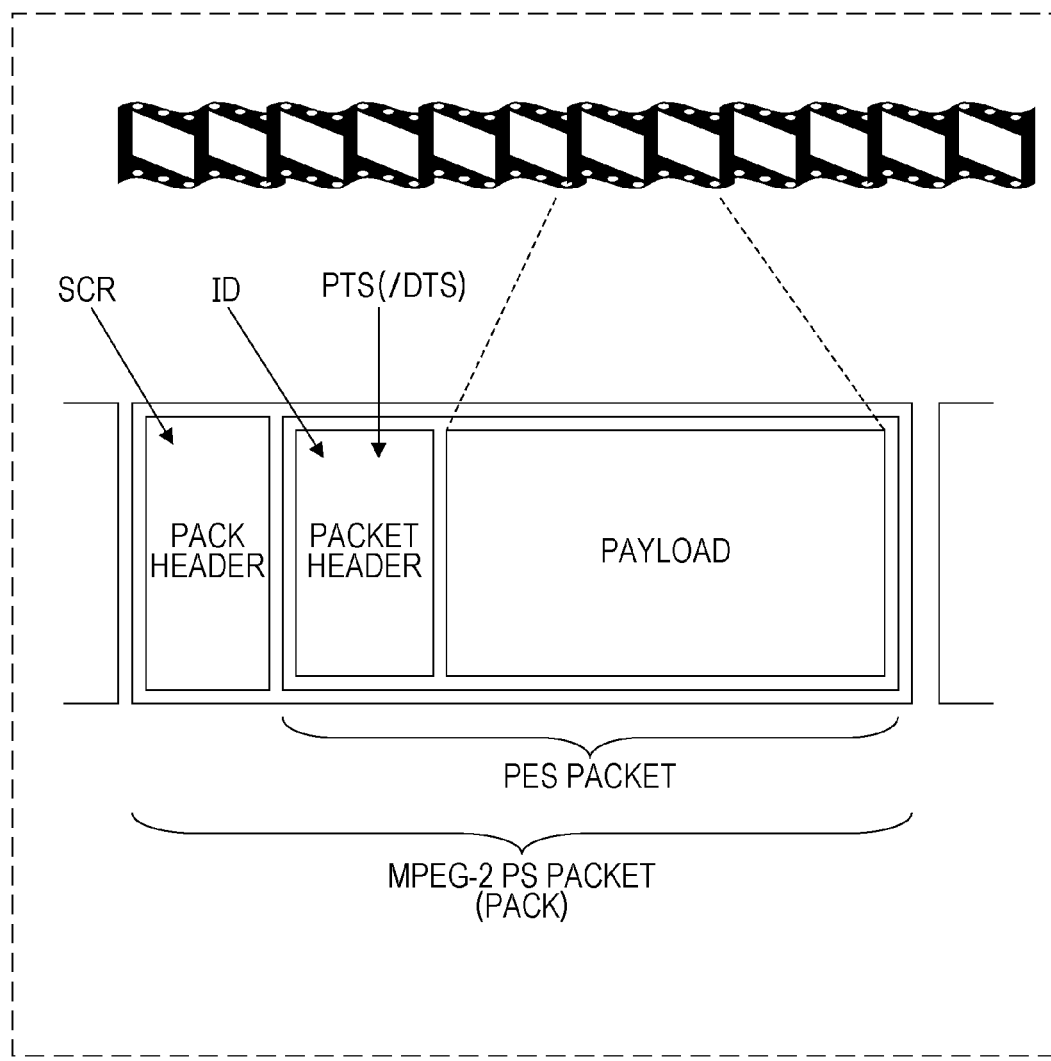
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet data is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams.

Interleaved Recording of VOB

Figure 11:
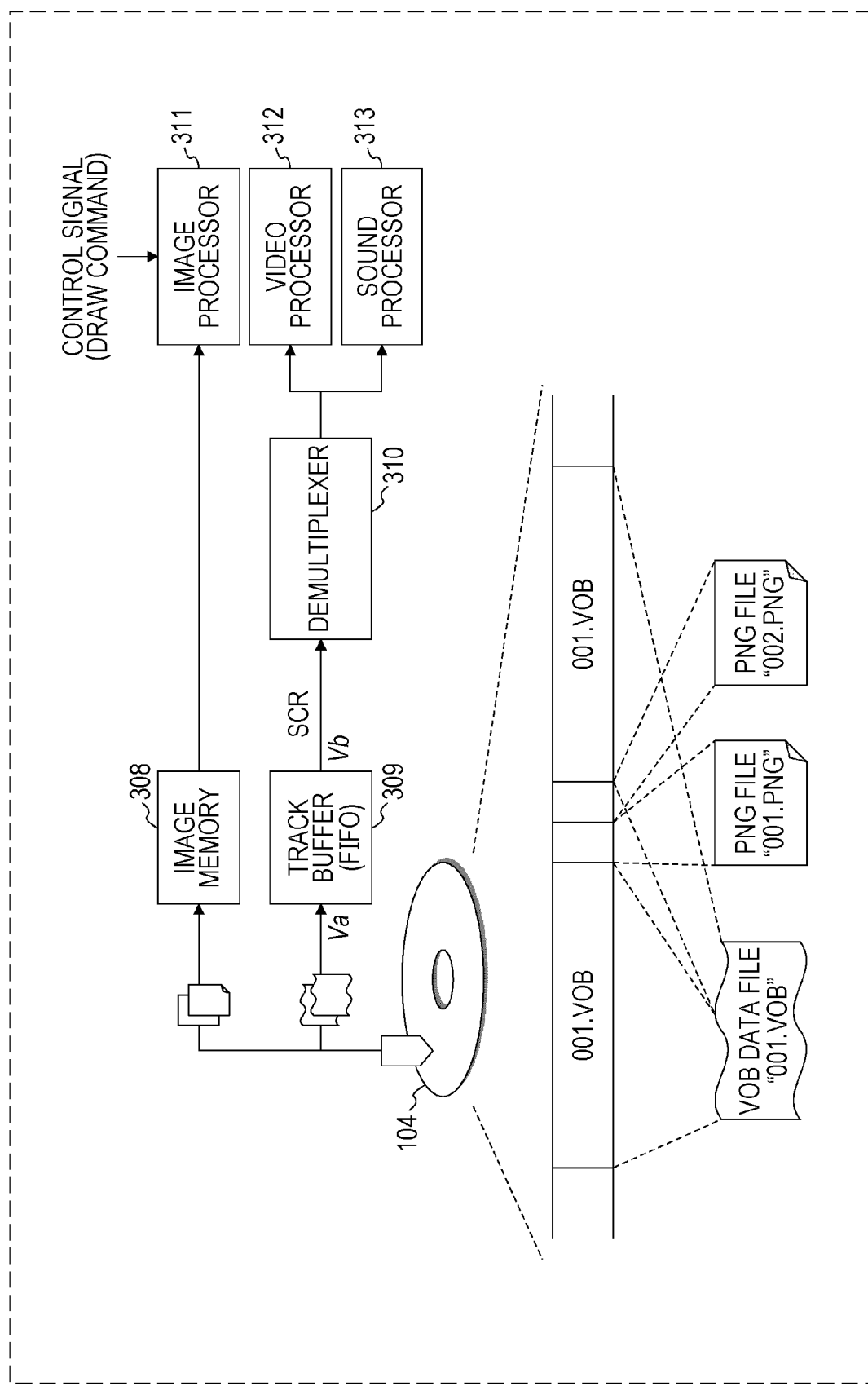
FIG. 11 is a diagram for describing the relationship between AV data and player configuration.

Interleaved recorded of VOB files will be described with reference to FIGS. 11 and 12. FIG. 11 is a diagram for describing the relationship between the AV data and the configuration of a BD-ROM player. Illustrated to the upper side of FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

Figure 7:
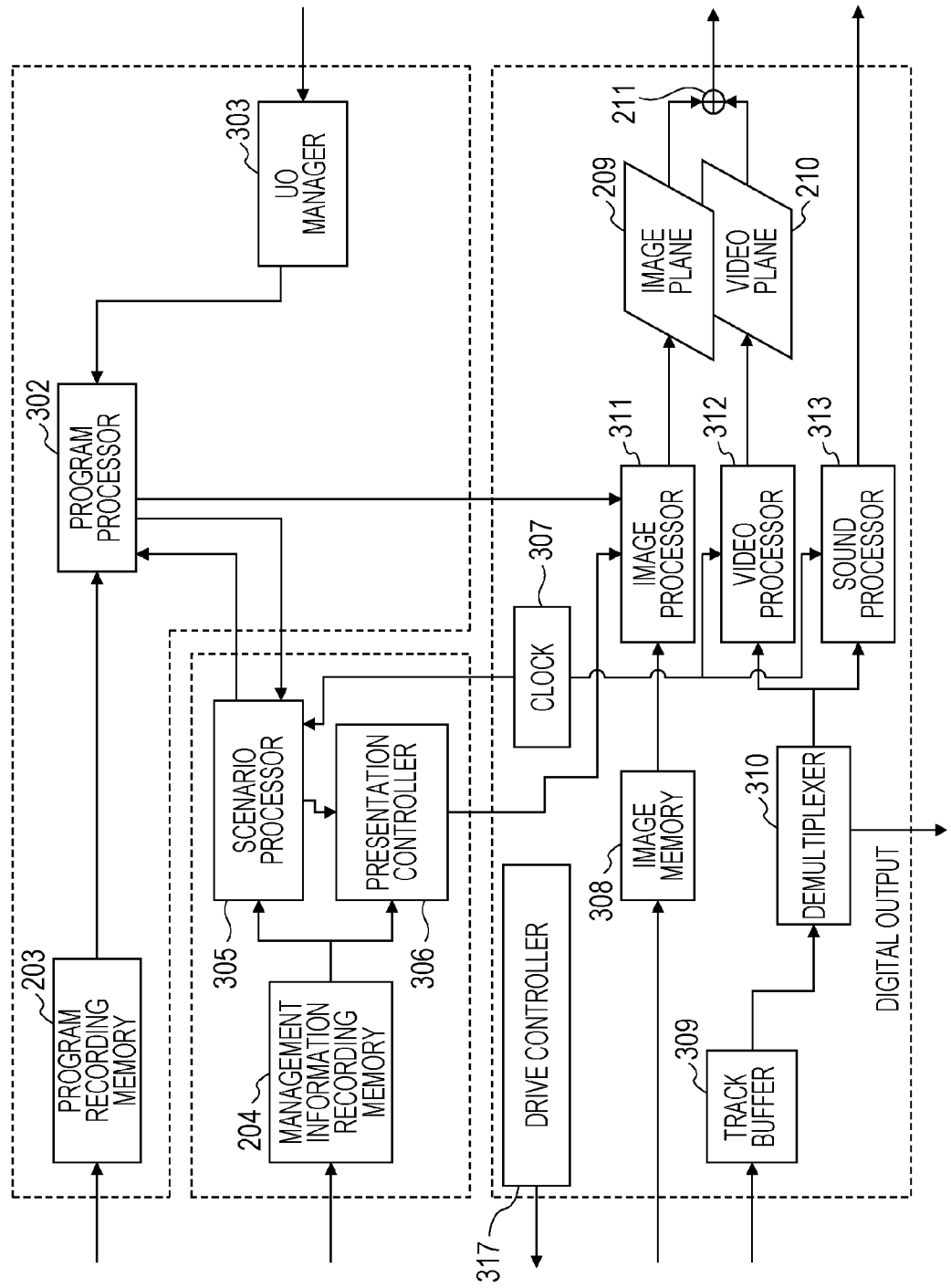
FIG. 7 is a block diagram where the configuration of the player illustrated in FIG. 6 is detailed.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

Illustrated to the lower side of FIG. 11 is interleaved recording of a VOB file and PNG files on the BD-ROM. Generally, in the case of a CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, a method where a VOB file is divided into several blocks, and the VOB file and image are subjected to interleaved recording is employed with the present embodiment.

Illustrated to the lower side of FIG. 11 is interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
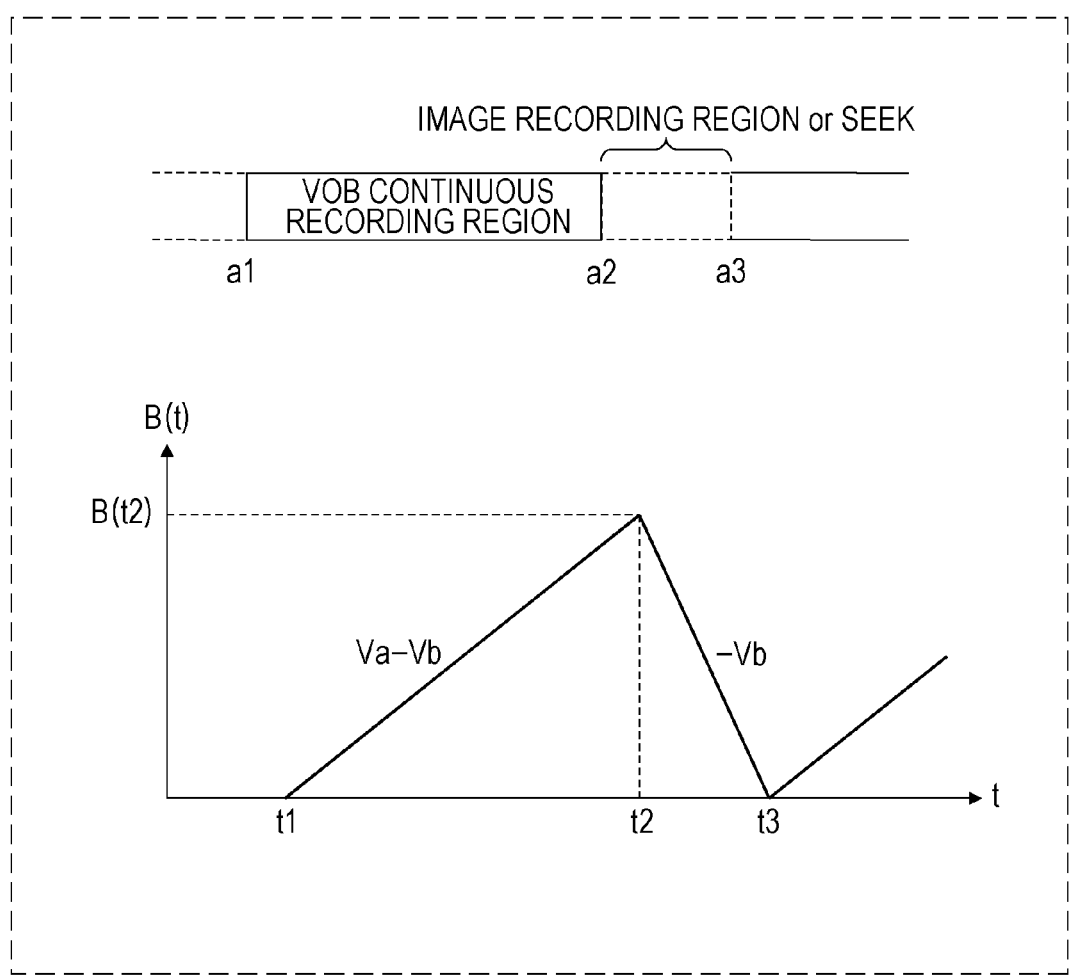
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. The continuous recording region of the VOB continues from "a1" to "a2" as illustrated to the upper side of FIG. 12. From "a2" to "a3" is a section where image data is recorded, so VOB data cannot be read out.

Illustrated to the lower side of in FIG. 12 is the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va−Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va−Vb from "t1" to "t2", and the data accumulation amount B(t2) at the time "t2" can be calculated by the following Expression (1).

$$B(t2)=(Va-Vb)\times(t2-t1) \quad \text{Expression (1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following Expression (2).

$$B(t2)\geq-Vb\times(t3-t2) \quad \text{Expression (2)}$$

That is to say, the array of image data should be decided so as to satisfy Expression (2).

Navigation Data Structure

Figure 13:
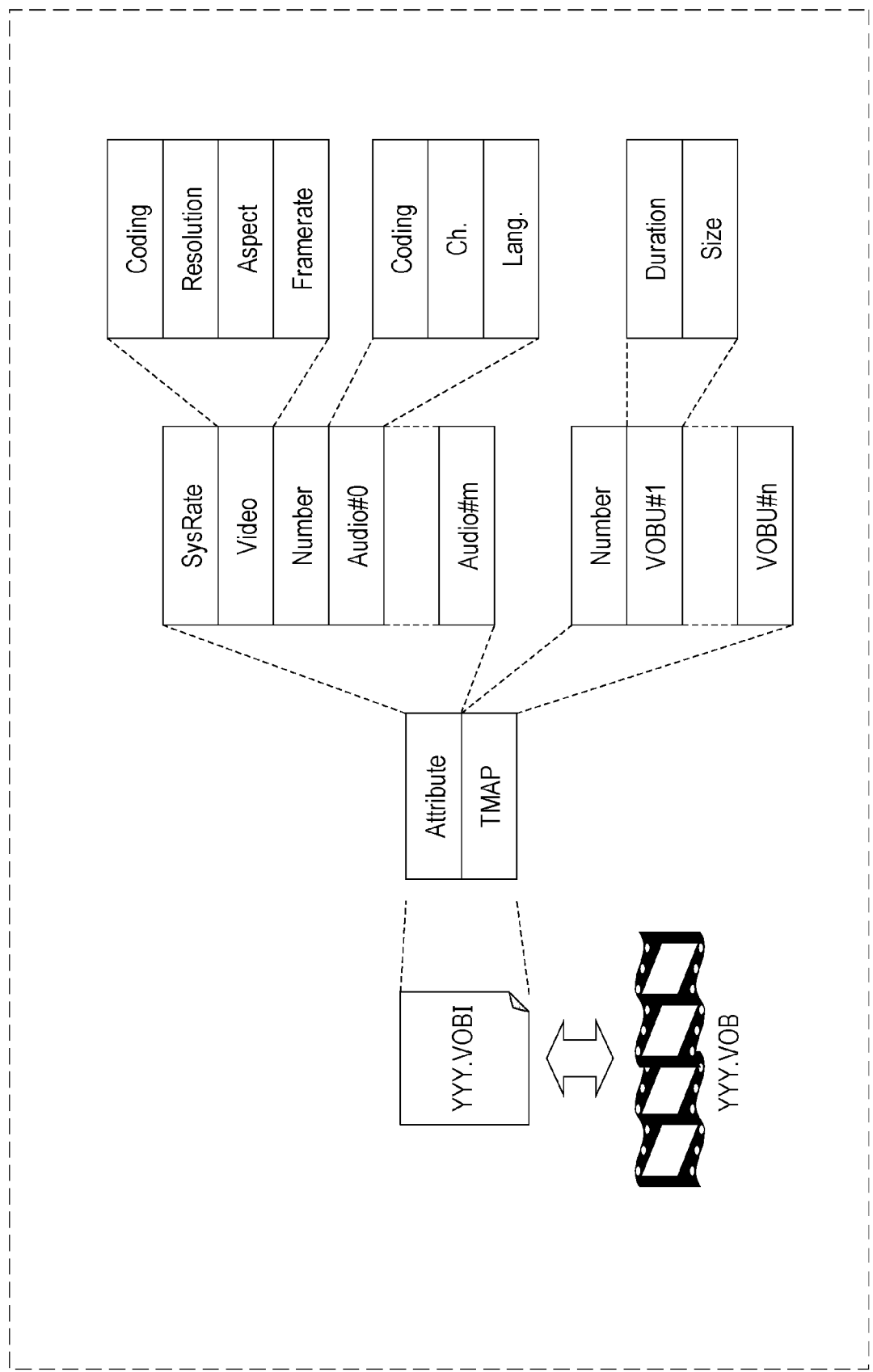
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB. The stream attribute information is of a configuration having video attributes (Video) and audio attributes (Audio #0 through Audio # m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
Compression Format (Coding):
MPEG1
MPEG2
MPEG4
Resolution (Resolution):
1920×1080
1280×720
720×480
720×565
Aspect Ratio (Aspect):
4:3
16:9
Frame Rate (Framerate):
60
59.94
50
29.97
24

The following are example of fields that the audio attributes (Audio) have, and values which each can have.
Compression Format (Coding):
AC3
MPEG1
MPEG2
LPCM
Number of Channels (Ch):
1 to 8
Language Attributes (Language):
JPN, ENG, . . .

The time map (TMAP) is a table having information for each VOBU, and holds the number of VOBUs (Number) that the VOB has, and each VOBU information (VOBU #1 through VOBU # n). Each VOBU information has a playtime length (Duration) of the VOBU and data size (Size) of the VOBU.

Figure 14:
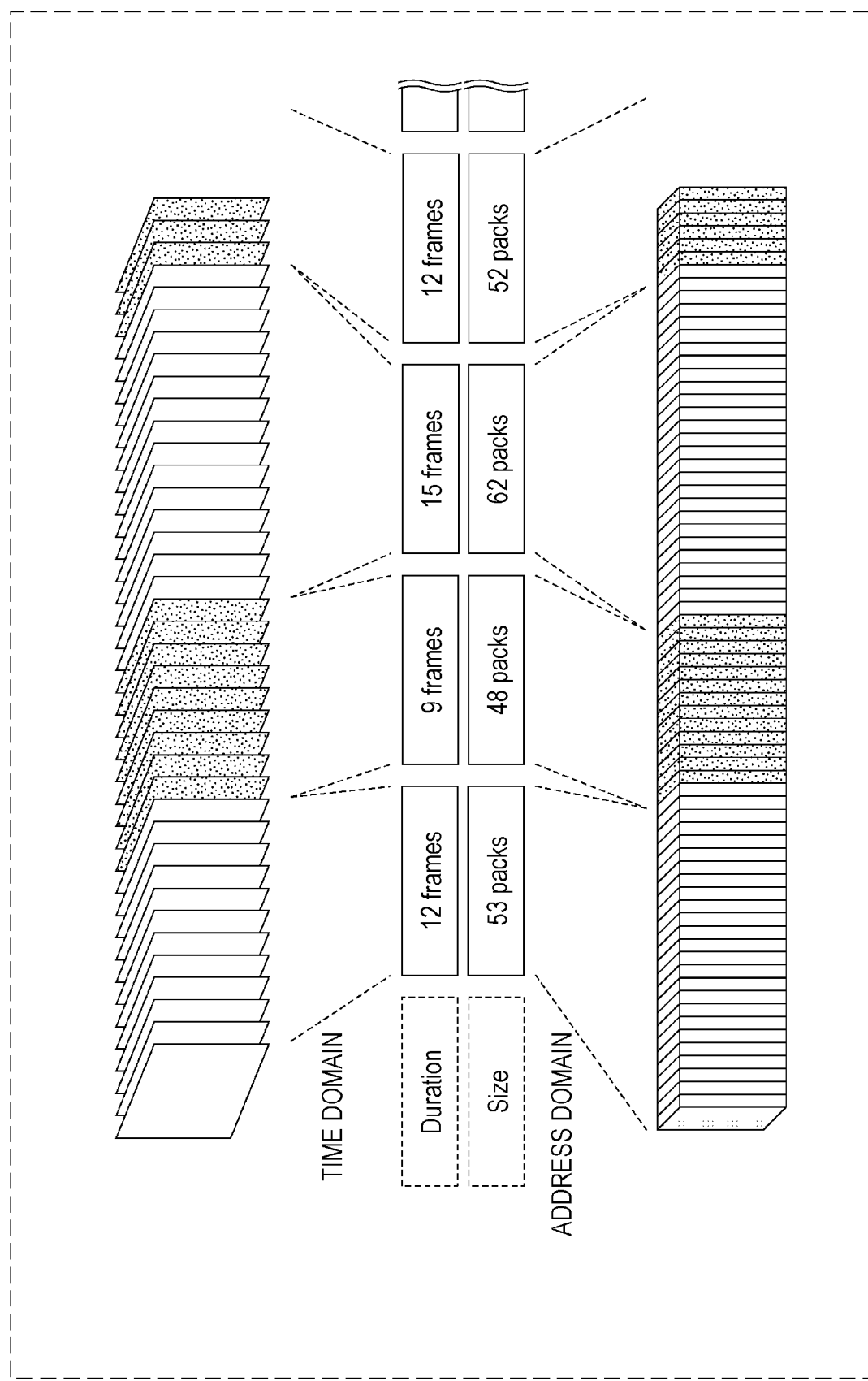
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression.

However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures.

Accordingly, it is impossible to express the relationship between time and address by a common expression in the case of MPEG video. As a matter of course, it is impossible to express the relationship between time and address by a common expression, with regard to an MPEG stream where MPEG video data has been multiplexed, i.e., a VOB, as well.

Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
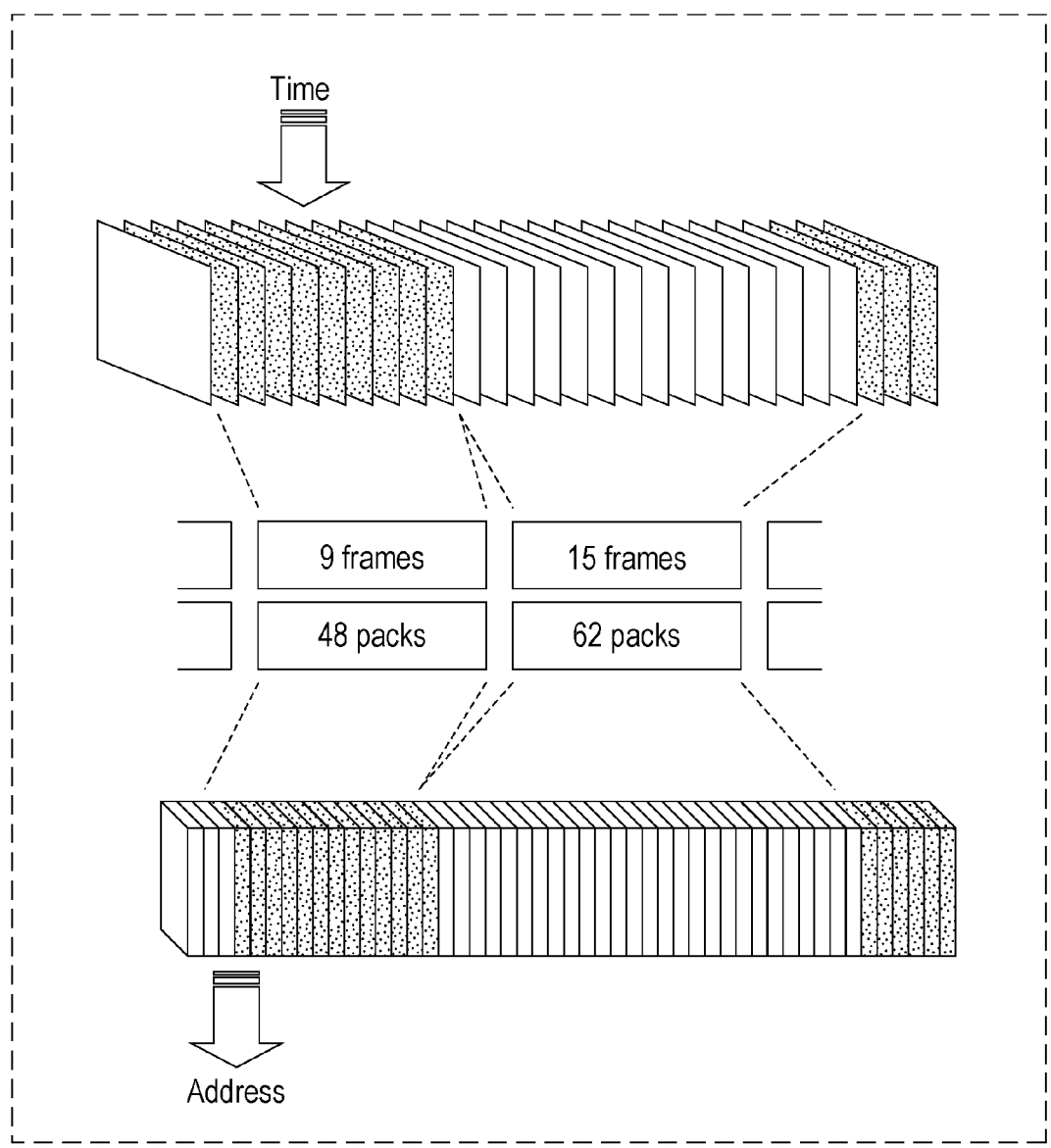
FIG. 15 is a diagram for describing an address information acquisition method using a time map.

How to use a time map (TMAP) will be described with reference to FIG. 15. FIG. 15 is a diagram for describing an address acquisition method using a time map. In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
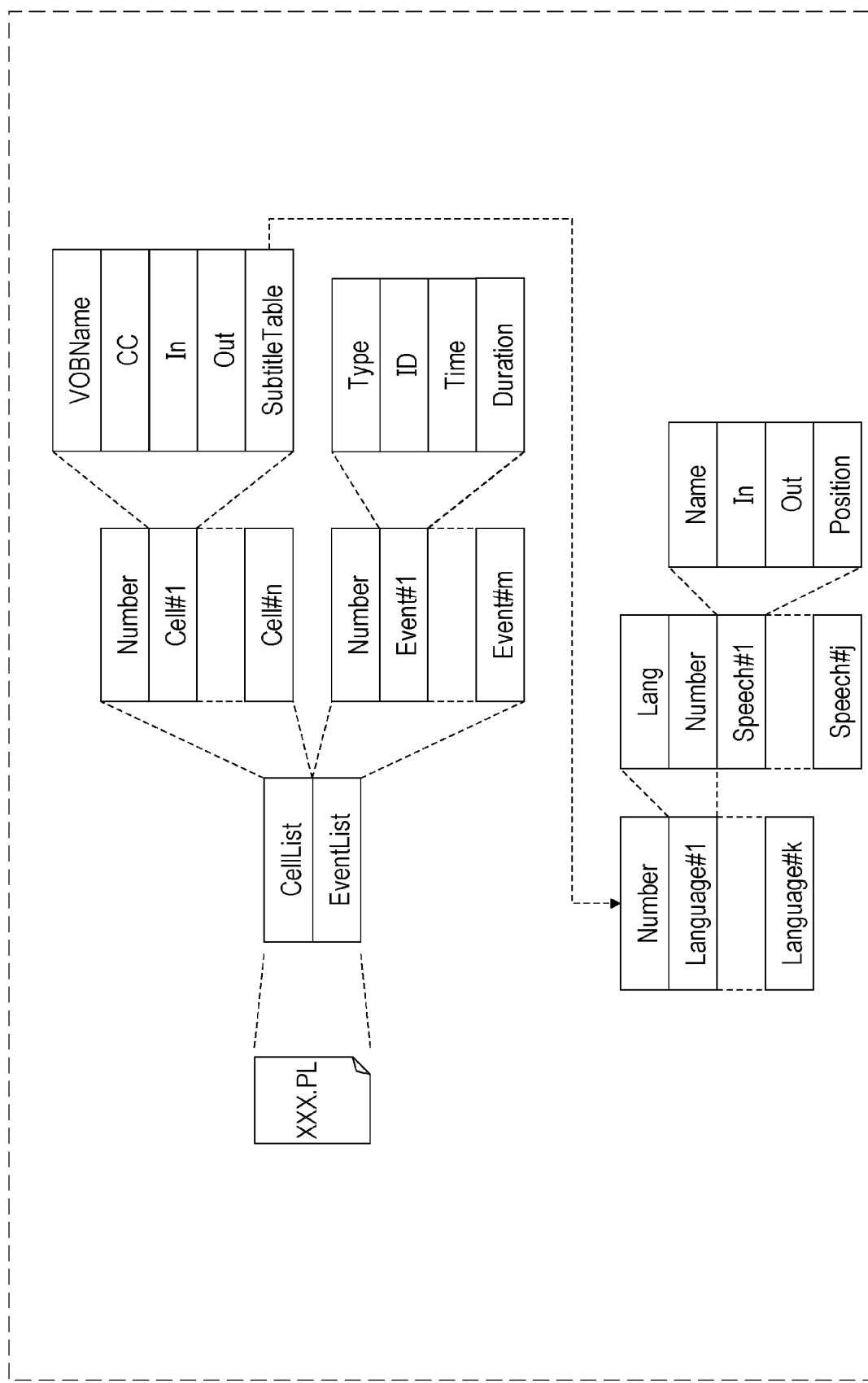
FIG. 16 is a diagram illustrating the configuration of a playlist.

Next, the internal structure of the playlist ("XXX.PL") will be described with reference to FIG. 16. FIG. 16 is a diagram illustrating the configuration of a playlist. A playlist is made up of a cell list (CellList) and event list (EventList).

A cell list (CellList) is information indicating the playback cell sequence within the playlist, and cells are played in the order of description in this list. The content of a cell list (CellList) is the number of cells (Number) and information of each cell (Cell #1 through Cell # n).

The information of each cell (Cell #1 through Cell # n) has the VOB filename (VOBName), the valid section start time (In) and valid section end time (Out) in this VOB, and a subtitle table (SubtitleTable). The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language #1 through Language # k).

The table for each language (Language #1 through Language # k) is made up of language information (Language), the number of pieces of subtitle information of the subtitles to be displayed (Number) The subtitle information of the subtitles to be displayed (Speech #1 through Speech # j). Each subtitle information (Speech #1 through Speech # j) is made up of a corresponding image data filename (Name), subtitle display start time (In) and subtitle display end time (Out), and subtitle display position (Position).

The event list (EventList) is a table defining events occurring within this playlist. The event list is made up of the number of events (Number), and following this the individual events (Event #1 through Event # m), each event (Event #1 through Event # m) being made up of event type (Type), event ID (ID), event generation time (Time), and valid period (Duration).

Figure 17:
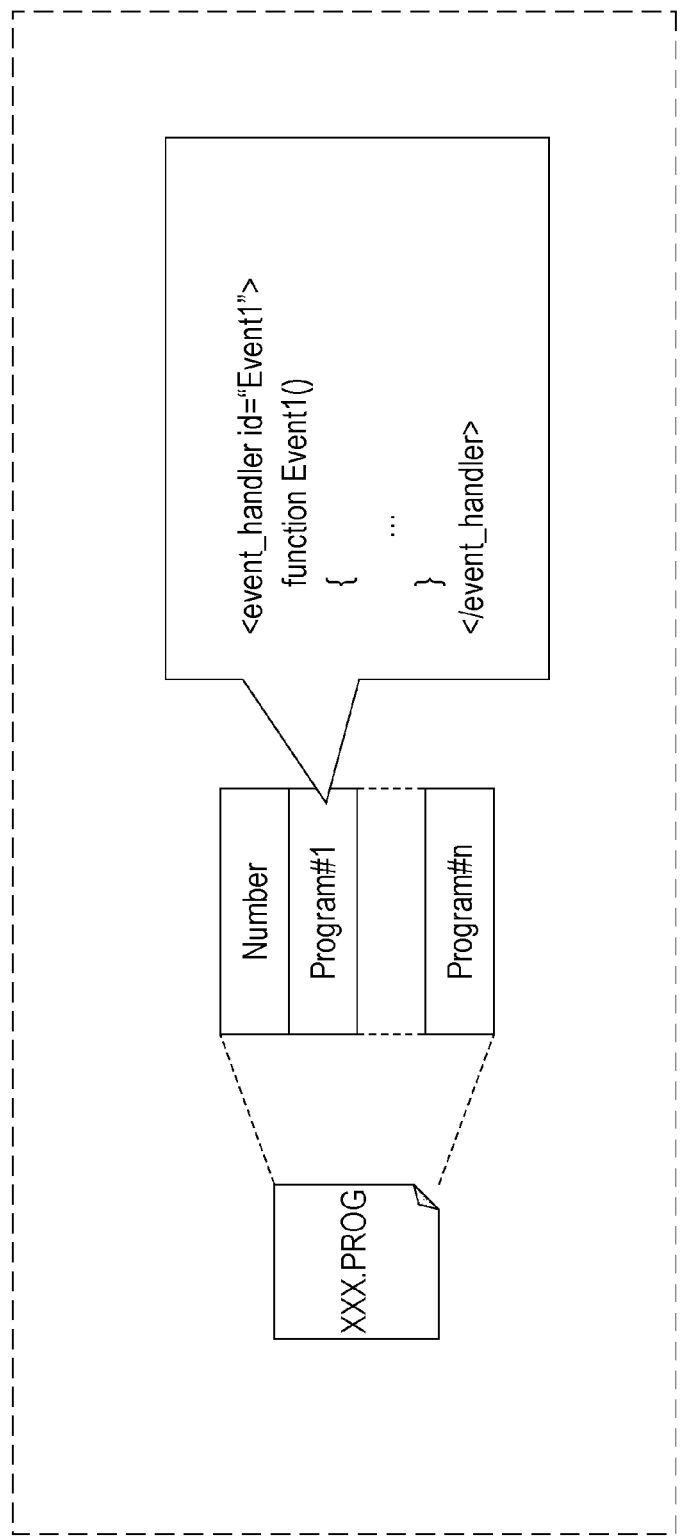
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist. The event handler table contains the number of event handlers/programs that are defined (Number), and individual event handlers/programs (Program #1 through Program # n).

The description within each of the event handlers/programs (Program #1 through Program # n) contains a definition of the start the event handler (an <event_handler> tag) and an event handler ID (event_handler id) that is paired with the aforementioned event ID. Following this, the program is described between brackets { } after "function".

Figure 18:
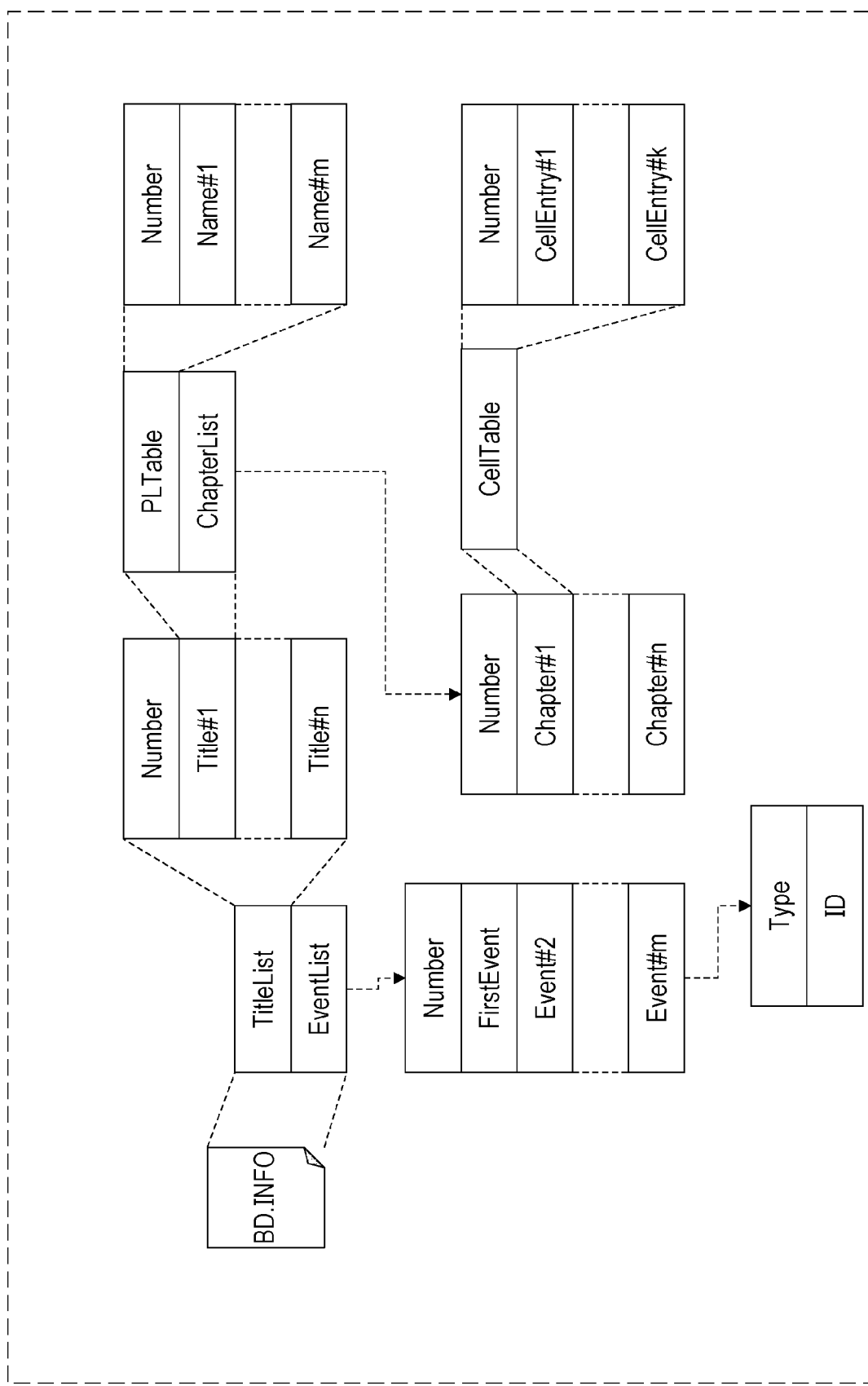
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information. The overall BD-ROM information is made up of a title list (TitleList) and event list (EventList) for global events.

The title list (TitleList) is made up of the number of titles in the disc (Number), and subsequently each title information (Title #1 through Title # n).

Each title information (Title #1 through Title # n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter #1 through Chapter # n). Each chapter information (Chapter #1 through Chapter # n) has a table of cells that this chapter includes (CellTable), the cell table (CellTable) being made up of the number of cells (Number) and entry information of each cell (CellEntry #1 through CellEntry # k).

Cell entry information (CellEntry #1 through CellEntry # k) is described as the playlist name containing this cell and the cell No. Within the playlist.

The event list (EventList) has the number of global events (Number) and information of each global event (Event #1 through Event # m). What is noteworthy here is that the global event that is defined first is called a first event (FirstEvent), and is the event that is executed first when the BD-ROM is inserted into the player.

Each global event information (Event #1 through Event # m) has only the event type (Type) and ID of the event (ID).

Figure 19:
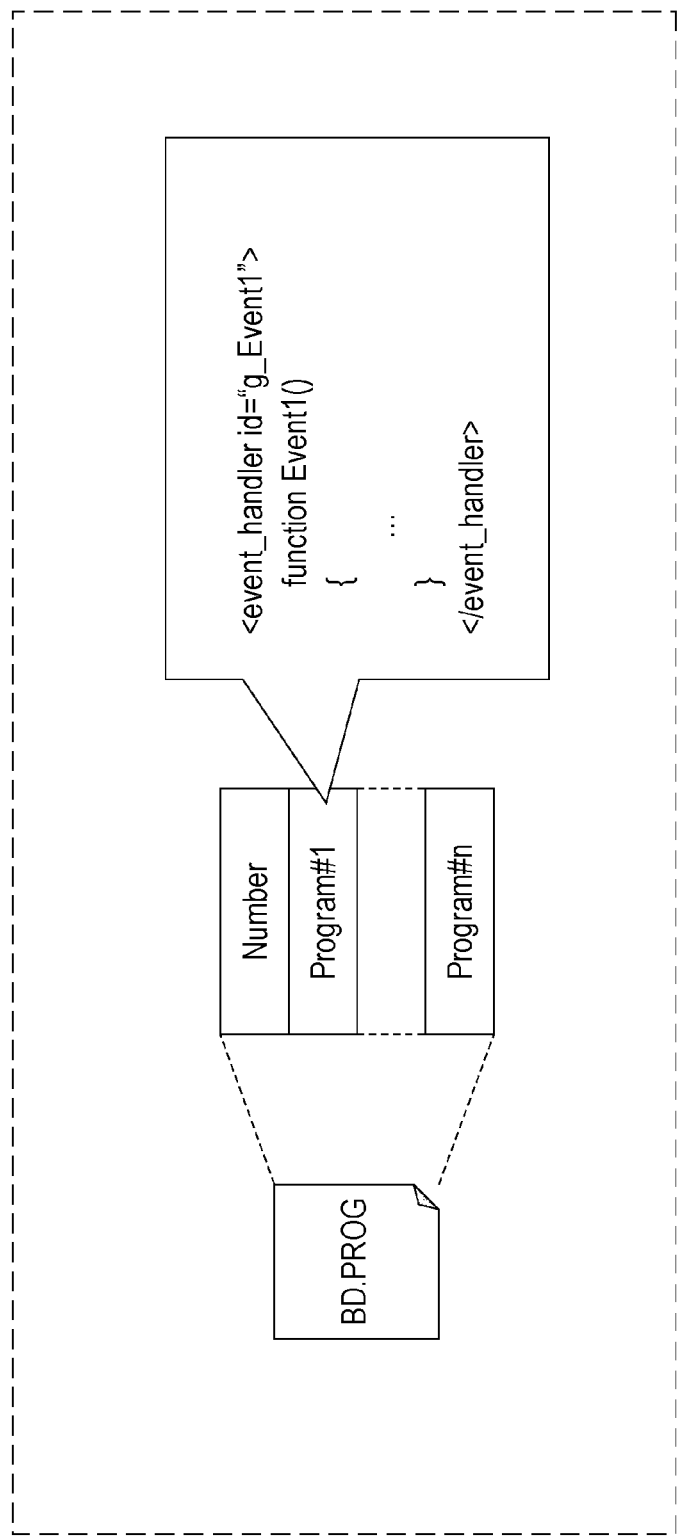
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
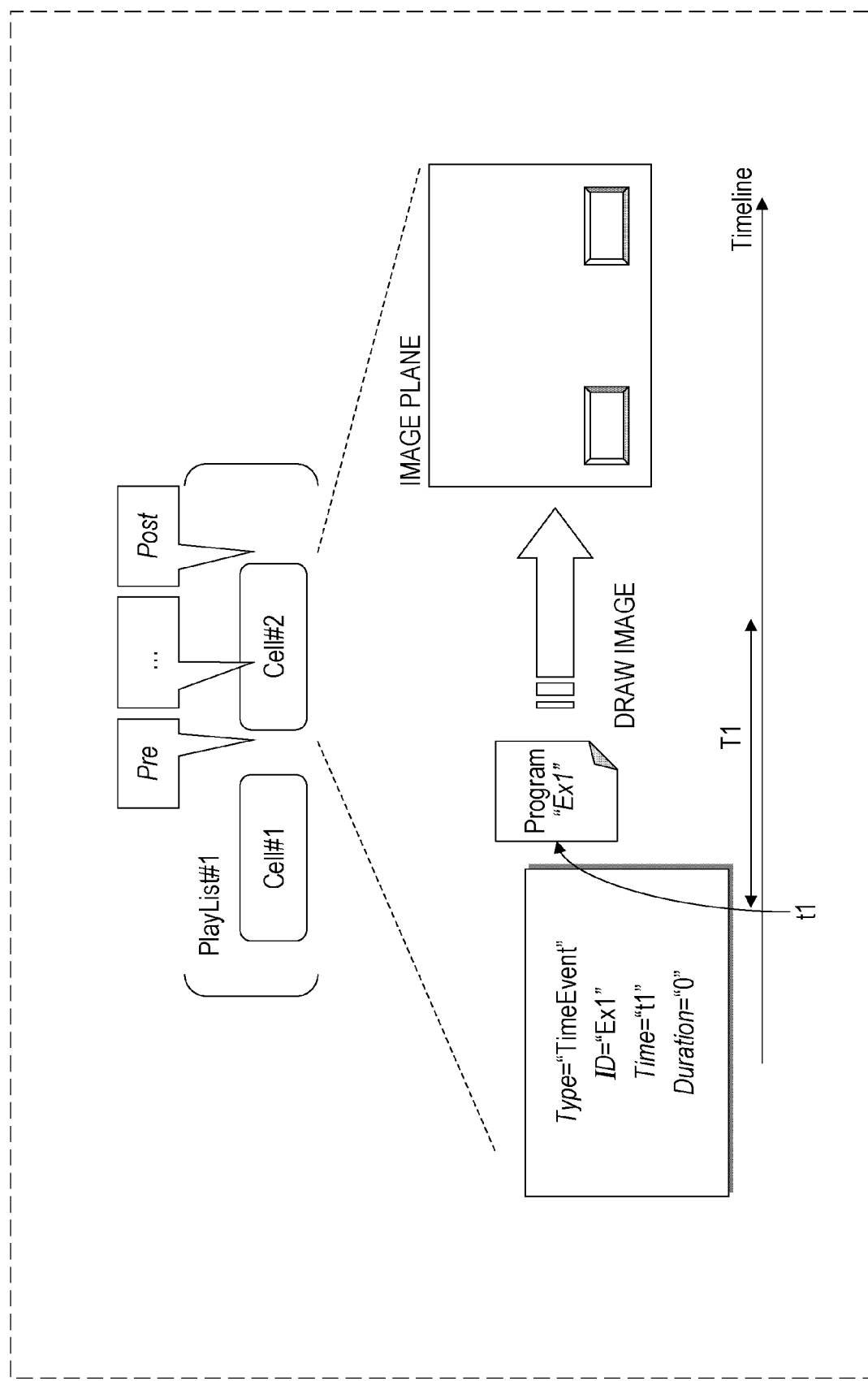
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL").

In a case of an event defined as a time event, i.e., event type (Type) is "TimeEvent", at the point of the event generation time ("t1"), a time event having the ID "Ex1" is output from the scenario processor 305 to the program processor 302. The program processor 302 searches for the handler that has the ID "Ex1", and executes the relevant event handler. For example, in the case of the present embodiment, a two-button image can be drawn, or the like.

Figure 21:
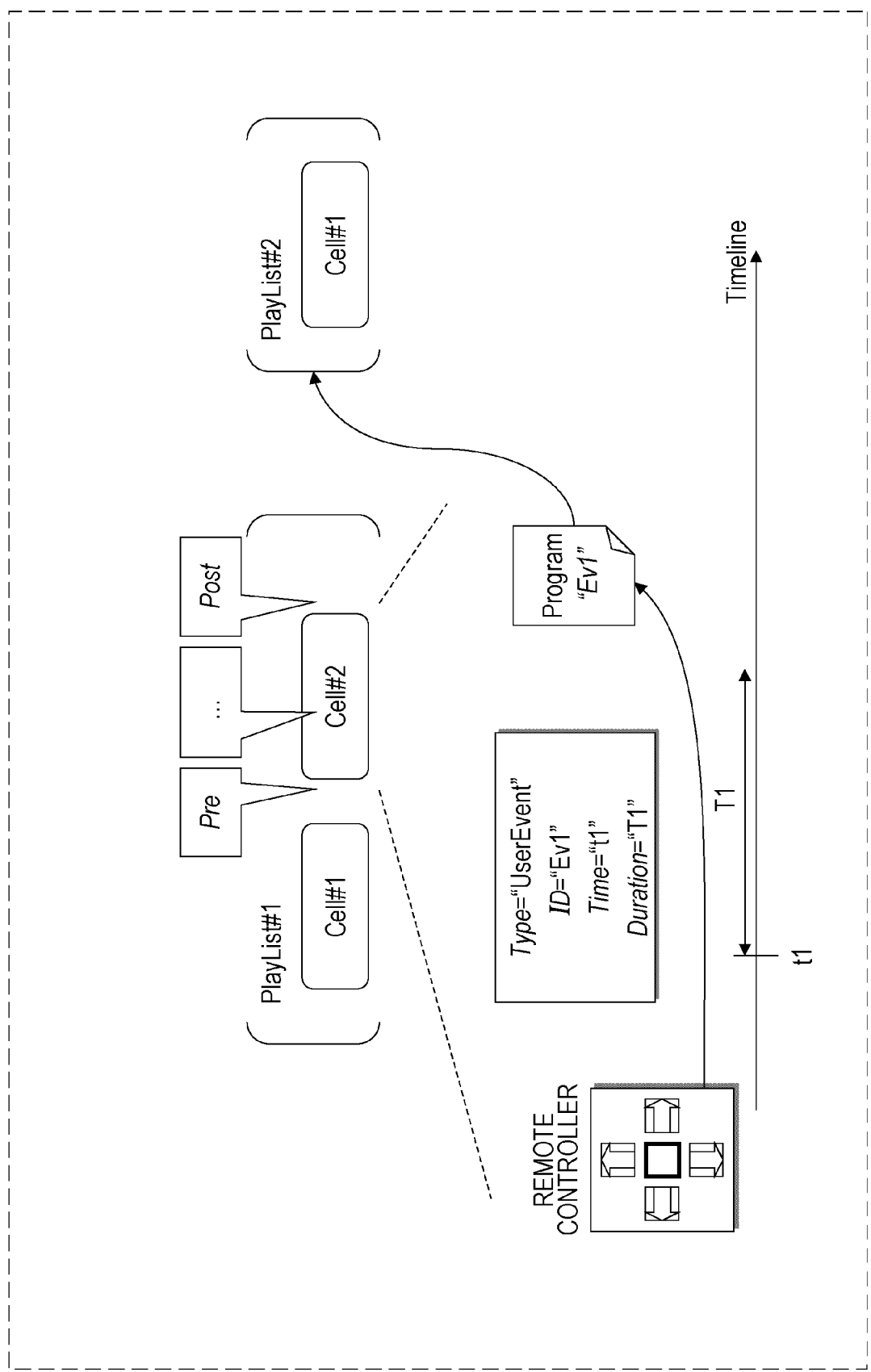
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX.PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("T1") described in the valid period information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist #2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

Figure 22:
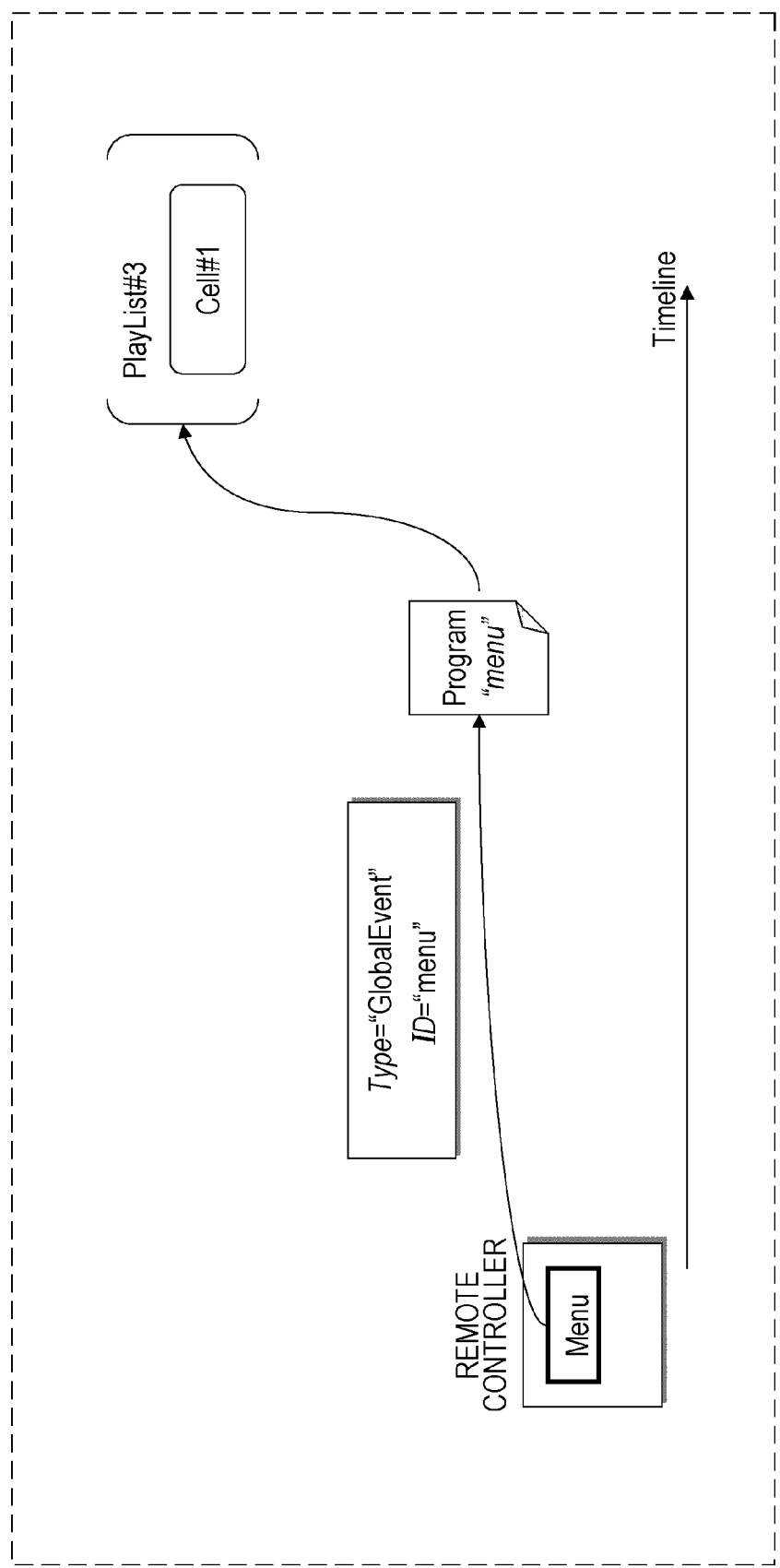
FIG. 22 is a diagram illustrating an example of a global event.

FIG. 22 is a diagram illustrating an example of a global event. As described earlier, a global event is defined in the event list (EventList) in the overall BD-ROM information ("BD.INFO"). An event defined as a global event, i.e., an event of which the event type (Type) is "GlobalEvent", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist #3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

Figure 23:
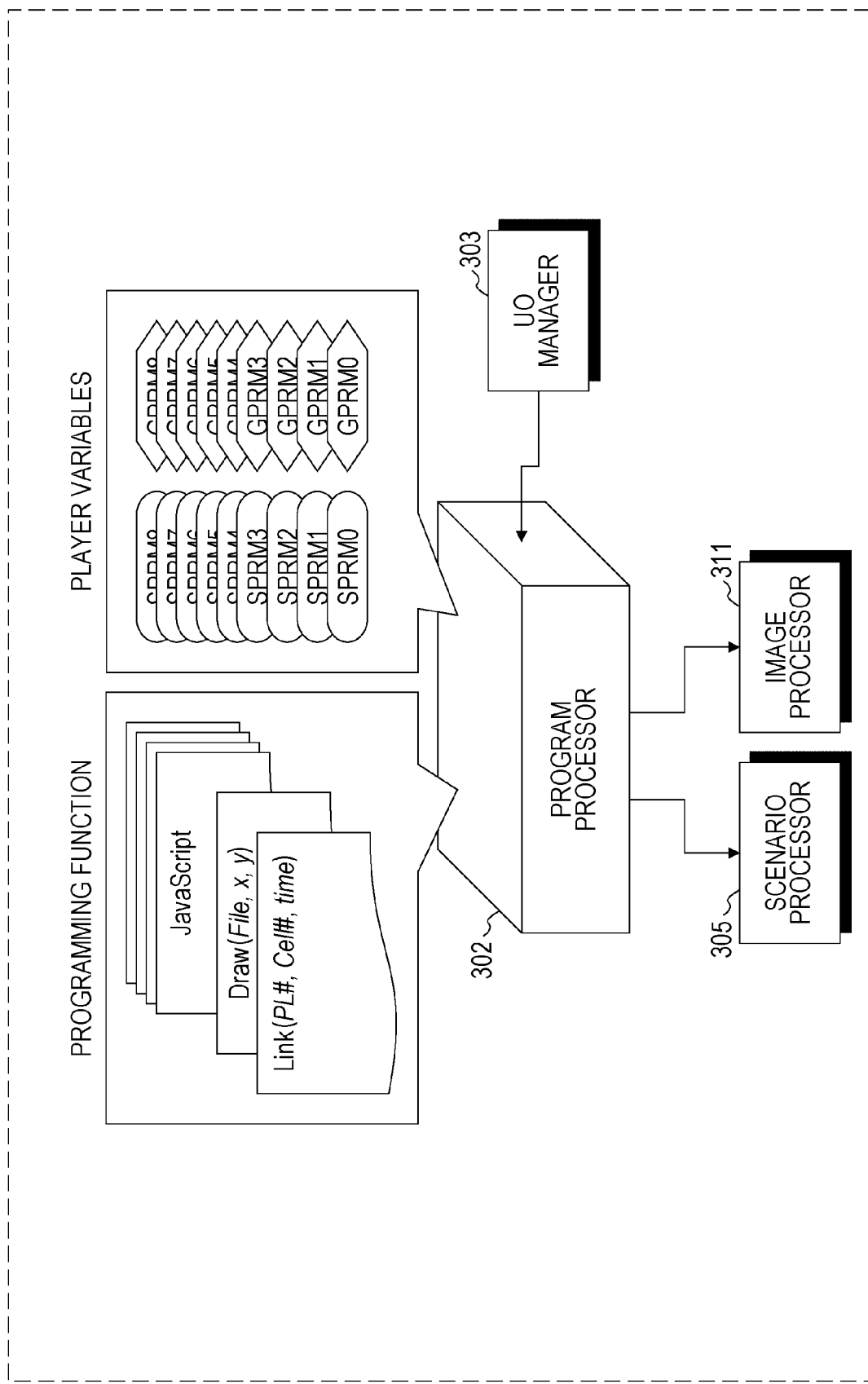
FIG. 23 is a diagram for describing the functional configuration of a program processor.

FIG. 23 is a diagram for describing the functional configuration of the program processor 302. The functional configuration of the program processor 302 will be described with reference to FIG. 23. The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programming functions and player variables. The player variables are stored and held in a register. The programming functions are based on JavaScript (registered trademark), and the following three functions are defined as BD-ROM-unique functions Link function: Stops the current playback, and starts playback from specified playlist, cell, and time.

Link (PL #, Cell #, time)
PL #: playlist name
Cell #: cell No.
Time: time in cell to start playback PNG drawing function: Draws specified PNG data on image plane 209.

Draw (File, X, Y)
File: PNG filename
X: X coordinate position
Y: Y coordinate position Image plane clear function: Clears specified region of image plane 209.

Clear (X, Y, W, H)
X: X coordinate position
Y: Y coordinate position
W: width in X direction
H: width in Y direction The player variables include system parameters (SPRM) indicating setting values and so forth of the player, and general parameters (GPRM) usable in general uses.

FIG. 24 is a diagram illustrating a list of system parameters (SPRM).

SPRM(0): Language code
SPRM(1): Audio stream No.
SPRM(2): Subtitle stream No.
SPRM(3): Angle No.
SPRM(4): Title No.
SPRM(5): Chapter No.
SPRM(6): Program No.
SPRM(7): Cell No.
SPRM(8): Selected key information
SPRM(9): Navigation timer
SPRM(10): playback time information
SPRM(11): Mixing mode for karaoke
SPRM(12): Country information for parental
SPRM(13): Parental level
SPRM(14): Player setting value (video)
SPRM(15): Player setting value (audio)
SPRM(16): Language code for audio stream
SPRM(17): Language code for audio stream (extended)
SPRM(18): Language code for subtitle stream
SPRM(19): Language code for subtitle stream (extended)
SPRM(20): Player region code
SPRM(21): reserved
SPRM(22): reserved
SPRM(23): Playback state
SPRM(24): reserved
SPRM(25): reserved
SPRM(26): reserved
SPRM(27): reserved
SPRM(28): reserved
SPRM(29): reserved
SPRM(30): reserved
SPRM(31): reserved Note that in the present embodiment, the programming functions of the virtual player have been described as being based on JavaScript (registered trademark), Other programming functions may be used, such as B-Shell used in UNIX (registered trademark) OS or the like, Perl Script, and so forth, instead of JavaScript (registered trademark). In other words, the programming language in the present disclosure is not restricted to JavaScript (registered trademark).

Example of Program

Figure 25:
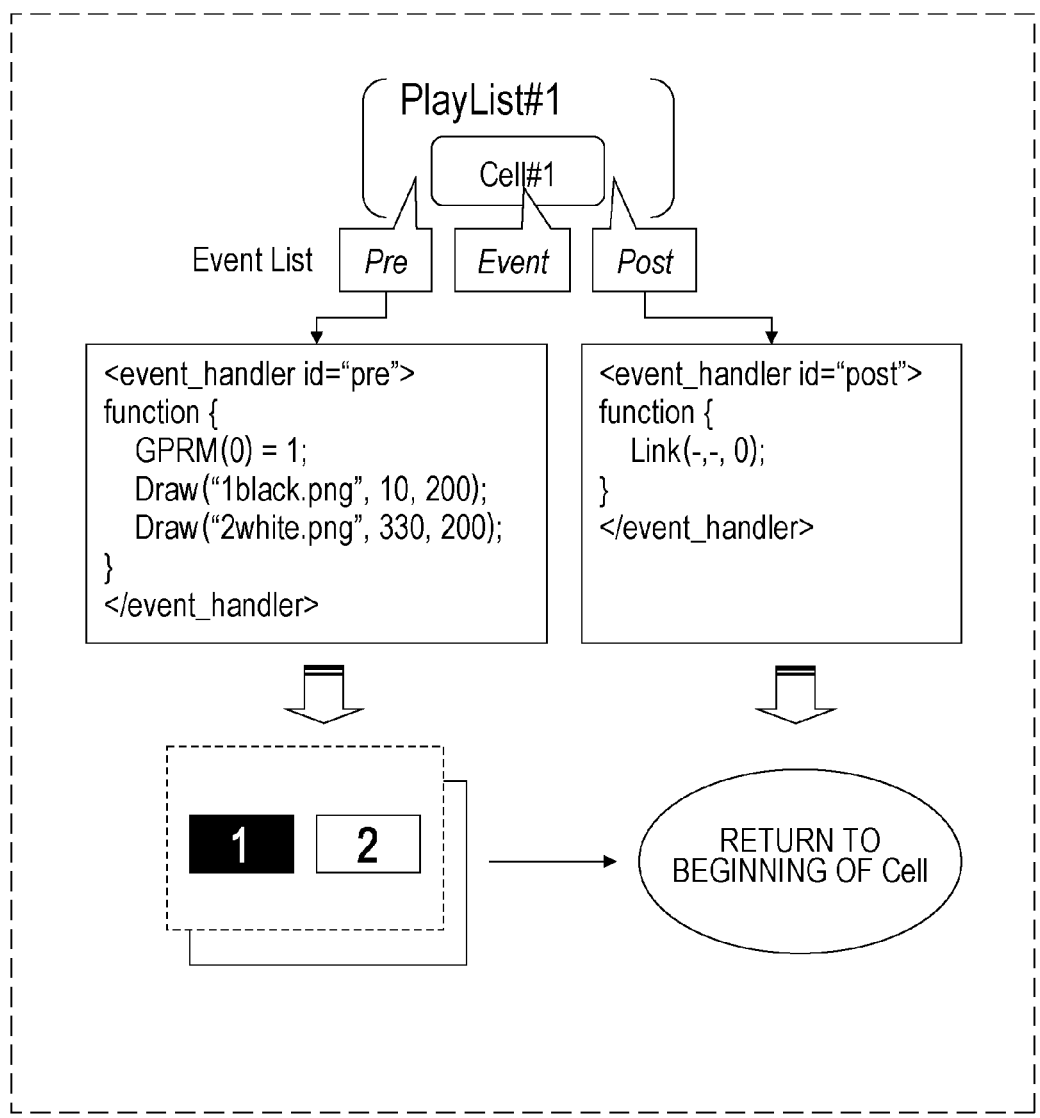
FIG. 25 is a diagram illustrating an example of a program in an event handler according to control of a menu screen having two selection buttons.
Figure 26:
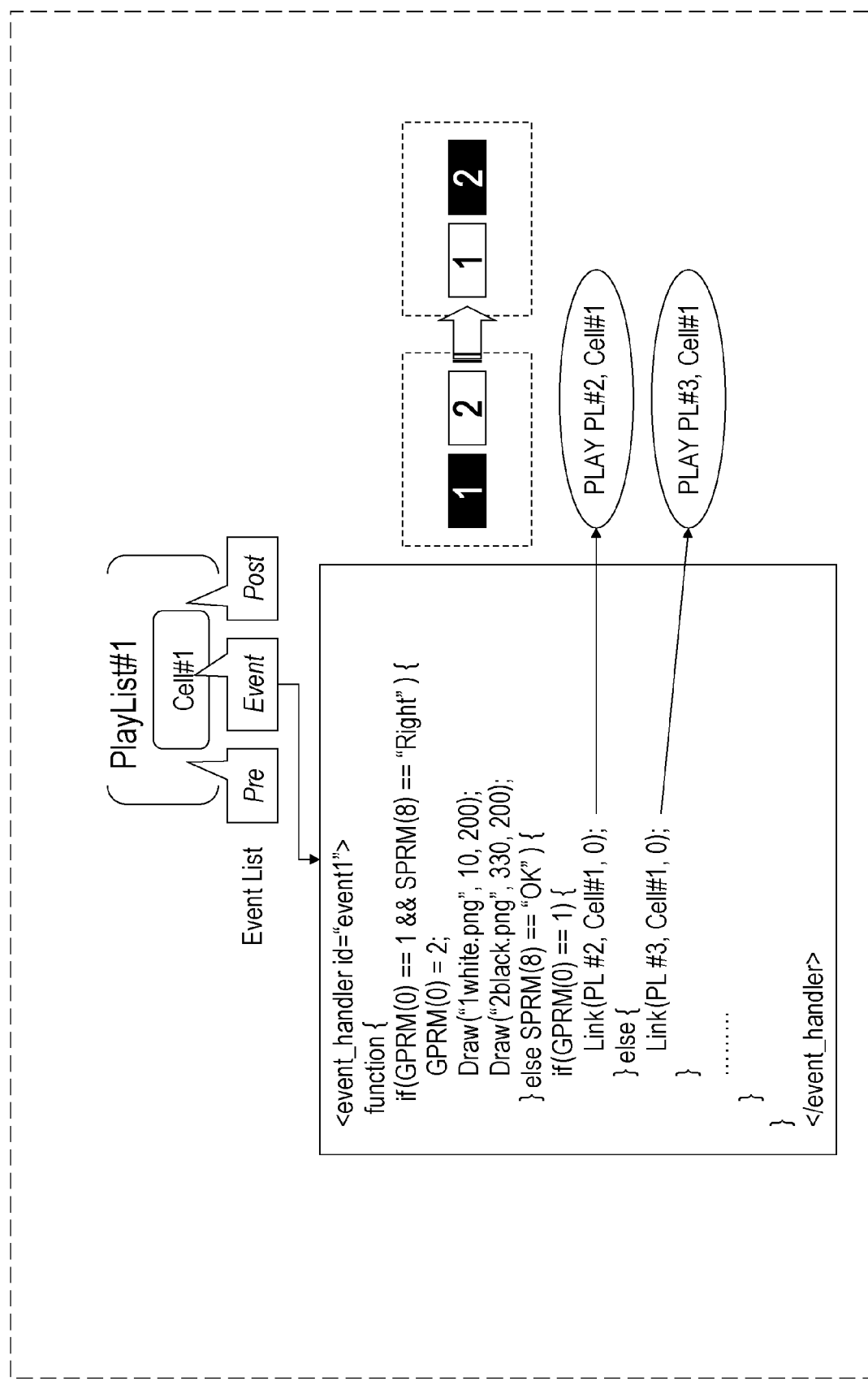
FIG. 26 is a diagram illustrating an example of a program in an event handler relating to a menu selection user event.

FIGS. 25 and 26 are diagrams illustrating an example of a program in the event handler. FIG. 25 is a diagram illustrating an example of a program in an event handler according to control of a menu screen having two selection buttons.

The program to the left side in FIG. 25 is executed using a time event at the beginning of cell (PlayList #1.Cell #1). "1" is set to GPRM(0) here first, which is one of the general parameters. GPRM(0) is used in this program to identify a button that is selected. A state where the button [1] situated on the left side has been selected is held as the initial state.

Next, drawing of a PNG is performed for each of button [1] and button [2] using "Draw", which is a drawing function. The button [1] is drawn as a PNG image "1black.png" with coordinates (10, 200) as the origin (upper left end). The button [2] is drawn as a PNG image "2white.png" with coordinates (330, 200) as the origin (upper left end).

At the end of this cell, the program to the right side in FIG. 25 is executed using a time event. A Link function is used here to instruct playing again from the beginning of this cell.

FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.

The following branching processing is performed by this event handler, using the value of GPRM(0) identifying the selected button, and SPRM(8) identifying the selected remote controller key.

Condition 1) Case where button[1] is selected, and the selected key is "right" key GPRM(0) is reset to 2, and the button in the selected state is changed to the button[2] at the right. The images of each of button[1] and button[2] are rewritten.

Condition 2) Case where the selected key is "OK" key, and button[1] is selected Playback of playlist #2 is started.

Condition 3) Case where the selected key is "OK" key, and button[2] is selected Playback of playlist #3 is started.

The program illustrated in FIG. 26 is interpreted and executed as described above.

Player Processing Flow

Figure 27:
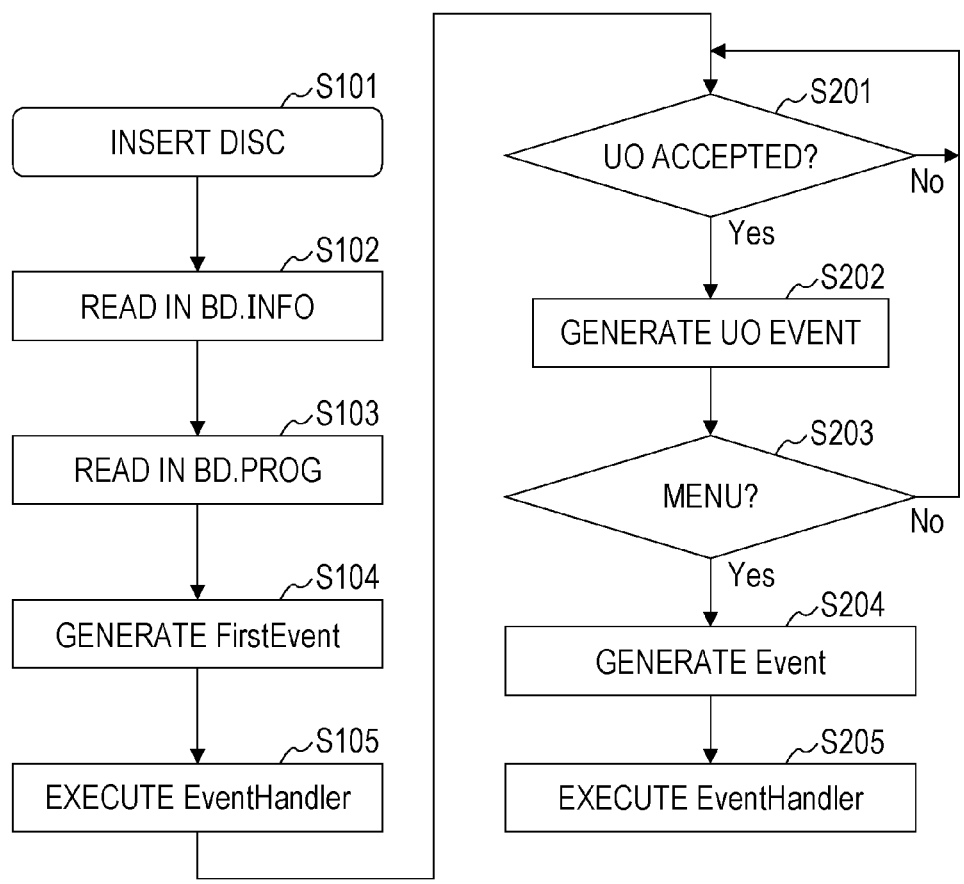
FIG. 27 is a flowchart illustrating the flow of basic processing for playback of AV data in a BD-ROM player.

The flow of processing at the player will be described with reference to FIGS. 27 through 30. FIG. 27 is a flowchart illustrating the basic flow of playback of AV data in a BD-ROM player. Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.

Next, the scenario processor 305 generates the first event, in accordance with the first event (FirstEvent) information in the "BD.INFO" file (S104). The generated first event is received by the program processor 302, which executes the event handler corresponding to this event (S105).

It is expected that the event handler corresponding to the first event will have recorded therein information specifying a playlist to play first. If no playlist to play first is instructed, the player has nothing to play, and simply awaits a user event to accept (No in S201).

Upon receiving a remote controller operation from the user (Yes in S201), the UO manager 303 generates a UO event for the program processor 302 (S202).

The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
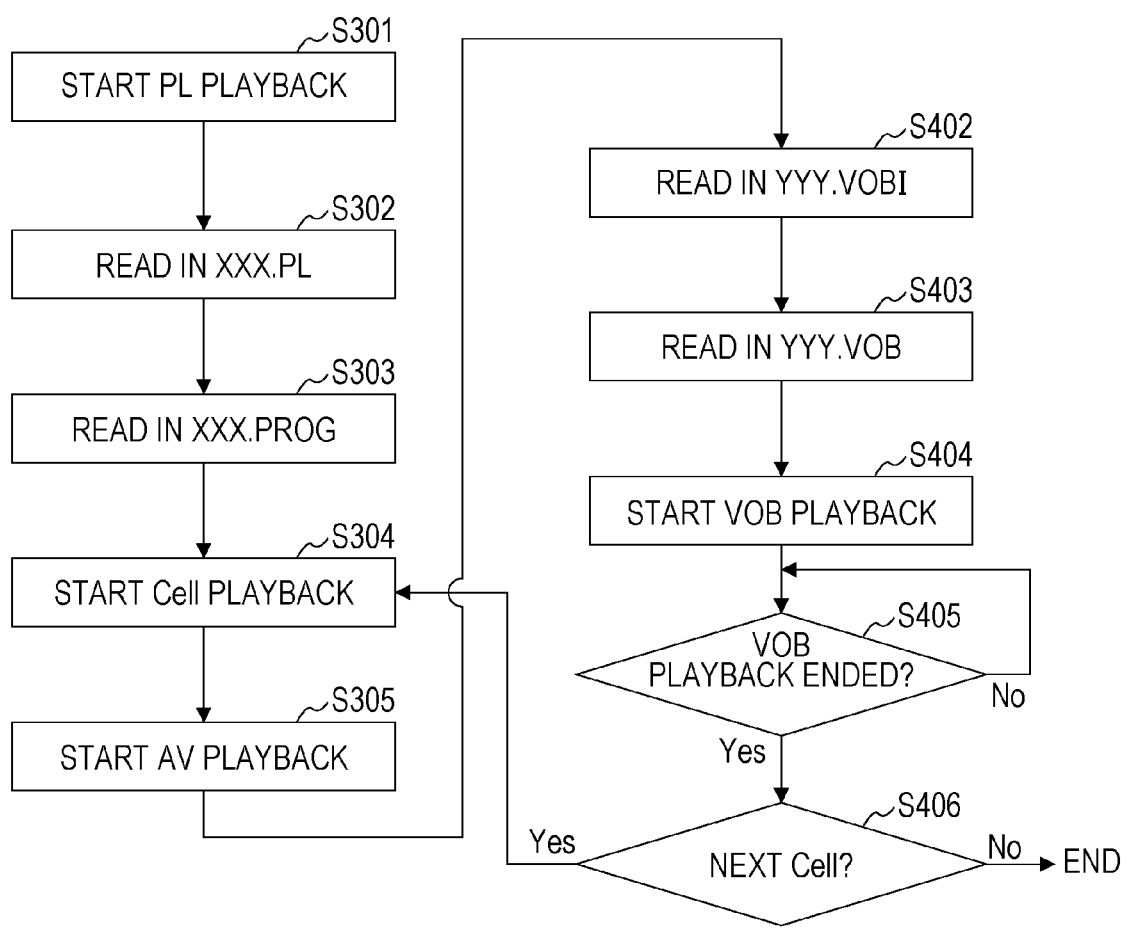
FIG. 28 is a flowchart illustrating the flow of processing in a BD-ROM player from starting to play a playlist until ending playing of the VOB.
Figure 29:
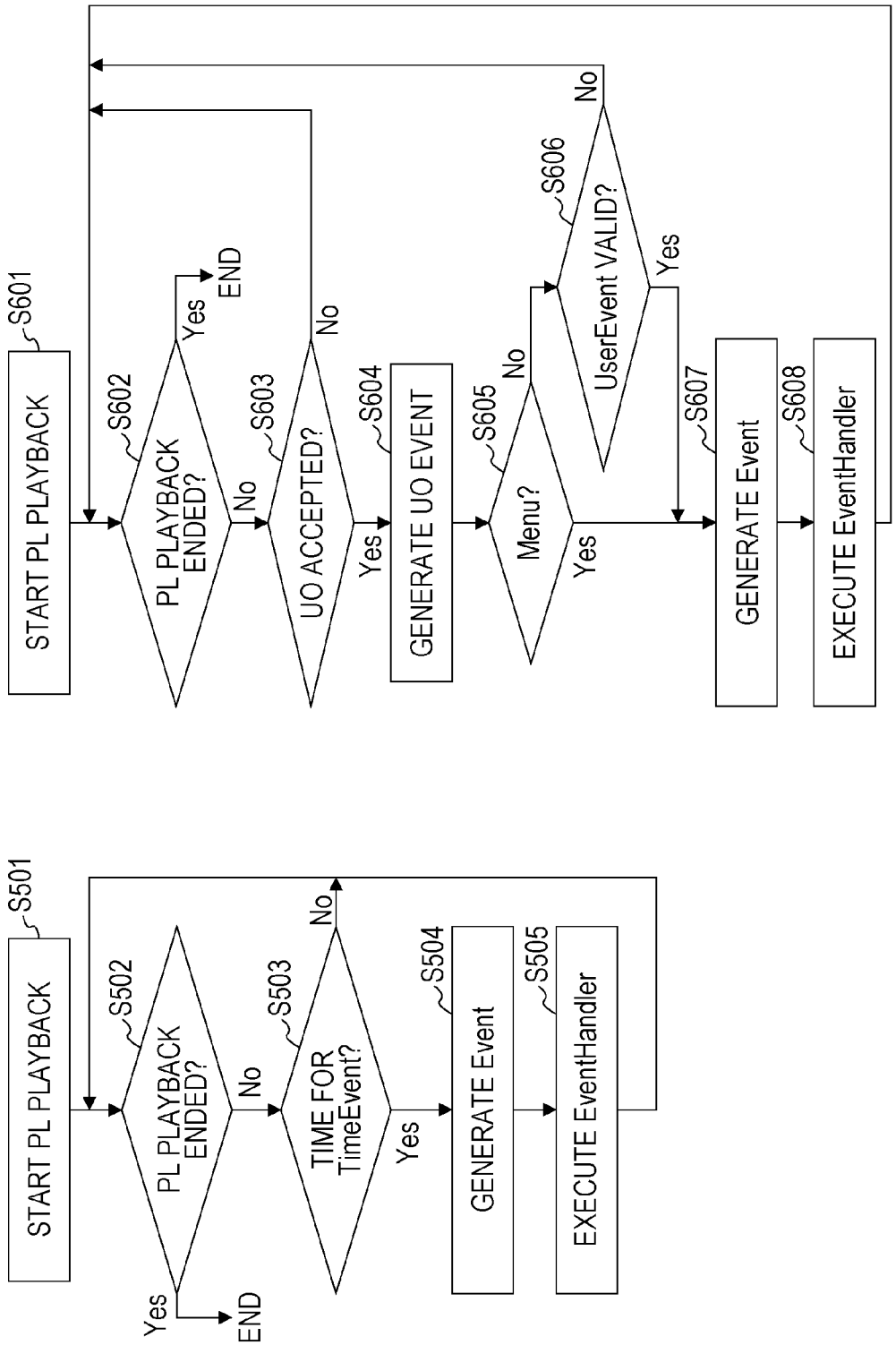
FIGS. 29A and 29B are flowcharts, where

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX.PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor 305 to the presentation controller 306, and the presentation controller 306 starts AV data playback (S305).

Once playback of AV data is started, the presentation controller 306 reads in the VOB information file "YYY.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

FIGS. 29A and 29B are flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of playlist playback is started at the BD-ROM player (S501), confirmation is made that playlist playback has not ended (S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of playlist playback is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

Figure 30:
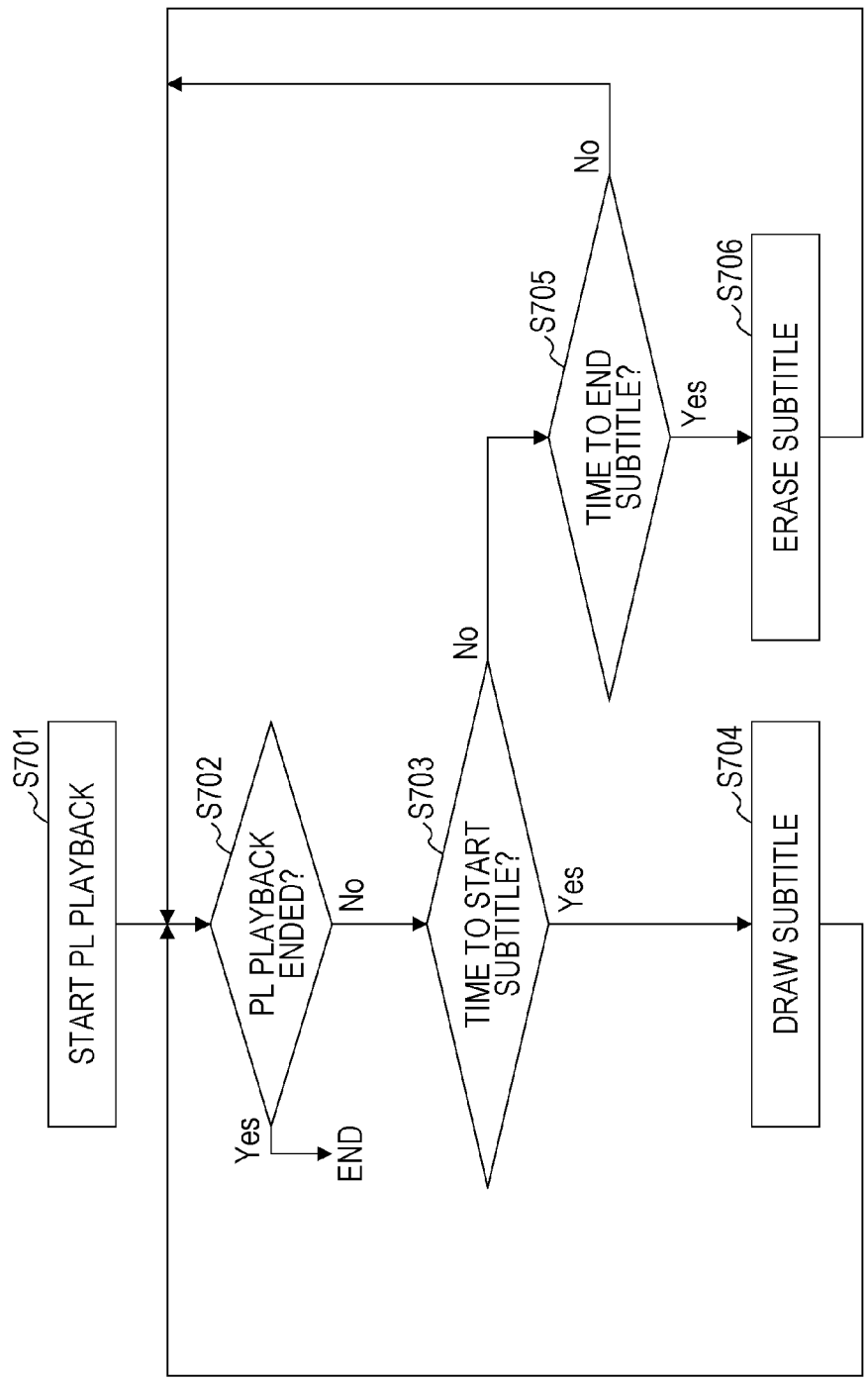
FIG. 30 is a flowchart illustrating the flow of processing subtitle data in a BD-ROM player.

FIG. 30 is a flowchart illustrating the flow of processing of subtitle data in the BD-ROM player. When playback of playlist playback is started at the BD-ROM player (S701), confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn, in accordance with the instruction (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment of the present disclosure will be described. The second embodiment is content relating to recording or playing high-luminance (HDR: High Dynamic Range) video information with a BD. The second embodiment is basically based on the first embodiment, so the following description will be made primarily with regard to portions that are expanded in the second embodiment or portions that are different.

Figure 31A:
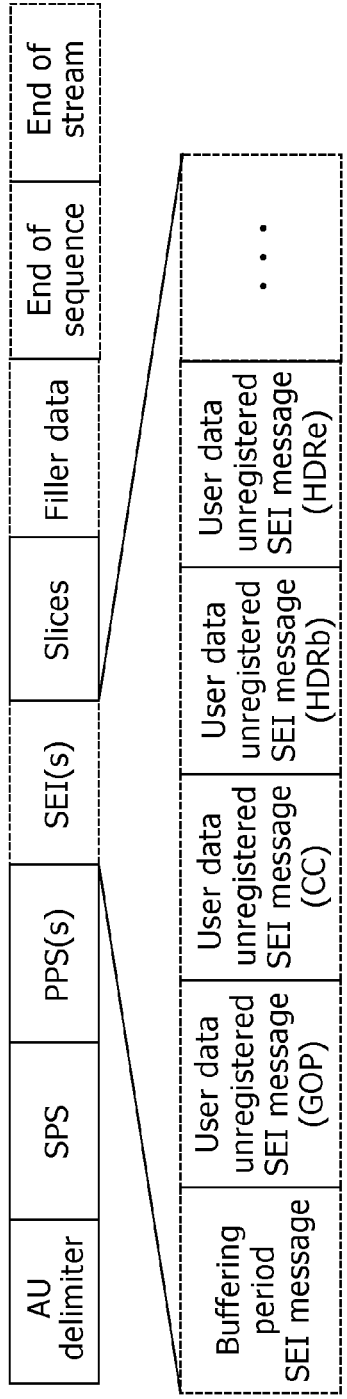
FIGS. 31A and 31B are diagrams describing the arrays of NAL units.
Figure 31B:
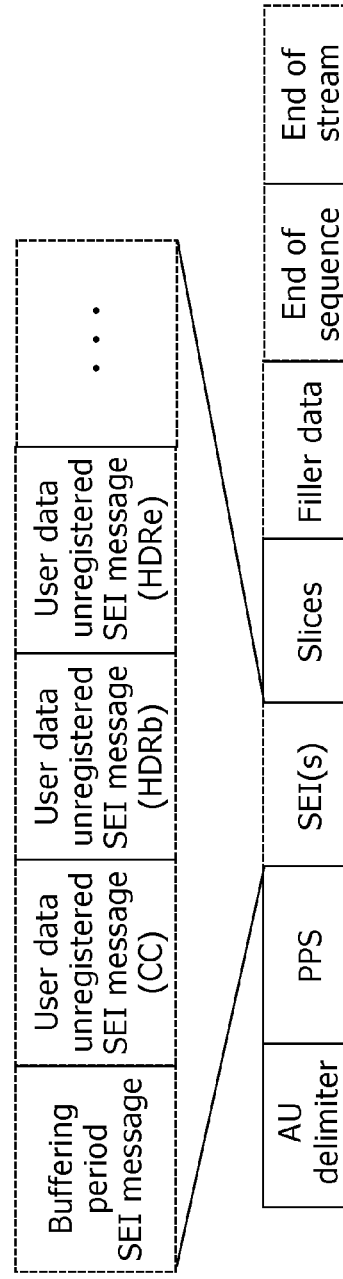

FIGS. 31A and 31B illustrate a method of sending high-luminance metadata using a video encoding format such as MPEG-4 AVC (also known as H264) or HEVC (also known as H265). Here, a unit made up of a picture reference configuration equivalent to a Group Of Pictures (GOP) used to improve random accessibility in MPEG-2 Video is used as a GOP in MPEG-4 AVC or HEVC, thereby encoding multiple pictures that have been grouped.

FIG. 31A indicates the encoding order of multiple Network Abstraction Layer (NAL) units in the first picture (first access unit) in the GOP. In the first picture in the GOP, there is a run of NALs of each of one AU delimiter, one SPS, one or more PPS, 0 or multiple SEI messages, and one or more Slices making up the picture, followed if necessary by the NALs of Filler data, End of sequence, and End of stream.

In the SEI message (SEI(s)), Buffering period SEI message is followed by several other SEI messages if necessary. For example, several SEI messages including (1) a User data unregistered SEI message (GOP) indicating the reference relationship of pictures within this GOP, (2) a User data unregistered SEI message (CC) indicating the Closed Captioning information of this picture, (3) a User data unregistered SEI message (HDRb) including standard and static high-luminance metadata indicating the luminesce range such as the maximum luminance or minimum luminance in all of the pictures in this video sequence (VOB), (4) a User data unregistered SEI message (HDRe) including dynamic high-luminance metadata that is more detailed than the SEI message (HDRb), so as to indicate the luminesce range such as the maximum luminance or minimum luminance in all of the pictures in this picture or GOP, and so forth, are encoded in this order.

The aforementioned SEI message (HDRb) or SEI message (HDRe) is transmitted along with the video information. This is to transmit information relating to luminesce used at the time of mastering, and to give information regarding actually what level of brightness ($cd/m^2$) the luminesce value (Y) for each pixel obtained after the video information is decoded.

For example, the SEI message (HDRb) or SEI message (HDRe) include correlation information between luminance that the pixels have and luminesce at the time of mastering, such as, upon having decoded the video, the luminance of a pixel having a luminesce value (Y) or 1000 was 5000 $cd/m^2$ when mastering. In a case where the maximum luminance ($cd/m^2$) that can be expressed by a TV connected to the player is acquired, information for changing the dynamic range of the entire picture in the luminesce direction may be carried by the aforementioned SEI message (HDRb) or SEI message (HDRe).

The SEI message (HDRb) is an SEI message transmitted in increments of pictures or increments of GOPs to indicate an HDR video sequence, and transmits information relating to static luminance information of the overall video sequence (VOB). An HDR video sequence as used here means a video sequence where a SEI message (HDRb) is recorded.

The SEI message (HDRe) that transmits information relating to dynamic luminesce that is more detailed does not have to be recorded in the HDR video sequence, and an HDR video sequence does not have to have even one therein. In a case where an SEI message (HDRe) exists, it is always an SEI message encoded immediately after an SEI message (HDRb), transmitting information relating to luminance in increments of pictures or increments of GOPs.

FIG. 31B illustrates the encoding order of multiple NAL units in a picture other than the first picture in the GOP (non-first access unit). In a picture that is not the first picture in the GOP, There is a run of NALs of each of one AU delimiter, 0 or one PPS, 0 or multiple SEI messages, and one or more Slices making up the picture, followed if necessary by the NALs of Filler data, End of sequence, and End of stream.

The SEI message (HDRb) or SEI message (HDRe) each store the above information, and is given to each picture according to the method illustrated in FIGS. 31A and 31B. In a case of transmitting information relating to luminesce in increments of GOPs, the SEI message (HDRb) and SEI message (HDRe) are both only given to the first picture in the GOP, and are not given to pictures that are not the first in the GOP at all.

Figure 32:
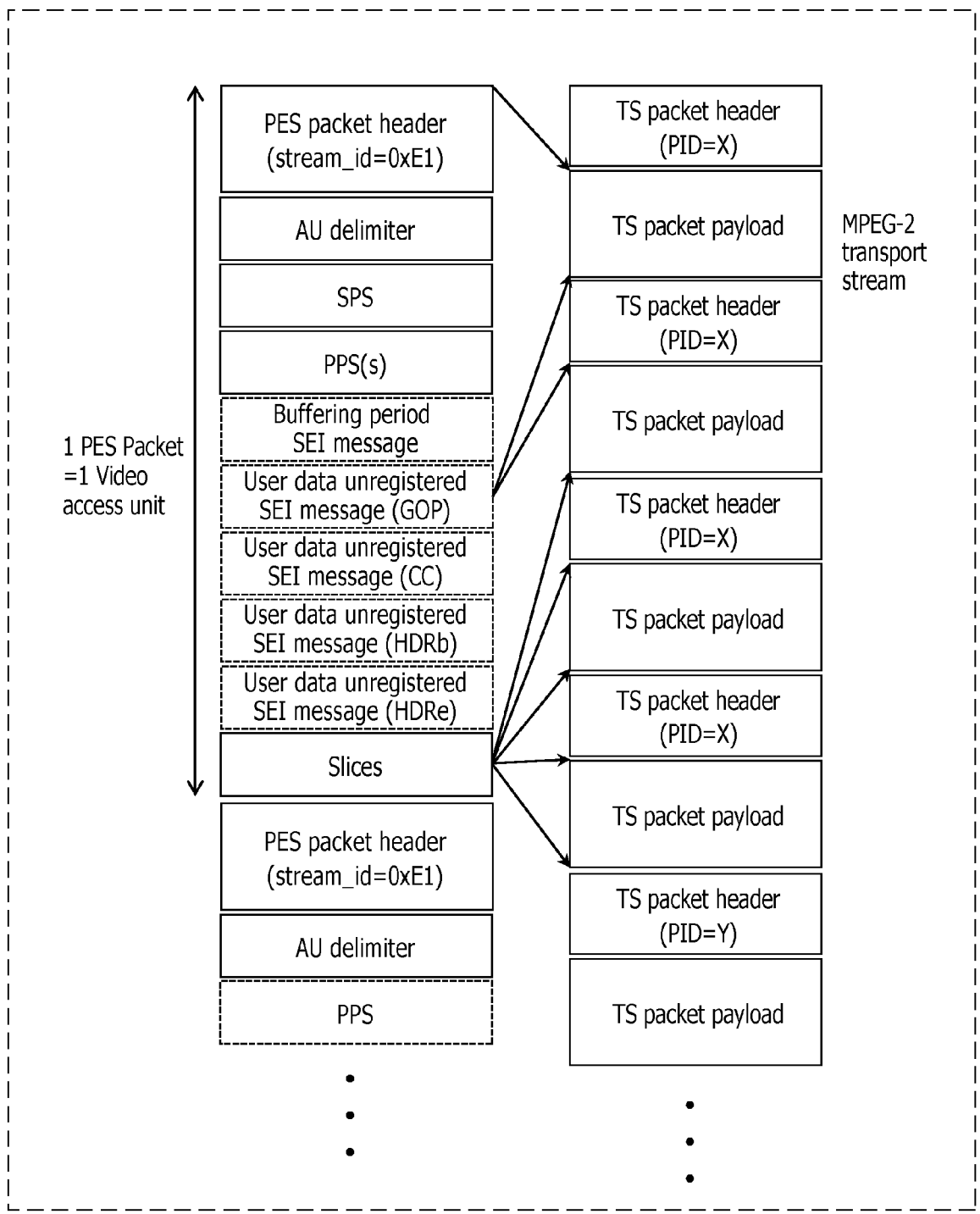
FIG. 32 is a diagram for describing an example of MPEG-2 TS multiplexing of an HDR video stream.

FIG. 32 is a diagram illustrating a method of multiplexing an HDR stream including up to an SEI message (HDRe) by MPEG-2 TS. Note that in the present embodiment, the term sequence may mean the same as a stream, or may be part of a stream. After storing one picture (one frame or one video access unit) in one packetized elementary stream (PES) packet to put the HDR video stream into a PES, data in the PES packets are divided and stored in order in the payload of packet identifier (PID)=X TS packets.

In the case of the method illustrated in FIG. 32, the HDR video sequence including up to the SEI message (HDRe) which is the PES packets of stream_id=0xE1 is divided and stored in order in the TS packets of the same PID (PID=X). Note that in a case of transmitting information of the SEI message (HDRe) at the time of outputting an HDR video sequence by HDMI (registered copyright) as in the method illustrated in FIG. 32, there are cases where the processing for searching for the SEI message (HDRe) from the entire video sequence may become sluggish.

Figure 33:
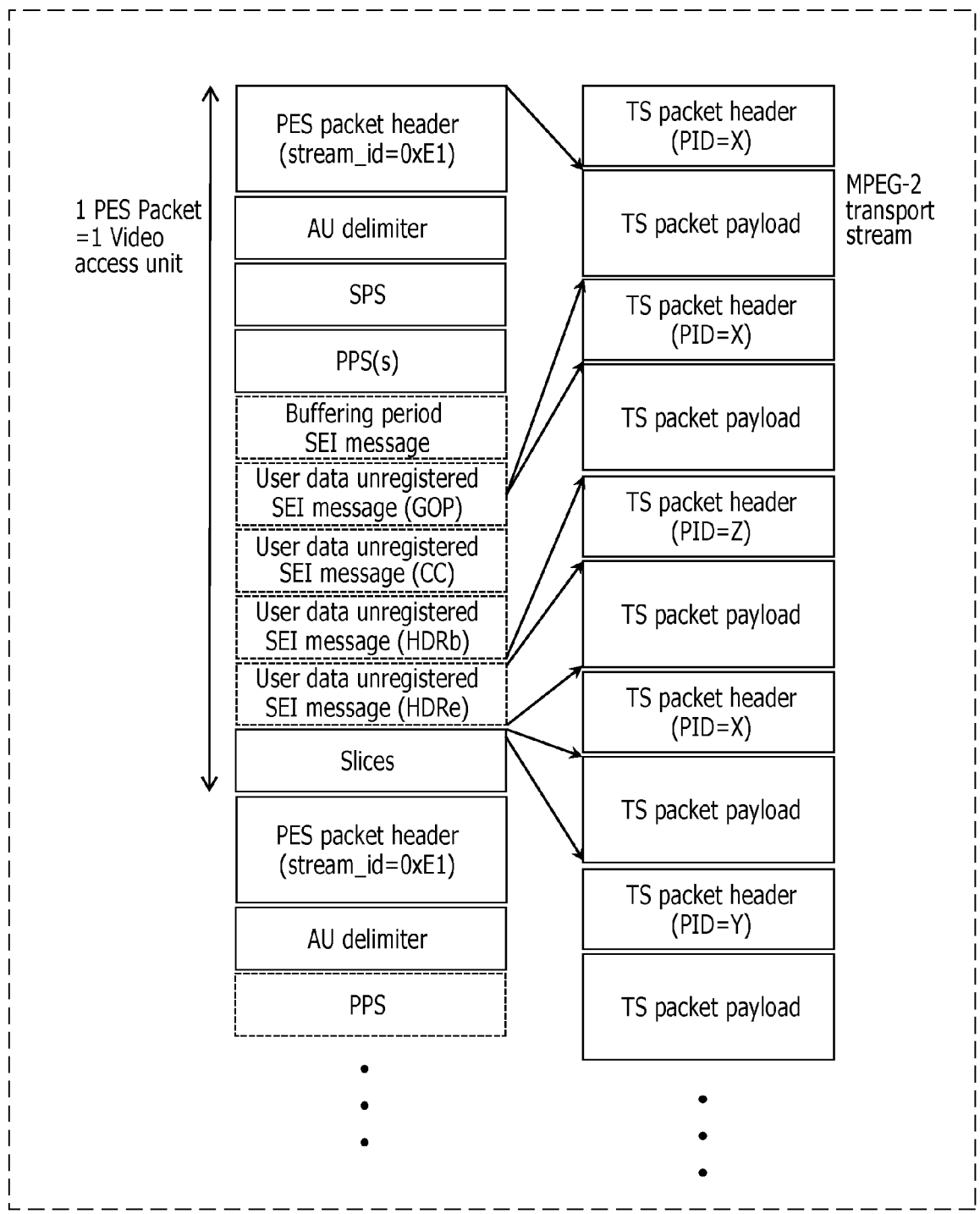
FIG. 33 is a diagram for describing an example of MPEG-2 TS multiplexing of an HDR video stream.

FIG. 33 is a diagram for describing another method for multiplexing an HDR video stream including up to an SEI message (HDRe) by MPEG-2 TS. One picture (one frame or one video access unit) is stored in one PES packet, to put the HDR video stream into a PES, and data in the PES packets is divided and stored in order in the payloads of the TS packets of both PID=X and Z.

In the case of the method illustrated in FIG. 33, the HDR video sequence which is the PES packets of stream_id=0xE1 is divided and stored in order in the TS packets of PID=X, and just the SEI message (HDRe) is stored alone in the TS packet of PID=Z. When the SEI message (HDRe) information is transmitted, only the SEI message (HDRe) is stored in the TS packet where PID=Z, as in the method illustrated in FIG. 33. Accordingly, the processing for searching for the SEI message (HDRe) is light.

Decoding just the HDR video sequence transmitted by TS packets of PID=X is easy. However, in order to perform even higher luminance video playback including up to the SEI message (HDRe) needs additional processing of transmitting the TS packets of both PID=X and Z to the same transport buffer (TB, an upstream buffer used in the T-STD model of the MPEG-2 system).

Figure 34:
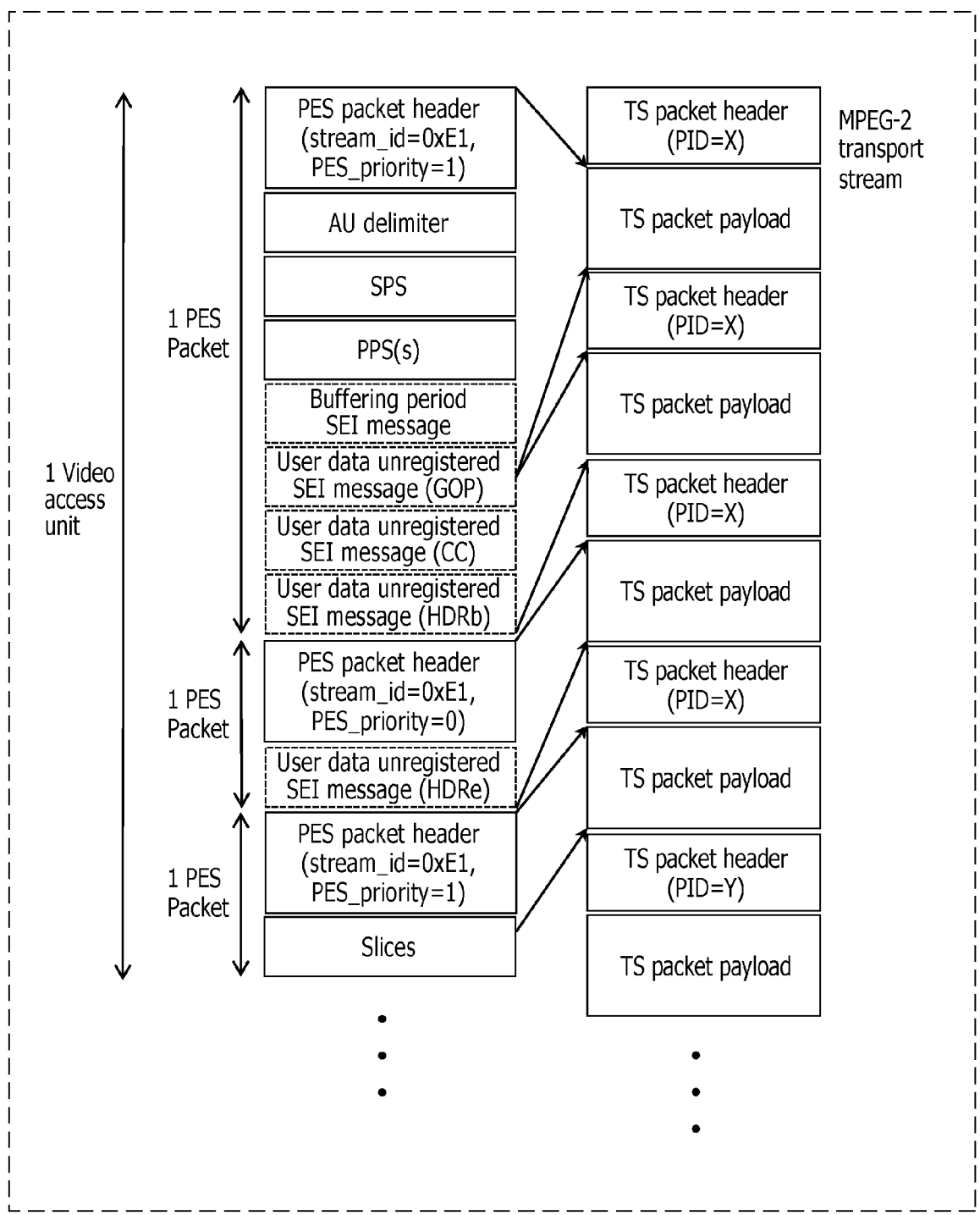
FIG. 34 is a diagram for describing an example of MPEG-2 TS multiplexing of an HDR video stream.

FIG. 34 is a diagram for describing another method for multiplexing an HDR video stream including up to an SEI message (HDRe) by MPEG-2 TS. One picture (one frame or one video access unit) is divided and stored in each of three PES packets, to put the video stream into a PES. Thereafter, each of the three PES packets are divided as necessary, and stored in order in the payload of the TS packets of PID=X.

In the case of the method illustrated in FIG. 34, the HDR video sequence which is two PES packets of stream_id=0xE1 is stored in the TS packets of PID=X. Just the SEI message (HDRe) is stored alone in a TS packet of the same PID=X in the same stream_id=0xE1 but as a PES packet where PES_priority=0.

At the time of outputting HDR video by HDMI (registered trademark), upon the information of the SEI message (HDRe) being transmitted according to the method illustrated in FIG. 34, the PES packet where stream_id=0xE1 and PES_priority=0 is searched from each TS packet of PID=X. Accordingly, the processing for searching for the SEI message (HDRe) is not as light as the method illustrated in FIG. 33.

However, there is little difference between decoding just the HDR video sequence transmitted by TS packets of PID=X and decoding not only the HDR video sequence but the SEI message (HDRe) included as well, so the method illustrated in FIG. 34 is realizable.

Note that the PES_priority value does not have to be this combination; the same effect can be yielded by an arrangement where only the PES packet storing the SEI message (HDRe) has a value of PES_priority=1.

Figure 35:
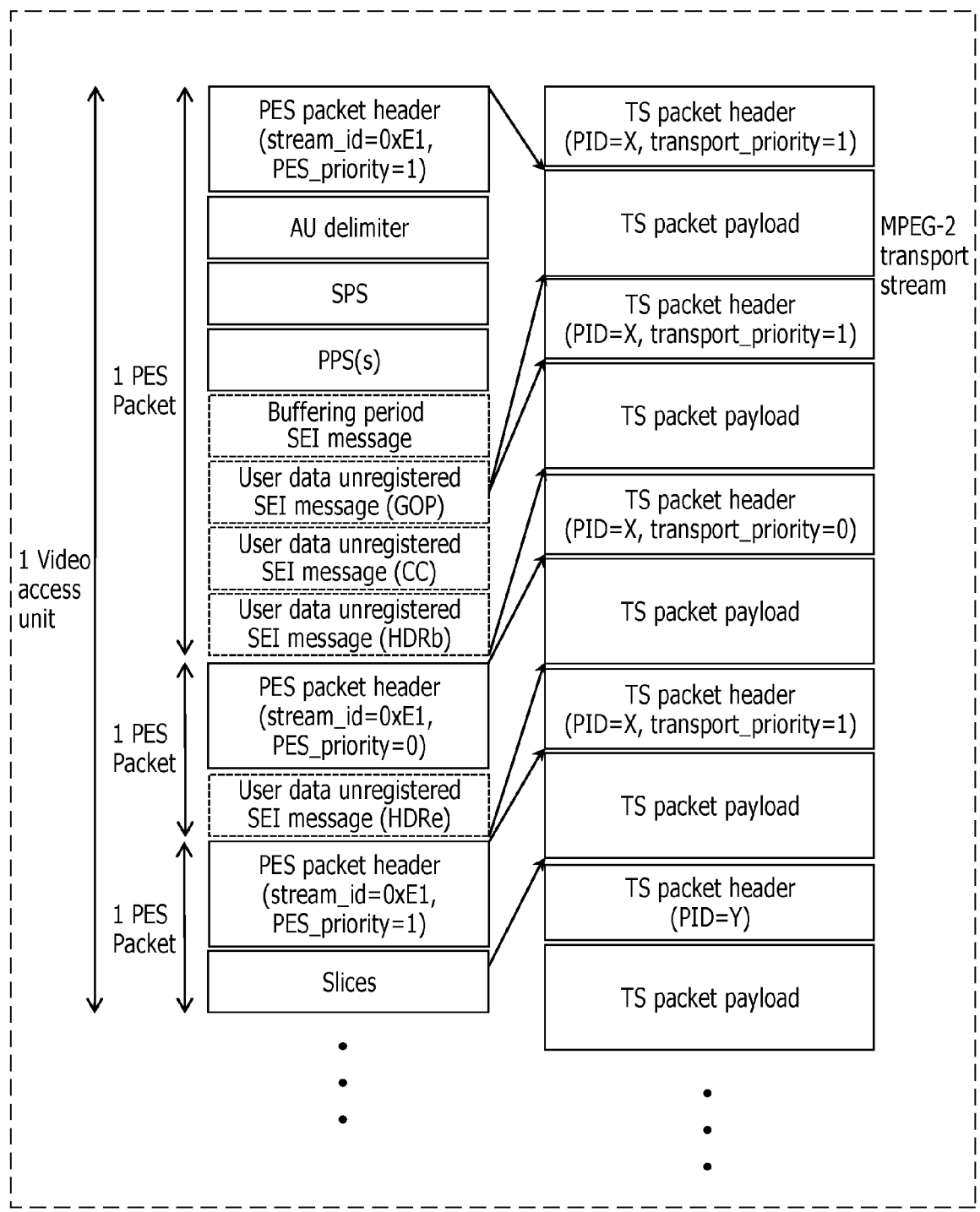
FIG. 35 is a diagram for describing an example of MPEG-2 TS multiplexing of an HDR video stream.

FIG. 35 is a diagram for describing another method for multiplexing an HDR stream including up to an SEI message (HDRe) by MPEG-2 TS. The difference as to the method illustrated in FIG. 34 is that the transport_priority of the TS packet storing the PES packet containing the SEI message (HDRe) is 0 in the method illustrated in FIG. 35.

At the time of outputting HDR video by HDMI (registered trademark), upon the information of the SEI message (HDRe) being transmitted according to the method illustrated in FIG. 35, the SEI message (HDRe) is analyzed from the TS packet where PID=X and transport_priority=0. Accordingly, the amount of processing to search for the SEI message (HDRe) is light in the same way as the method illustrated in FIG. 33, so the method illustrated in FIG. 35 is realizable.

Also, in this case, there is little difference between decoding just the HDR video sequence and decoding not only the HDR video sequence but also the SEI message (HDRe) included as well, so the method illustrated in FIG. 35 is realizable. For example, the PID demultiplexer of the TS decoder separates the stream based on the transport_priority value. Accordingly, a decoder that is not compatible with SEI message (HDRe) and makes the video high-luminance using information up to the SEI message (HDRb) can easily discard the TS packet including the SEI message (HDRe) by the aforementioned PID demultiplexer.

Note that the transport_priority value does not have to be this combination; the same effect can be yielded by an arrangement where only the TS packet storing the SEI message (HDRe) has a value of transport_priority=1.

Figure 36:
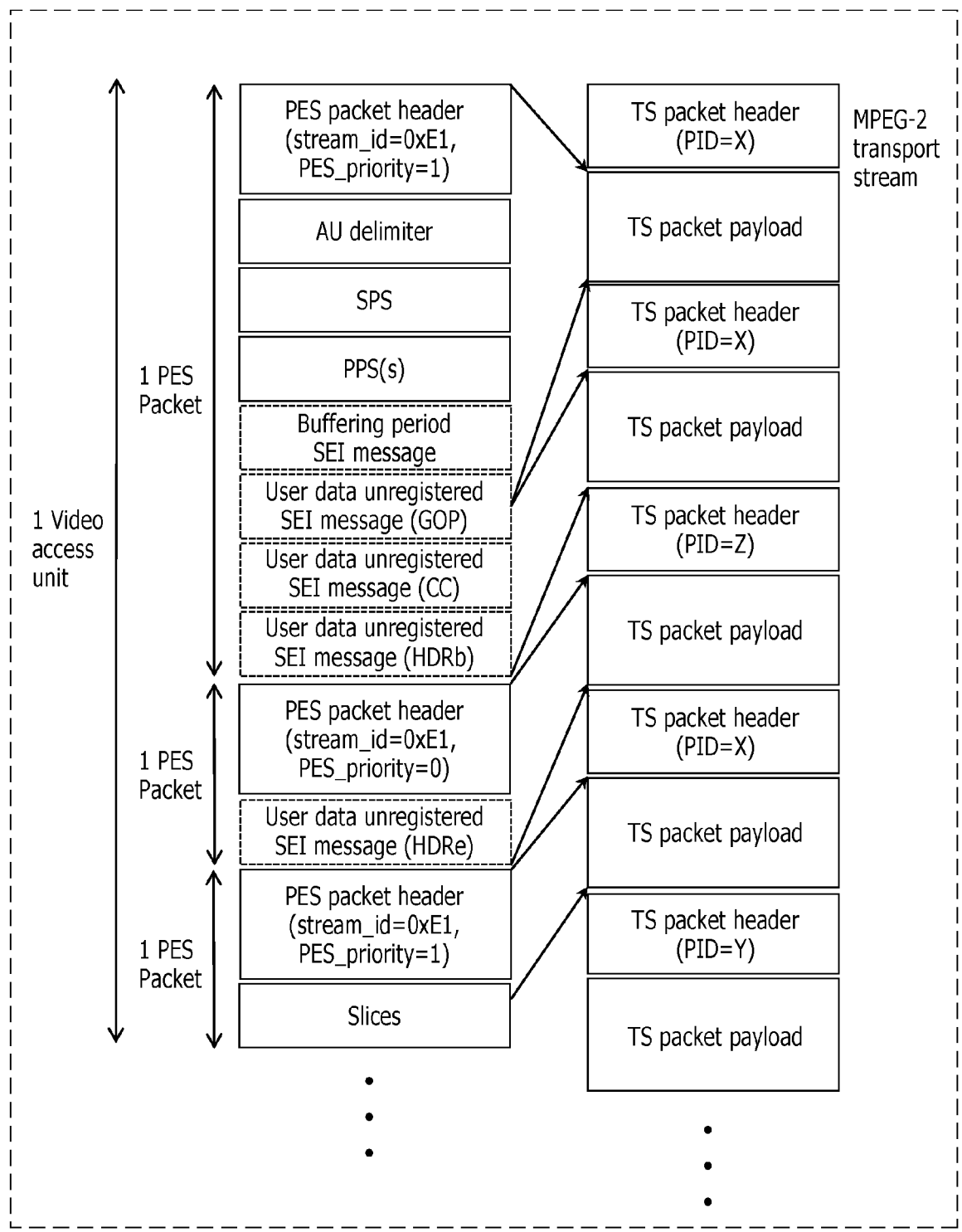
FIG. 36 is a diagram for describing an example of MPEG-2 TS multiplexing of an HDR video stream.

FIG. 36 is a diagram for describing another method for multiplexing an HDR stream including up to an SEI message (HDRe) by MPEG-2 TS. The method illustrated in FIG. 36 uses two types of PID as in the method illustrated in FIG. 33, and configures the PES packets as in the method illustrated in FIGS. 34 and 35. This method illustrated in FIG. 36 has both the same advantages and disadvantages as the method illustrated in FIG. 33.

Figure 37:
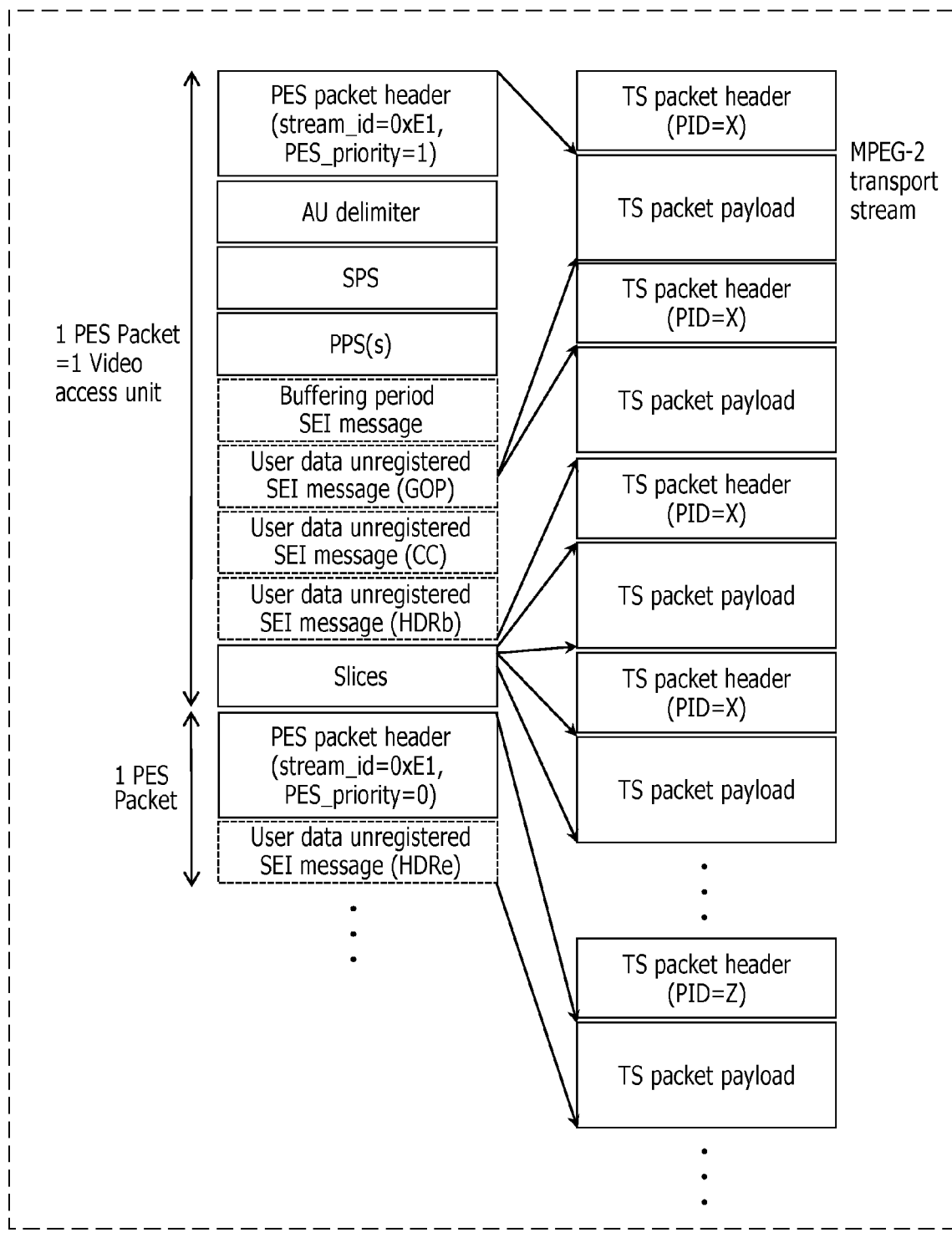
FIG. 37 is a diagram for describing an example of MPEG-2 TS multiplexing of an HDR video stream.

FIG. 37 is a diagram for describing another method for multiplexing an HDR stream including up to an SEI message (HDRe) by MPEG-2 TS. The method illustrated in FIG. 37 stores the SEI message (HDRe) in a PES packet where PES_priority=0, which is a separate PES packet from the PES packet storing the SEI message (HDRb) and so forth. After storing of the slice NAL units, the PES packet where PES_priority=0 is multiplexed at another TS packet where PID=Z, separate from the TS packet where PID=X. The position of multiplexing of the SEI message (HDRe) is immediately after the picture data. Accordingly, the method illustrated in FIG. 37 stores the HDR video sequence up to the SEI message (HDRb) in one PES packet. Other than this point, the method illustrated in FIG. 37 has both the same advantages and disadvantages as the method illustrated in FIG. 33.

Figure 38:
FIG. 38 is a diagram for describing an example of MPEG-2 TS multiplexing of an HDR video stream.

FIG. 38 is a diagram for describing a method for multiplexing an enhanced video sequence, which is a different video sequence from an HDR video sequence, by MPEG-2 TS, instead of an SEI message (HDRe). The method illustrated in FIG. 38 transmits an enhanced video sequence (Enhancement layer video sequence) as enhancement video information regarding an HDR video sequence (Base layer video sequence with user data unregistered SEI message (HDRb)), instead of transmitting high-luminance enhancement metadata by SEI message (HDRe).

For example, an enhanced picture of Enhancement frame PES # n included in the enhanced video sequence is added to the base picture of Base frame PES # n included in the above-described video sequence. Accordingly, high-luminance enhancement of the HDE video sequence can be performed more accurately while using even more data than the SEI message. Now, corresponding pictures may be correlated with each other by having the same PTS. For example, correlation indicating that "PTS # b1 of base picture"="PTS # e1 of enhanced picture" is illustrated.

The above-described base video sequence and enhanced video sequence are multiplied in the MPEG-2 TS as two entirely different video sequences in PES packets with different PIDs.

In order to correctly specify the pair of the base video sequence and enhanced video sequence, the program map table (PMT) packet may express the pair using descriptor( ). For example, this method illustrated in FIG. 38 describes HDR_pairing_descriptor( ) in the PMT packet. The HDR_pairing_descriptor( ) contains the number of pairs in this MPEG-2 TS (number_of_HDRpairs), and the PID values that the base video sequence and enhanced video sequence use, for each pair. The PID value used by the base video sequence is indicated by base_layer_video_sequence_PID, and the PID value used by the enhanced video sequence is indicated by enhancement_layer_video_sequence_PID. Describing the HDR_pairing_descriptor( ) in this way enables a correct combination of pairs to be indicated.

Figure 39:
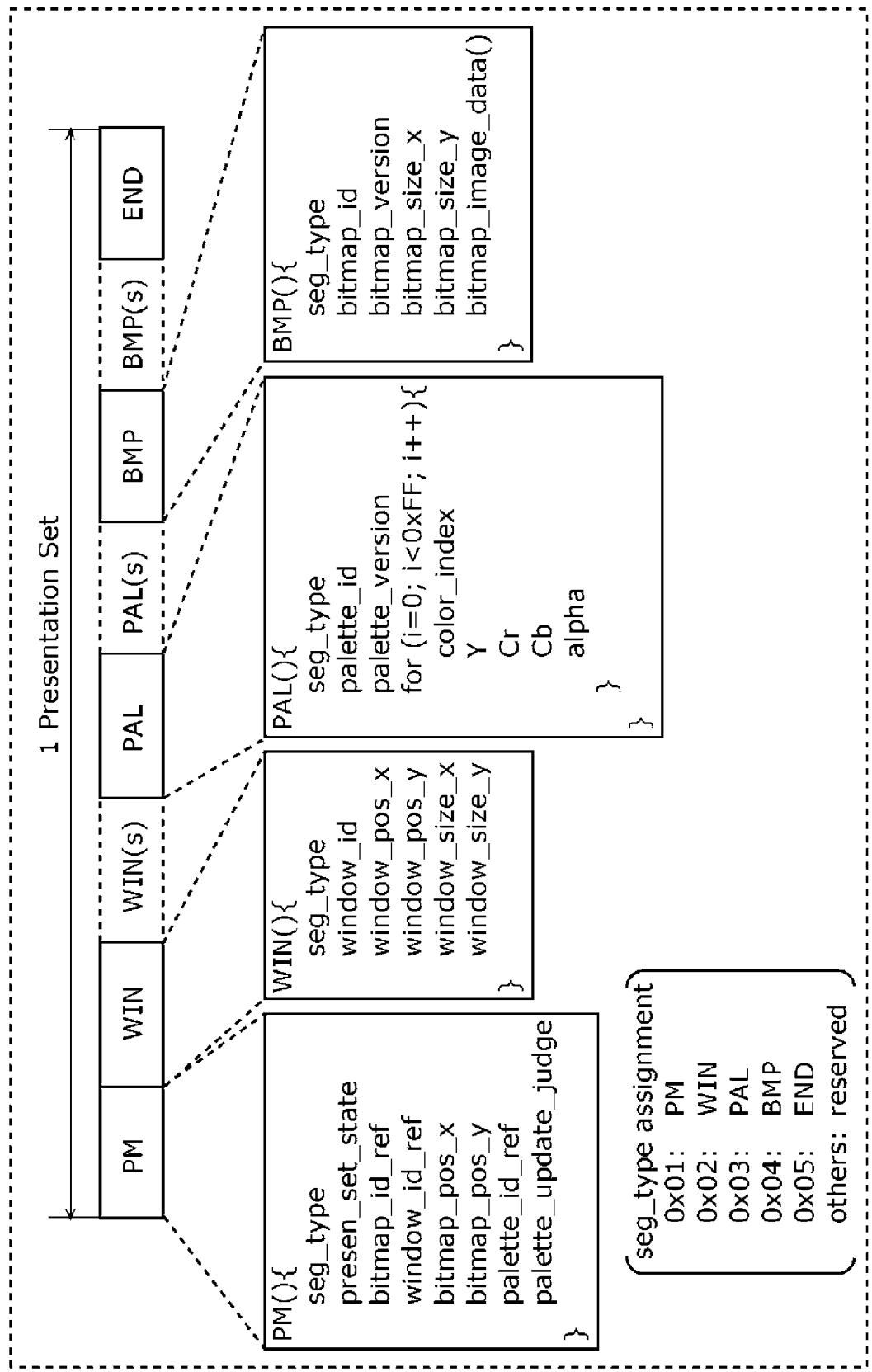
FIG. 39 is a diagram illustrating the structure of a subtitle stream.

FIG. 39 illustrates a subtitle video stream structure making up one display unit. A subtitle video stream that is one display unit is called a Presentation Set, and is a structure that starts with PM data and ends with an END. The individual data segments will be described below.

PM (Presentation Manager) is a data segment that is always situated at the start of each Presentation Set in a subtitle video stream, and includes the following data fields.

seg_type represents the type of the segment. In a case where seg_type=0x01 as illustrated in FIG. 39, this means that the data segment in which it is included is a PM.

presen_set_state identifies whether the Presentation Set is a type including all data necessary for subtitle display, as one display unit of the subtitles, or is a type storing just partial update data, such as only changing the display color.

bitmap_id_ref indicates the bitmap identification information (bitmap_id) of the subtitle video that this Presentation Set displays.

window_id_ref indicates display region identification information (window_id) that this Presentation Set uses.

bitmap_pos_x and bitmap_pos_y indicate the position of the upper-left coordinates of the bitmap specified by bitmap_id_ref.

palette_id_ref indicates the identification information (palette_id) of the display color index color table that this Presentation Set uses.

palette_updatejudge indicates whether or not this Presentation Set is a Presentation Set of a type that only updates the display color index color table. In a case where palette_update_judge=1, the display region and bitmap themselves are the same as the immediately previous Presentation Set, and only the display color index color table changes. Accordingly, display control of designs where the color gradually changes, such as in karaoke, for example, can be realized without resending the bitmap that has a large data size.

WIN (WINdow) is a data segment situated immediately after PM, and a plurality thereof may be arrayed. WIN is a data segment instructing a display region used by the Presentation Set, and includes the following data fields.

seg_type=0x02 indicates that this data segment is a WIN.

window_id is information for identifying the display region specified by this WIN.

window_pos_x and window_pos indicate the upper-left coordinate values of this display region. The window_size_x and window_size_y indicate the size of the display region in the horizontal direction (x) and vertical direction (y), in pixel increments.

Note that the reason why the display region is sectioned in this way is to narrow down the display region so as to speed up the refresh rate even under conditions where the decoder transmission band is limited.

PAL (PALette) is a data segment situated immediately after WIN, and a plurality thereof may be arrayed. PAL is a data segment storing display colors (index colors) used by the Presentation Set, and includes the following data fields.

seg_type=0x03 indicates that this data segment is a PAL.

palette_id is information for identifying this display color index color table.

palette_version indicates a version (whether or not there has been an update) of PALs having the same palette_id. This palette_version can be used to update only palette_version while palette_id is fixed, in a Presentation Set where only the display color index color table is updated (palette_updatejudge=1).

color_index indicates the color index No. (e.g., from 0 to 255).

Y, Cy, Cb, and alpha indicate color information that the relevant color index No. (color_index) actually means. This color information is stored as each of Y (luminance information), Cr/Cb (color-difference information), and alpha (transparency information). This identifies the color corresponding to the index color No. (color_index) specified by BMPO. A maximum of 256 colors are registered in this color index by loop processing.

BMP (BitMaP) is a data segment situated immediately after PAL, and a plurality thereof may be arrayed. For example, in a case where multiple subtitle videos are displayed at the same time, multiple WINs, PALs, and BMPs will be arrayed. BMP stores the bitmap information of the subtitle video that the Presentation Set stores.

seg_type=0x04 indicates that this data segment is a BMP.

bitmap_id is identification information of this bitmap video information.

bitmap_version indicates a version (whether updated or not) of this bitmap.

bitmap_size_x and bitmap_size_y describe the size of this bitmap in the x and y directions when rendered, in pixel increments.

bitmap_image_data( ) stores data compression-coded data of this bitmap video.

Thus, a Presentation Set, which is one subtitle display unit, is an elementary stream for forming data segments of information necessary for one subtitle display or subtitle update, and transferring. A subtitle stream is an array of multiple Presentation Sets to update a subtitle.

FIG. 40 is a diagram illustrating the positional relationship when displaying subtitles described in FIG. 39. A plane in which the subtitle is displayed has the upper left as the origin, with x and y coordinate axes extending to the right and downwards, respectively. The display region (WIN) is placed within this plane, and a bitmap image (BMP) is placed within the display region.

FIGS. 41A through 41C are diagrams for describing management information (management information file) described with reference to FIG. 5 and the like, and the content thereof.

As illustrated in FIG. 41A, the BD.INFO file includes DiscInfo( ) that describes representative attribute information of the entire disc, and Extension( ) that is an extension data region of BD.INFO. The Extension( ) includes Disc_Type( ) and HDR_meta( ).

Disc_Type( ) is extension information indicating physical properties of the disc in which this is recorded. Disc types can be identified by 3-bit information indicated in the disc_type field in Disc_Type( ) as follows.

disc_type: 3 bits (bslbf)
010b: a disc that has recording density of 25 GB/layer, and requires readout at 72 Mbps
011b: a disc that has recording density of 25 GB/layer, and requires readout at 92 Mbps
100b: a disc that has recording density of 33 GB/layer, and requires readout at 92 Mbps
101b: a disc that has recording density of 33 GB/layer, and requires readout at 122 Mbps
110b: a disc that has recording density of 33 GB/layer, and requires readout at 144 Mbps HDR_meta( ) in the BD.INFO file describes metadata related to HDR for this disc.

Also, as illustrated in FIG. 41B, the XXX.PL file includes, in addition to the above-described information, a SubPL-List( ) describing playback control information of enhanced video stream (Enhancement layer video stream), within the CellList. HDR_meta( ) and CombiExt( ) can also be recorded within Extension( ) that is an extended data region of the XXX.PL file. The HDR_meta( ) in theXXX.PL file describes metadata related to HDR for this playlist.

Also stored within Extension( ) in the playlist file is CombiExt( ). CombiExt( ) has the same data structure and semantics as the Combi( ) listed in later-described FIG. 42B, and is information indicating a combination of elementary streams that can be played at the same time. Registered in CombiExt( ) are video streams within standard-luminance range (hereinafter also described as SDR video stream), and subtitle streams of standard-luminance range that can be played together with the SDR video streams (hereinafter also described as SDR subtitle stream), audio streams, and so forth.

Also, as illustrated in FIG. 41C, the YYY.VOBI file can record information indicating the usage of this VOB (VOB_type), information indicating the greatest bitrate of the system stream (SysRate), attribute information of video streams (Video #0( ) and so forth), attribute information of audio streams (Audio #0( ) and so forth), and attribute information of subtitle streams (Subtitle #0( ) and so forth). TMAP( ), where random access points are listed, can also be recorded in the YYY.VOBI file. HDR_meta( ) and TMAPExt( ) can also be recorded in Extension( ) that is an extension data region of YYY.VOBI. The HDR_meta( ) in YYY.VOBI file describes metadata related to HDR for this VOB stream.

TMAPExt( ) has the same data structure and the same semantics as TMAP( ) that is random-access table information illustrated in FIGS. 13 through 15. TMAPExt( ) stores random access point information for a standard-luminance (SDR) video stream.

The values stored in VOB_types have the following meanings.

In a case where VOB_type=0x01 (Main TS for movie application), this means that the VOB where this is described is a VOB used for video playback in a normal movie or the like (MPEG-2 TS stream).

In a case where VOB_type=0x10 (Sub TS for Enhancement layer video stream), this means that the VOB where this is described is only usable with a SubPL where enhanced video streams have been multiplexed (MPEG-2 TS stream).

FIGS. 42A through 42C are diagrams illustrating the data structure of the database file described in FIGS. 41A through 41C. As illustrated in FIG. 42A, Cell # n( ) is information of the n'th Cell. Cell # n( ) is made up of identification information of a VOB stream file reference in the Cell # n( ) (VOBName), Closed Captioning information (CC), playback start time information of this Cell # n( ) (In), playback end time information of this Cell # n( ) (Out), Combi( ) that indicates a combination of elementary streams that can be played at the same time within this Cell # n( ), and so forth.

Described in Combi( ) are various types of encoded attribute information for each elementary stream permitted as combinations that can be played at the same time in Cell # n( ), including this Combi.

As illustrated in FIG. 42B, if a permitted elementary stream is a video stream, described in Combi( ) are identification information such as the PID of that video stream (VideoPID), encoded attribute information such as resolution and aspect (VideoFormat), and so forth.

If a permitted elementary stream is an enhanced video stream such as illustrated in FIG. 38, described in Combi( ) are identification information such as the PID of that enhanced video sequence (EnhVideoPID), bit depth information (EnhVideoBitDepth), and maximum luminance information (EnhVideoMaxLum), and so forth.

If a permitted elementary stream is an audio stream, described in Combi( ) are identification information such as the PID of that audio stream (AudioPID), encoding format (Coding), number of channels (Ch.), and so forth.

If a permitted elementary stream is a subtitle stream, described in Combi( ) are identification information such as the PID of that subtitle stream (SubtitlePID), subtitle language information (Language), and so forth.

As illustrated in FIG. 42C, SubPL # n( ) is information specifying an n'th additional sub-playback path. SubPL # n( ) is, for example, information specifying an enhanced video stream to be played together as a combination with an HDR video stream.

SubPL_type information included in SubPL # n( ) is information indicating the type of playback method of the HDR video stream and enhanced video stream. This is used to identify synchronous/asynchronous, the number of system streams used for playback (1 or 2), and so forth.

SubPL_type=0x0A (Synchronous Enhancement Layer Video SubPL in Sub TS) is a type of playback method where an HDR video stream is read out from one of two system streams (MPEG-2 TS), an enhanced video stream is read out from the other, and the streams that have been read out are synchronously played with each other. Note that "synchronous" here means a fixed relationship where a certain picture in the HDR video stream is always only played at the same time with a certain picture in the enhanced video stream. SubPL_type=0x0B (Synchronous Enhancement Layer Video SubPL in Main TS) is a type of playback method where an HDR video stream and an enhanced video stream within a single MPEG-2 TS are synchronously played.

SubCellList information is information where SubCell information has been bundled. SubCell information includes the file name (VOBName) of a VOB file that references one continuous section (SubCell) including an enhanced video stream, SubCell start time information (In), SubCell end time information (Out), and identification information of a cell (CellNum) played at the same time. This SubPL # n( ) enables the player to be instructed which playback model and which files to use to play an HDR video stream and enhanced video stream.

Figure 43:
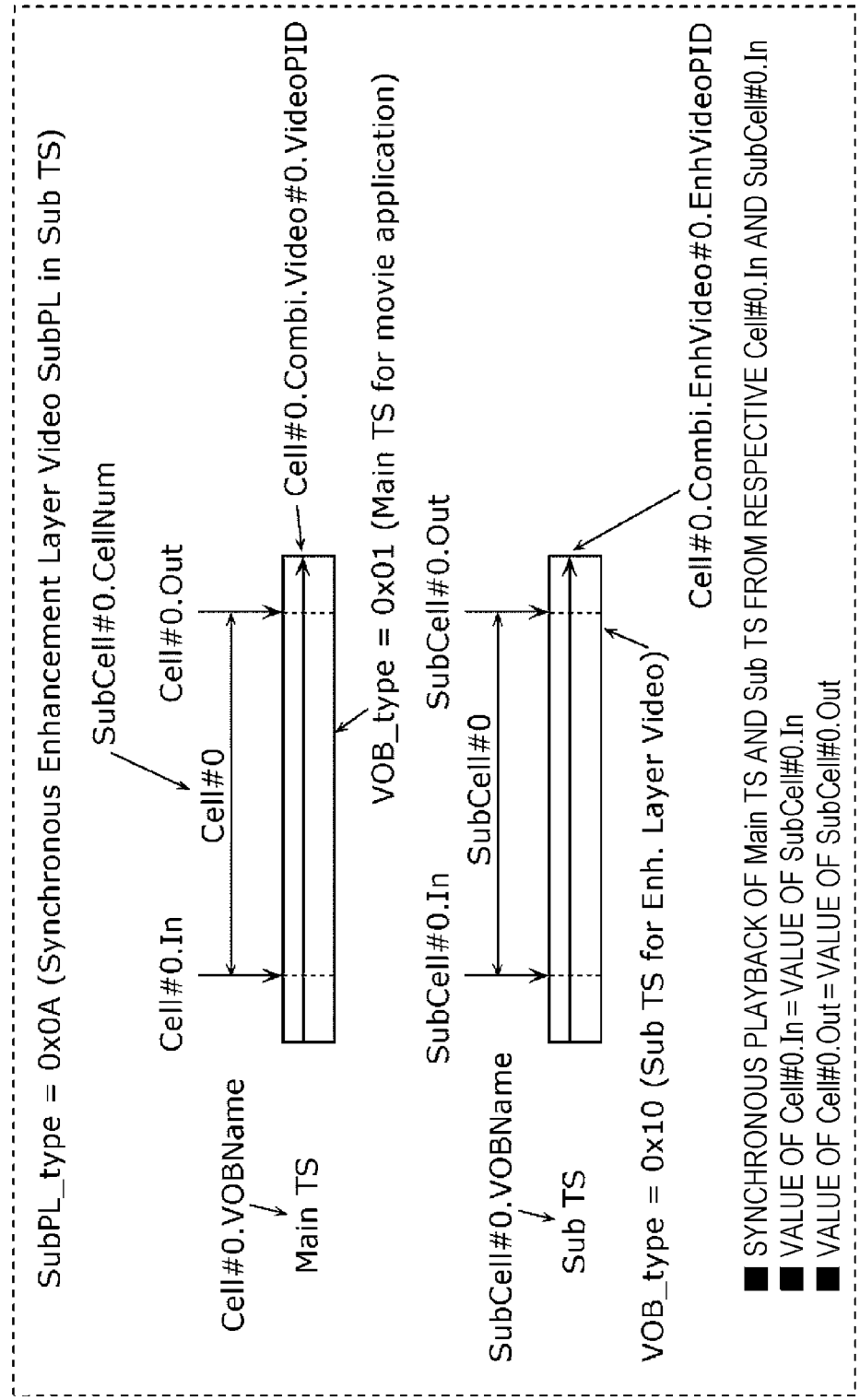
FIG. 43 is a diagram for describing synchronous playback between an HDR stream and an enhanced video stream thereof.

FIG. 43 is a diagram for describing the meaning of each of the fields in management information in a case where SubPL_type=0x0A. In the SubPL_type=0x0A playback model, two system stream files (MPEG-2 TS) are used to read out at the same time the HDR video stream (HDRb) from the Main TS and the enhanced video stream thereof (Enh. Layer Video) from the Sub TS, and play.

A playback section from Cell #0.In to Cell #0.Out in the HDR video stream (HDRb) is played as the playback section specified in Cell #0. Synchronously with this playback, a continuous section from SubCell #0.In to SubCell #0.Out in the enhanced video stream is played as the continuous section specified in SubCell #0. Accordingly, high-luminance video information that has higher luminance and higher quantization precision than the HDR video stream (HDRb) decoded at a base decoder 401 illustrated in FIG. 45, which will be described later, is output.

In the SubPL_type=0x0A playback model, two video streams are played synchronously, so Cell #0.In and SubCell #0.In are the same, and Cell #0.Out and SubCell #0.Out are the same. Note that Cell #0.In, Cell #0.Out, SubCell #0.In and SubCell #0.Out are each points-in-time expressed by a PTS time axis.

Now, VOB_type=0x10 (Sub TS for Enh. Layer Video) is only used for the playback mode of this SubPL_type=0x0A (Synchronous Enhancement Layer Video SubPL in Sub TS).

Figure 44:
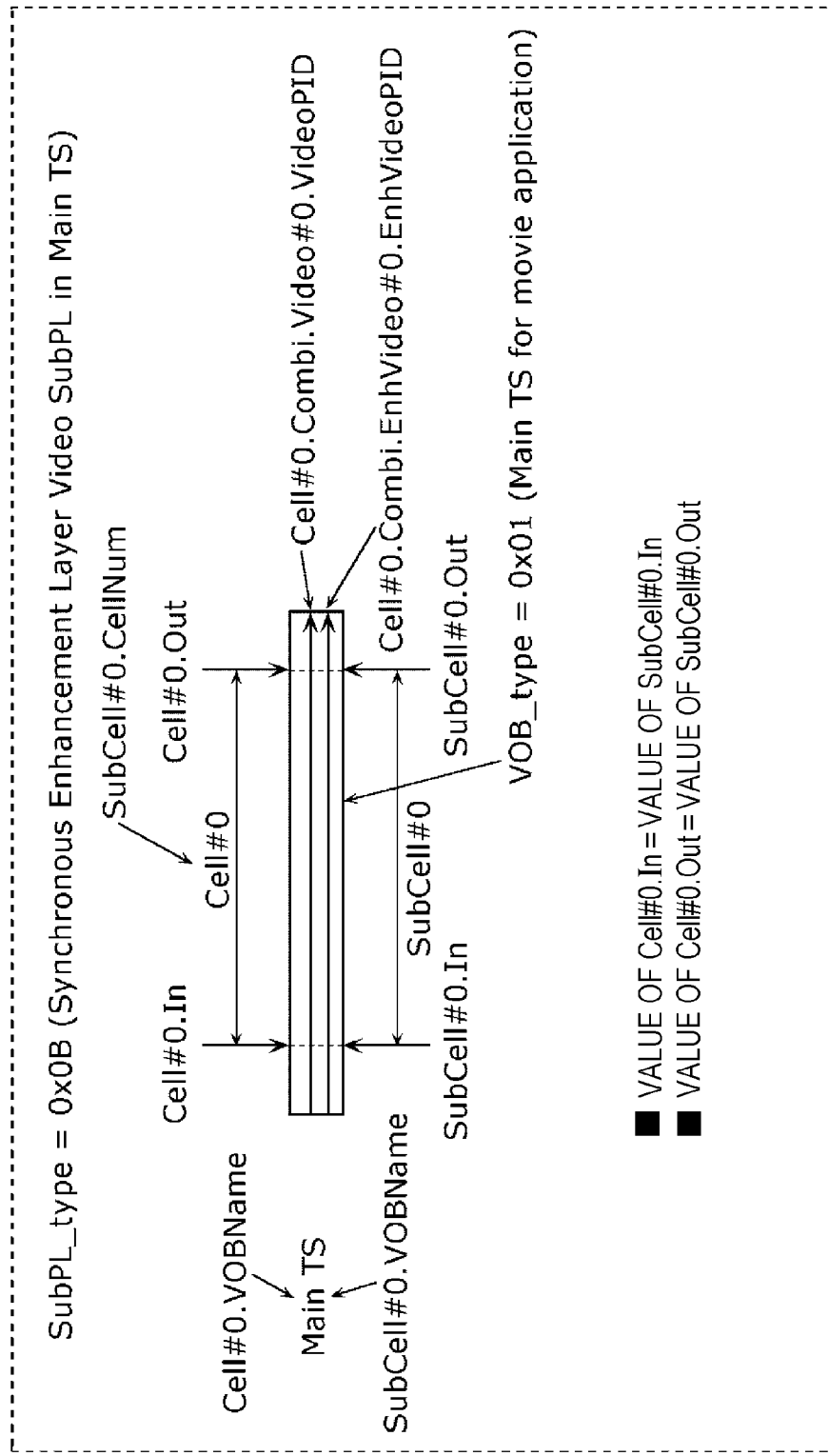
FIG. 44 is a diagram for describing synchronous playback between an HDR stream and an enhanced video stream thereof.

FIG. 44 is a diagram for describing the meaning of each of the fields in management information in a case where SubPL_type=0x0B. In the SubPL_type=0x0B playback model, the HDR video stream (HDRb) and the enhanced video stream thereof are multiplexed in one system stream file (MPEG-2 TS), and these streams are played at the same time. Thus, in the SubPL_type=0x0B playback model, the base video stream and enhanced video stream are multiplexed in the same transport stream. Accordingly, the base video stream and enhanced video stream can be clearly correlated, and video information having a wide dynamic range can be played in an appropriate manner.

Playback section from Cell #0.In to Cell #0.Out in the HDR video stream (HDRb) is played as the playback section specified in Cell #0. Synchronously with this playback, the continuous section from SubCell #0.In to SubCell #0.Out in the enhanced video stream is played as the continuous section specified in SubCell #0. Accordingly, high-luminance video information that has higher luminance and higher quantization precision than the HDR video stream (HDRb) decoded at the base decoder 401 illustrated in FIG. 45, which will be described later, is output.

Thus, in the SubPL_type=0x0B playback model, two video streams are multiplexed in the same system stream file (Main TS that is MPEG-2 TS), and are played synchronously. Accordingly, Cell #0.In and SubCell #0.In are the same, and Cell #0.Out and SubCell #0.Out are the same.

That is to say, The PlayList that is a management information file stores a first section included in the playback path of the base video stream, and a second section included in the playback path of the enhanced video stream, mutually correlated with each other. The playback time of the first section and the second section is the same. Specifically, a playback start time of the first section and a playback start time of the second section, that are the same time as each other, and further a playback end time of the first section and a playback end time of the second section, that are the same time as each other, are described in the PlayList. Accordingly, the base video stream and enhanced video stream can be appropriately synchronized and played.

Figure 45:
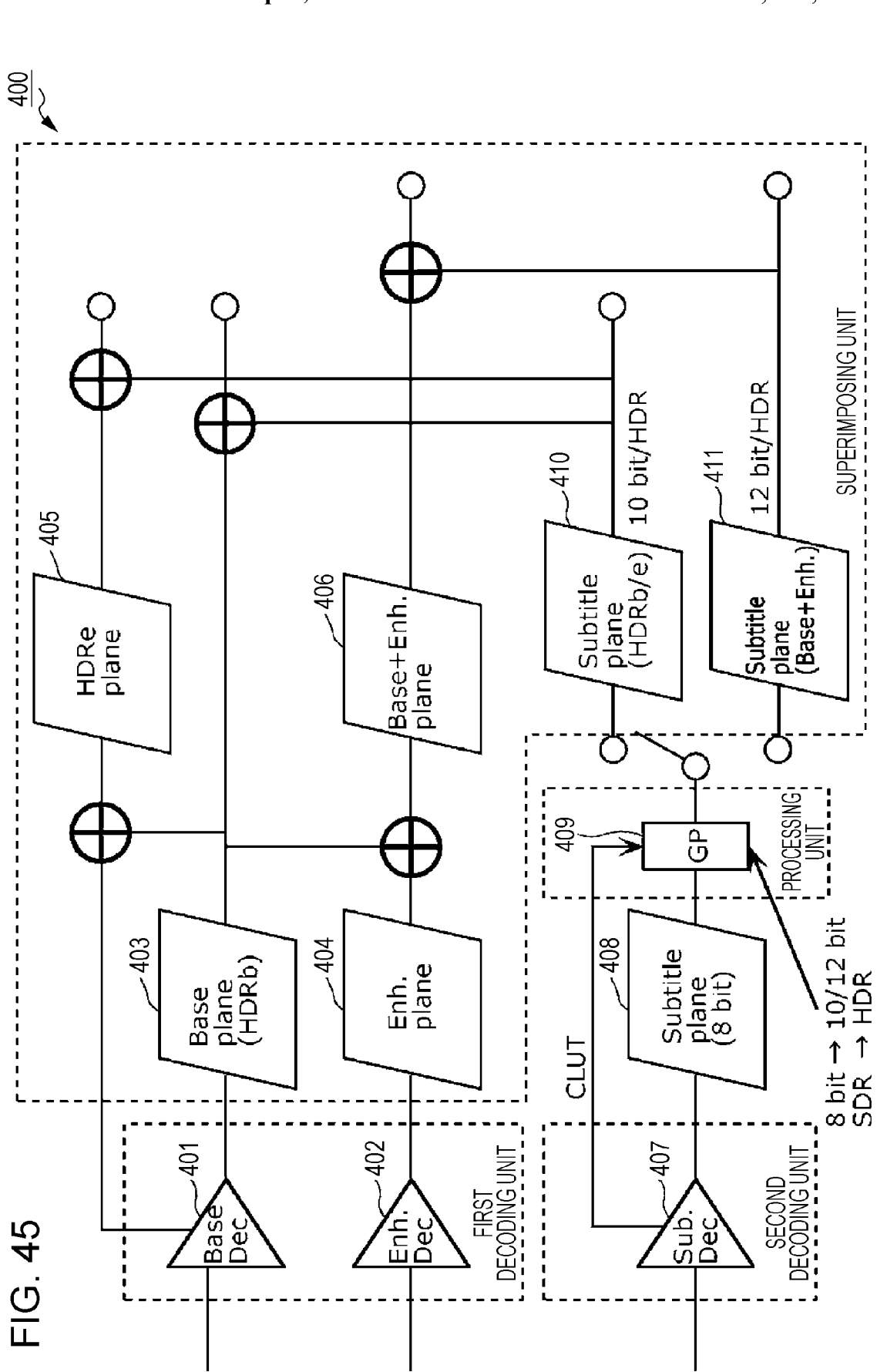
FIG. 45 is a diagram for describing a decoder model for an HDR video stream.

FIG. 45 is a diagram for describing a decoder model of an HDR video stream according to the present embodiment. The playback device according to the present embodiment has a decoder system 400. The decoder system 400 is a video playback unit that reads out, from a BD, video streams such as the base video stream and enhanced video stream, and graphics data indicating subtitles and so forth, and playing, based on the above-described management information files.

The decoder system 400 has a base decoder (Base Dec) 401, an enhanced decoder (Enh. Dec) 402, a base plane (Base plane (HDRb)) 403, an enhanced plane (Enh. plane) 404, an enhanced plane (HDRe plane) 405, a Base+Enh. Plane 406, a subtitle decoder (Sub. Dec) 407, a subtitle plane (Subtitle Plane (8 bit)) 408, a graphics processor (GP) 409, a high-luminance subtitle plane (Subtitle Plane (HDRb/e)) 410, and a high-luminance subtitle plane (Subtitle Plane (Base+Enh.)) 411.

An HDR video stream containing an SEI message (HDRb) is decoded at a base decoder (Base Dec) 401. The high-luminance video information generated by decoding the HDR video stream is rendered at a base plane (Base plane (HDRb)) 403. The basic luminance information (the maximum/minimum luminesce values of the overall contents) and so forth included in the SEI message (HDRb) is transmitted along with the high-luminance video information, and output to an external video output I/F such as HDMI (registered trademark).

The decoder system 400 that is a playback device compatible with SEI messages (HDRe) adds luminance enhancement information of the SEI message (HDRe) to the high-luminance video information of the base plane (Base plane (HDRb)) 403, and renders the enhanced high-luminance video information on an enhanced plane 405. The enhanced high-luminance video information, that has had up to this SEI message (HDRe) added is output to an external video output I/F such as HDMI (registered trademark), along with additional luminance information and the like (by maximum luminance value and minimum luminance value in increments of scenes) included in the SEI message (HDRe).

The decoder system 400 that is a playback device compatible with the enhanced video stream described above decodes the enhanced video stream at the enhanced decoder (Enh. Dec) 402. The enhanced video information generated by this decoding is rendered to an enhanced plane (Enh. plane) 404. The decoder system 400 composites this enhanced video information with the high-luminance video information at the base plane (Base plane (HDRb)) 403, so as to composite videos that have the same PTS. The enhanced high-luminance video information obtained by this compositing is rendered to a Base+Enh. Plane 406. The decoder system 400 outputs this enhanced high-luminance video information to an external video output I/F such as HDMI (registered trademark), along with basic luminance information transmitted by the SEI message (HDRb), luminance enhancement information stored in the enhanced video stream, and so forth.

Now, graphics data to be superimposed on the video, e.g., a subtitle stream, is decoded at the subtitle decoder (Sub. Dec) 407, and thereby expressed in 8-bit index color (256 colors). The subtitles that are the decoded subtitle stream are rendered at the subtitle plane (Subtitle Plane (8 bit)) 408. The graphics processor (GP) 409 converts the 8-bit level YCrCb expressing the subtitles into 10-bit level YCrCb, and further converts the luminance of the subtitles from standard-luminance to high-luminance (matching the high-luminance video information or enhanced high-luminance video information). The high-luminance subtitles, that are subtitles converted to high-luminance, are rendered to the high-luminance subtitle plane (Subtitle Plane (HDRb/e)) 410. The high-luminance subtitles rendered to the high-luminance subtitle plane 410 are then composited with the picture of the base plane (Base plane (HDRb)) 403 or enhanced plane (HDRe plane) 405, having the same time, and output.

Also, in a case where there is enhanced high-luminance video information at the Base+Enh. Plane 406, or a SubPLtype=0x0A or 0x0B PlayList being played, the graphics processor (GP) 409 converts the 8-bit level YCrCb expressing the subtitles into 12-bit level YCrCb. Further, the graphics processor (GP) 409 converts the luminance of the subtitles from standard-luminance to higher luminance (matching the enhanced high-luminance video information generated using the enhanced video stream), for superimposing the subtitles in accordance with the enhanced video stream. The high-luminance subtitles, that are subtitles converted to higher luminance, are rendered to the high-luminance subtitle plane (Subtitle Plane(Base+Enh.)) 411. The high-luminance subtitles rendered to the high-luminance subtitle plane (Subtitle Plane(Base+Enh.)) 411 are then composited with the picture at the Base+Enh. Plane 406, having the same time, and output.

Now, the graphics processor (GP) 409 acquires an index color table (CLUT) for subtitles rendered to the subtitle plane (Subtitle Plane (8 bit)) 408, from the subtitle decoder (Sub. Dec) 407. This index color table (CLUT) has only one GLUT of a CLUT for SDR or a CLUT for HDR multiplexed, depending on whether the video information composited with the subtitles is an SDR video stream or an HDR stream. Although there are multiple HDR types for video information, only one type of CLUT for subtitle stream is provided for HDR.

Figure 46:
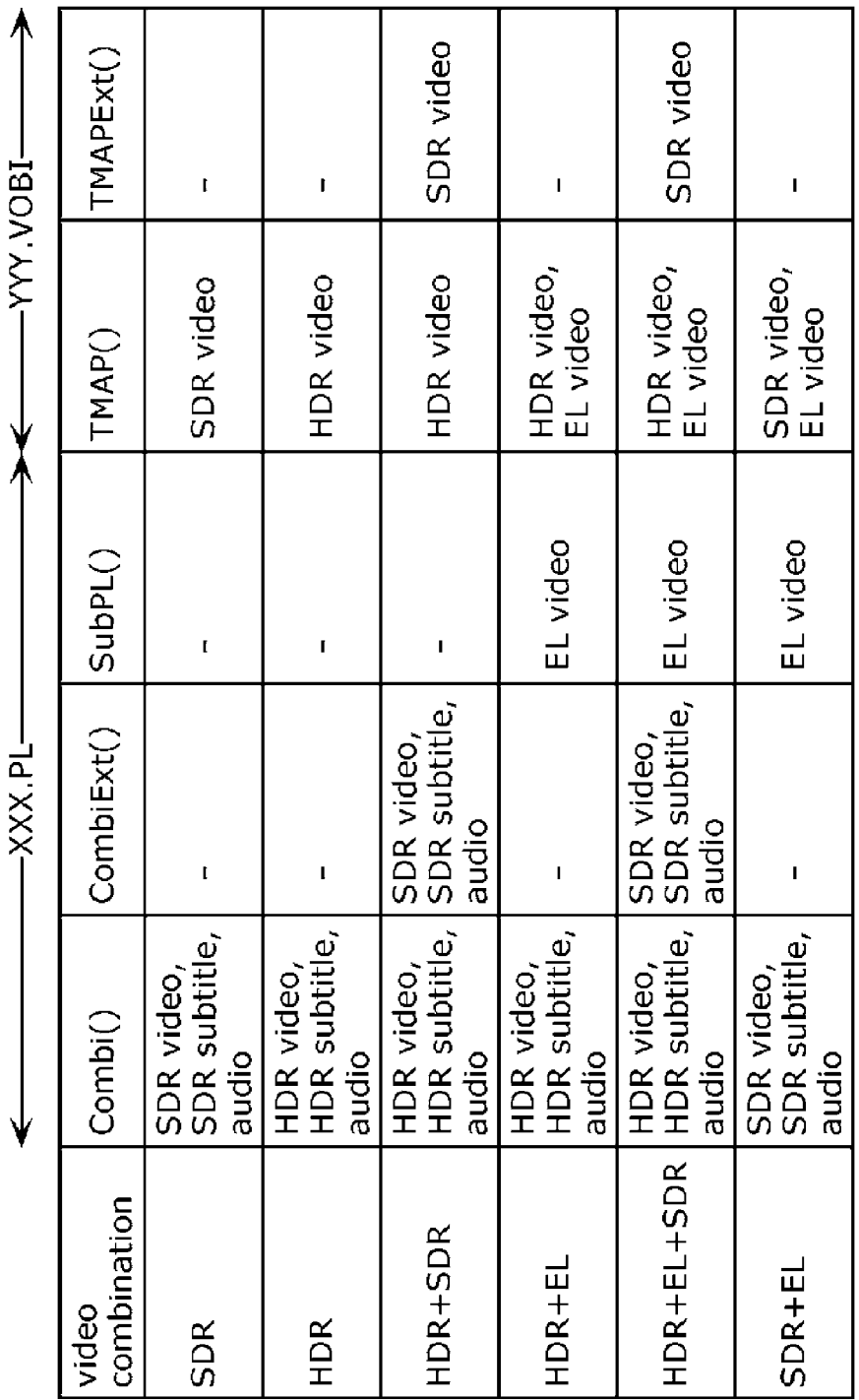
FIG. 46 is a diagram illustrating a registration method of streams to a database file.

FIG. 46 is a diagram illustrating a registration method of streams to a database file. FIG. 46 is a table showing where what sort of information is registered and managed in accordance with the combination of video streams, with regard to the five data blocks of Combi( ), CombiExt( ), and SubPL, that are stored in the playlist file, and TMAP( ) and TMAPExt( ) that are stored in the VOBI file. Note that EL in FIG. 46 indicates an enhanced video stream. HDR in FIG. 46 indicates HDRb or HDRe.

In a case where only an SDR video stream is registered in a playlist file, the SDR video stream, the SDR subtitle stream (subtitle stream having only PAL for SDR) superimposed thereupon, and audio stream are registered in Combi( ). Random access information of the SDR video stream is registered in the TMAP( ).

In the same way, in a case where only an HDR video stream is registered in a playlist file, the HDR video stream, the HDR subtitle stream (subtitle stream having only PAL for HDR) superimposed thereupon, and audio stream are registered in Combi( ). Random access information of the HDR video stream is registered in the TMAP( ).

Next, a case where the two of an HDR video stream and an SDR video stream are registered in a single playlist will be described. In this case, the HDR video stream, the HDR subtitle stream superimposed thereupon, and audio stream are registered in Combi( ). That is to say, first playback control information is stored in the Combi( ), in which is instructed playing of the combination of the HDR video stream and HDR subtitle stream.

On the other hand, random access information of the HDR video stream is registered in the TMAP( ). That is to say, random access information indicating positions of independently-decodable pictures included in the HDR video stream (hereinafter also described as first random access information) is stored in the TMAP( ).

Additionally, the SDR video stream, the SDR subtitle stream superimposed thereupon, and audio stream are registered in CombiExt( ). That is to say, second playback control information is stored in the CombiExt( ), in which is instructed playing of the combination of the SDR video stream and SDR subtitle stream.

Random access information of the SDR video stream is registered in the TMAPExt( ). That is to say, random access information indicating positions of independently-decodable pictures included in the SDR video stream (hereinafter also described as second random access information) is stored in the TMAPExt( ).

Next, a case where the two of an HDR video stream and an enhanced video stream (written as EL in FIG. 46) are registered in a single playlist will be described. In this case, the HDR video stream, the HDR subtitle stream superimposed thereupon, and audio stream are registered in Combi ( ). Random access information of the HDR video stream and random access information of the enhanced video stream are registered in the TMAP( ). That is to say, the first random access information and random access information indicating the playback time of pictures included in the enhanced video stream (hereinafter also described as third random access information) are stored in the TMAP( ).

Further, playback control information of the enhanced video stream is registered in SubPL( ). That is to say, third playback control information specifying an enhanced video stream to enhance the luminance range of the HDR video steam, is stored in the SubPL( ). This is the pattern described with reference to FIGS. 43 and 44.

Next, a case where the three of an HDR video stream, a luminance-enhanced video stream, and an SDR video stream are registered in a single playlist will be described. In this case, the HDR video stream, the HDR subtitle stream to be superimposed thereon, and audio stream are registered in Combi( ). Random access information of the HDR video stream and random access information of the enhanced video stream are stored in the TMAP( ).

Further, playback control information of the enhanced video stream is registered in SubPL( ). Additionally, the SDR video stream, the SDR subtitle stream to be superimposed thereon, and audio stream are registered in the CombiExt( ). Random access information of the SDR video stream is registered in TMAPExt( ).

Next, a case where the two of an SDR video stream and an enhanced video stream are registered in a single playlist will be described. In this case, the SDR video stream, the SDR subtitle stream superimposed thereupon, and audio stream are registered in Combi( ). Random access information of the SDR video stream and random access information of the enhanced video stream are registered in the TMAP( ). Further, playback control information of the enhanced video stream is registered in SubPL( ). Note however, that this case is only applied in a case where the SDR video stream can be converted to high-luminance/high-bit-precision HDR video using the enhanced video stream.

Thus, when registering an HDR video stream and an SDR video stream in a single playlist, the streams that make up a set with the HDR video stream are registered in Combi( ), while the streams making up a set with the SDR video stream are registered in CombiExt( ). That is to say, a set of streams relating to the HDR video stream and a set of streams relating to the SDR video stream are individually managed as entirely separate sets.

According to such a configuration, when a decision is made to play one of the HDR video stream and SDR video stream, the player (playback device) only has to process one of Combi( ) and CombiExt( ). Combi( ) and CombiExt( ) have the same data structure and are of the same semantics, so part of the processing of Combi( ) and the processing of CombiExt( ) can be shared in common to simplify processing. This is advantageous in that authoring by the system is easy, and advantageous in that mounting/operation verification processing of the player is easy (developing costs can be reduced).

Supplemental description will be made regarding the meaning of "Combi( ) and CombiExt( ) have the same data structure and are of the same semantics". Specifically, data blocks called Cell # n are provided in the playlist file, with one Combi( ) being provided to each Cell # n, as illustrated in FIGS. 41B and. 42A.

On the other hand, CombiExt( ) is extended data with regard to Cell # n( ), so Combi( ) corresponds to part of CombiExt( ). The above "Combi( ) and CombiExt( ) have the same data structure and are of the same semantics" more specifically means that part of the second playback control information stored in the CombiExt( ) has essentially the same data structure and semantics as part of the first playback control information stored in Combi( ). In other words, part of the second playback control information stored in CombiExt( ) has a common data structure and semantics with a part of the first playback control information stored in Combi( ). Also, Combi( ) and CombiExt( ) both have in common that each has identification information such as a PID of a video stream (VideoPID).

As described above, a SDR video stream, and an HDR video stream of which the luminance range is broader than the SDR video stream, that are selectively used in accordance with the playback environment, are recorded in a BD in which the streams are registered in the database file as illustrated in FIG. 46. The SDR video stream is, in other words, a standard-luminance range video stream, while the HDR video stream is, in other words, a high-luminance range video stream. The BD is an example of a recording medium.

Also recorded in the BD are SDR subtitle stream and HDR subtitle stream that are selectively used in accordance with the playback environment, and a playlist file (XXX.PL in FIG. 46) including content playback control information. The playlist file includes Combi( ) and CombiExt( ). Combi ( ) is an example of management region where playback control information relating to a main stream is stored, and CombiExt( ) is an example of an extended region.

In a case where an HDR video stream and an SDR video stream are registered in a single playlist, first playback control information instructing combining and playing the HDR video stream and the HDR subtitle stream is stored in the Combi( ). Second playback control information instructing combining and playing the SDR video stream and the SDR subtitle stream is stored in the CombiExt( ).

In a case of selecting and playing the HDR video stream, a player that plays BDs having such a configuration can read out the first playback control information in Combi( ) as has been conventionally done. On the other hand, in a case of selecting and playing the SDR video stream, the player can read out the second playback control information in the CombiExt( ).

Also, it is conceivable that with a BD where both DHR and SDR are recorded, an SDR subtitle stream or SDR graphics might be superimposed on an HDR video stream. That is, it is conceivable that subtitles and graphics with insufficient luminance might be superimposed on a high-luminance image. However, in a case where a HDR video stream and SDR video stream are registered in a single playlist, the HDR video stream registered in the Combi( ) is combined with the HDR subtitle stream in the Combi( ), so there is no occurrence of a situation where an SDR subtitle stream is combined with an HDR video stream. Conversely, the SDR video stream registered in the CombiExt( ) is combined with the SDR subtitle stream in the CombiExt( ), so there is no occurrence of a situation where an HDR subtitle stream is combined with an SDR video stream.

Thus, according to the above-described BD, playback control such as selection of video streams is simplified. Accordingly to the above BD, video stream selection processing and playback processing is facilitated at a player that plays this BD.

Also, part of the second playback control information has a data structure that is common with the first playback control information. Accordingly, the player can play a SDR video stream by about the same processing as an HDR video stream.

Also, a VOBI file, indicating attributes relating to the entire BD, is recorded in the BD, as illustrated in FIG. 46. The VOBI file includes TMAP( ) and TMAPExt( ). TMAP ( ) and TMAPExt( ) each store random access information, indicating the position within the video stream, of pictures independently decodable that are included in the video stream. A VOBI file is an example of a management information file, TMAP( ) is an example of a map region, and TMAPExt( ) is an example of an extended map region.

TMAP( ) stores first random access information indicating the position in an HDR video stream of pictures independently decodable that are included in the HDR video stream. TMAPExt( ) stores second random access information indicating the position in an SDR video stream of pictures independently decodable that are included in the SDR video stream. The first random access information is an example of first map information and the second random access information is an example of second map information.

When selecting an HDR video stream and performing random access playback or the like, a player that plays BDs of such a configuration can read out the first random access information within the TMAP( ), and selecting an SDR video stream and performing random access playback or the like, can read out the second random access information within the TMAPExt( ). That is to say, according to such a BD, video stream selection processing and playback processing by a player that plays the BD can be facilitated when performing random access playback or the like as well.

Also, the above BD further has recorded therein a sub-playlist file (SubPL( ) in FIG. 46), in which is recorded playback control information relating to sub-streams played at the same time as the main stream file. Third playback control information relating to enhanced video streams for enhancing the luminance range of HDR video streams is stored in the sub-playlist file. First random access information, and third random access information indicating the position within the enhanced stream of pictures independently decodable that are included in the enhanced video stream, are stored in TMAP( ). The third random access information is an example of third map information.

A player that plays BDs of such a configuration can play the HDR video stream and enhanced video stream at the same time, by reading out the first playback control information within the Combi( ) and the third playback control information within the SubPL( ). Accordingly, such a BD facilitates HDR video stream enhancing processing of a player that plays the BD.

Also, when performing random access playback or the like, the player can further read out information within the TMAP( ). That is to say, such a BD facilitates playback processing of a player playing the BD, in a case of enhancing an HDR video stream and performing random access playback and so forth.

Figure 47:
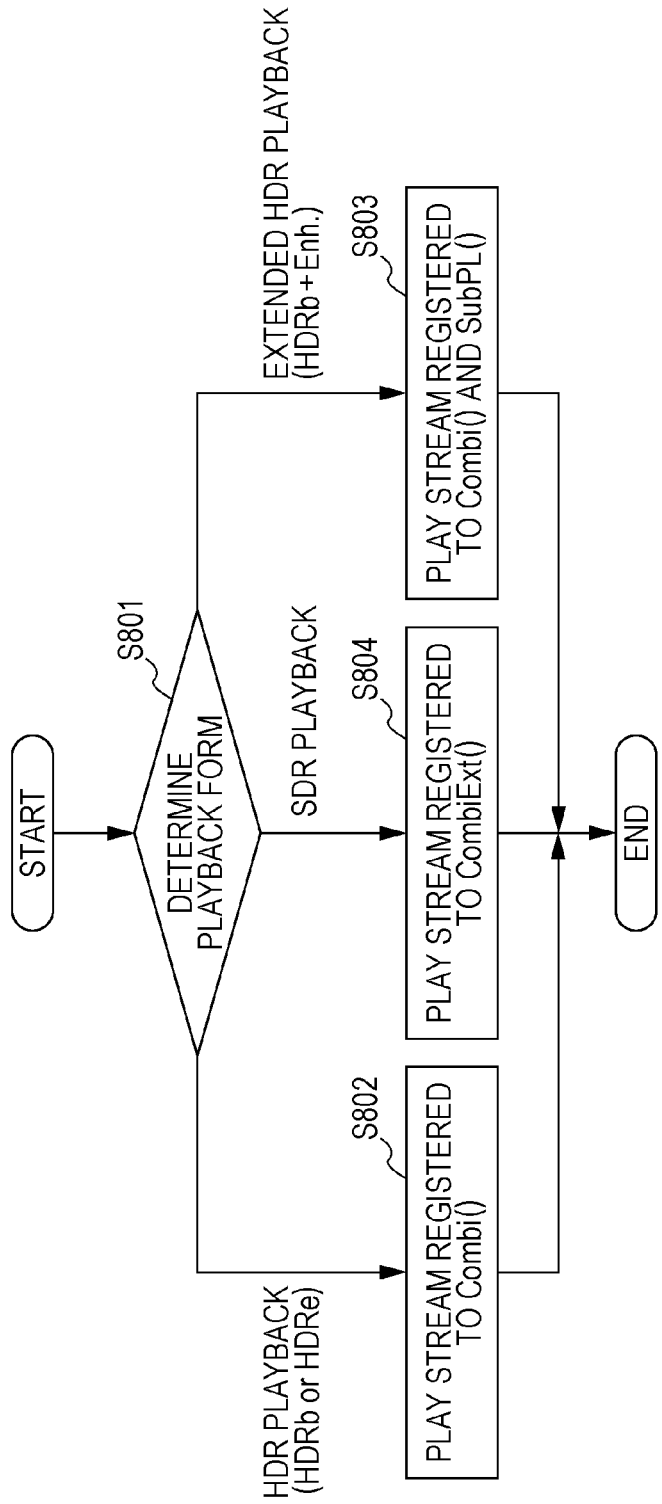
FIG. 47 is a flowchart of playback processing of a player.

Next, playback processing by the player will be described. FIG. 47 is a flowchart of playback processing by the player in a case where there is the three playback control information of first playback control information including an HDR video stream, second playback control information including an SDR video stream, and third playback control information including an enhanced video stream, in a single playlist. As illustrated in FIG. 47, the player performs determination of content playback form after having started executing of a playlist file, based on the content recorded in the BD, whether or not the player is compatible with decoding of an HDR video stream, whether or not a television connected to the player is compatible with decoding of an HDR video stream (S801).

In a case where the player is to perform HDR playback of the content as the result of the determination, the stream set registered in Combi( ) is read out and played (S802). In other words, in a case of playing content as HDR content, the video playback unit that the player (playback device) has reads out and plays the HDR video stream and HDR subtitle stream, based on the first playback control information stored in Combi( ).

Note that, in a case of performing random access playback or the like of content as HDR content, the video playback unit reads out and plays the HDR video stream and HDR subtitle stream, based on the first playback control information and the first random access information.

In a case where the player is to perform enhanced HDR playback of the content as the result of the determination, the stream set registered in Combi( ) and SubPL( ) is read out and played (S803). In other words, in a case of playing content as HDR content with an enhanced luminance range, the video playback unit that the player has reads out and plays the HDR video stream and HDR subtitle stream, based on the first playback control information, and also reads out and plays the enhanced video stream based on the third playback control information.

Note that, in a case of performing random access playback or the like of content as HDR content with an enhanced luminance range, the video playback unit reads out and plays the HDR video stream and HDR subtitle stream, based on the first playback control information and the first random access information, and also reads out and plays the enhanced video stream based on the third playback control information and third random access information.

In a case where the player is to perform SDR playback as the result of the determination, the stream set registered in CombiExt( ) is read out and played (S804). In other words, in a case of playing content as SDR content, the video playback unit that the player has reads out and plays the SDR video stream and SDR subtitle stream, based on the second playback control information.

Note that, in a case of performing random access playback or the like of content as SDR content, the video playback unit reads out and plays the SDR video stream and SDR subtitle stream, based on the second playback control information and the second random access information. Thus, according to the above BD, video stream selection processing and playback processing of the player playing the BD can be facilitated.

Figure 48:
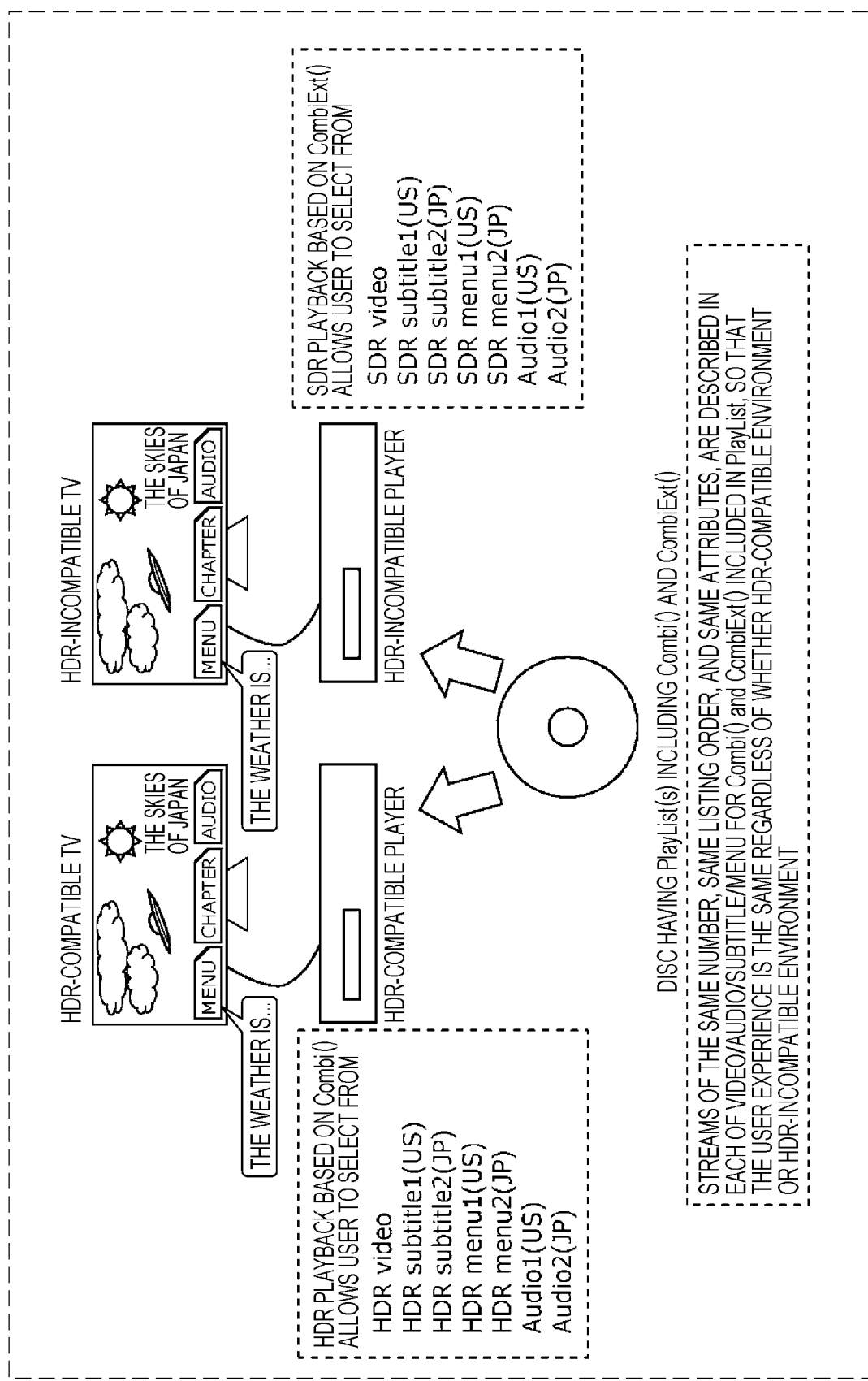
FIG. 48 is a diagram for describing issues when performing playback of a disc under different playback environments.

FIG. 48 is a diagram for describing issues in a case of playing a disc under different playback environments, following a single playlist in which HDR video and SDR video have been registered. In this FIG. 48, comparison is made of the states of playback of a disc in which such a playlist has been recorded, regarding a state of performing in the AV environment at the living room where HDR video can be played, and a state of performing in the AV environment at the bedroom where HDR video cannot be played, for example.

In a case of the same user playing the same disc in the same manner, a situation where the selectable subtitles, audio, menu screens, and so forth differ depending on whether the TV is HDR compatible or not might greatly confuse the user. For example there may be a case where Japanese audio and Japanese subtitles could be selected in the playback environment in the living room when playing the disc, but when the disc is taken into the bedroom and played, Japanese subtitles are not selectable in the playback environment in the bedroom. Alternatively, if the Japanese audio is not selectable, users who can only understand Japanese, or can only read Japanese will even have difficulty in viewing/listening. Accordingly, in the present embodiment, restrictions are applied for each pair of Combi( ) and CombiExt_for_Cell( ) corresponding to each Cell (playback section).

Figure 49:
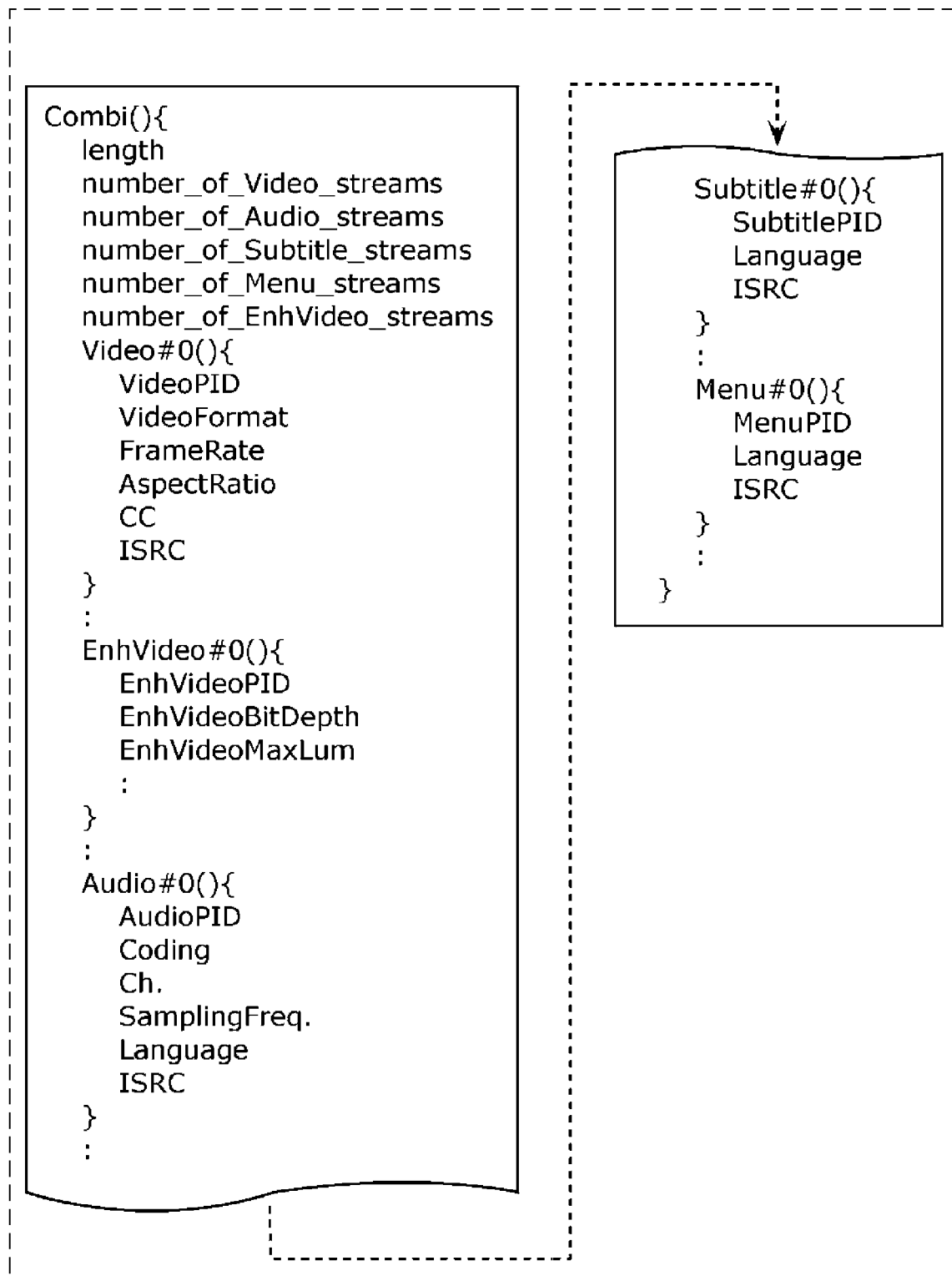
FIG. 49 is a diagram illustrating details of the data structure of Combi( )
Figure 50:
FIG. 50 is a diagram illustrating details of the data structure of CombiExt( )

FIG. 49 is a diagram illustrating the data structure of Combi( ) in detail. Combi( ) describes first the number of streams of each type, such as video, audio, and so forth, and particular attribute information for each stream. FIG. 50 is a diagram illustrating the data structure of CombiExt( ) in detail. Combi( ) is described in each Cell, but CombiExt( ) is only described once in the XXX.PL( ), so data equivalent to Combi( ) (CombiExt_for_Cell( )) is collected and described in this data structure.

The player selects and plays one of Combi( ) and CombiExt_for_Cell( ) in accordance with the situation. Applying the following restrictions to Combi( ) and CombiExt_for_Cell( ) is the most efficient and simple solution to the above-described issue. In the present embodiment, restrictions are applied to the elementary streams registered in each of Combi( ) and CombiExt_for_Cell( ) corresponding to a predetermined Cell (i.e., the same Cell).

1) Restriction Item Relating to Video Stream (video # n( )): Video streams registered in each of Combi( ) and CombiExt_for_Cell( ) corresponding to each Cell should be video streams where the same video contents are encoded. Accordingly, the video itself is the same regardless of playback environment. The VideoPID (PID of video stream) may have different values between Combi( ) and CombiExt_for_Cell( ), such as cases of being stored in the same system stream (MPEG-2 TS). Video streams registered to each of Combi( ) and CombiExt_for_Cell( ) corresponding to each Cell should have the same attributes (values). Attributes (values) are VideoFormat (resolution), FrameRate (frame rate), AspectRatio (aspect ratio), CC (whether or not there are closed captions), and ISRC (copyright information of the content). This is necessary to provide the same viewing/listening experience regardless of AV playback environment, as described with FIG. 48.

2) Restriction Item Relating to Subtitle Stream (Subtitle # n( )): Subtitle streams registered in each of Combi( ) and CombiExt_for_Cell( ) corresponding to each Cell should be subtitle streams where the same subtitle contents are encoded. Accordingly, the subtitles themselves are the same regardless of playback environment. There are HDR subtitles and SDR subtitles for subtitles, in the same way as video. These subtitles are configured as completely separate streams, so the SubtitlePID (PID of subtitle stream) of each of the HDR subtitles and SDR subtitles differ as with the case of video streams. Subtitle streams registered to each of Combi( ) and CombiExt_for_Cell( ) corresponding to each Cell should have the same attributes (values). Attributes (values) are Language (language of subtitles), and ISRC (copyright information of the content). The number of subtitle streams registered to each of Combi( ) and CombiExt_for_Cell( ) is the same. Of M (where M is an integer of 1 or more) of subtitle streams listed in Combi( ), and M of subtitle streams listed in CombiExt_for_Cell( ), each in the same Cell, the attributes of same N'th (where N is any integer of one or more but M or less) subtitle stream in each should be the same. That is to say, subtitle streams of the same attributes should be registered in the same order in both Combi( ) and CombiExt_for_Cell( ).

Currently, the No. of a subtitle stream selected for playback is expressed by player variable #2 (Subtitle stream number) illustrated in FIG. 24. The No. here is a subtitle stream registration order on each of Combi( ) and CombiExt_for_Cell( ), and is used as a subtitle stream identification number. Accordingly, when a program specifies the N'th subtitle stream and gives a playback instruction, the subtitle steam registered the N'th in Combi( ) or CombiExt_for_Cell( ) is selected. Accordingly, if the Language (language of the subtitles) differs for subtitle streams registered the N'th in each of Combi( ) and CombiExt_for_Cell ( ), the program may have to search for a subtitle stream at an order other than the N'th. For example, even if the N'th subtitle stream is specified in Combi( ), that subtitle stream is not registered at the N'th in CombiExt_for_Cell( ). Accordingly, the program must comprehend which of Combi( ) and CombiExt_for_Cell( ) is being played. Further, if the program comprehends that CombiExt_for_Cell( ) is being played, the program must search and select a subtitle stream at an order other than the N'th. Thus, a program that selects subtitle steams must also be prepared in the disc.

In order to avoid this, an arrangement is made in the present embodiment where the playback control program can be described in the same way, regardless of which of Combi( ) and CombiExt_for_Cell( ) is being played. Accordingly, in the present embodiment, the number of subtitle streams, the registration order thereof, the attributes (Language, ISRC) of the subtitles in registration order, should be the same for each of Combi( ) and CombiExt_for_Cell( ) corresponding to each Cell.

3) Restriction Item Relating to Menu Stream (Menu # n( )): Menu streams registered in each of Combi( ) and CombiExt_for_Cell( ) corresponding to each Cell should be menu streams where the same menu contents are encoded. Accordingly, the menus themselves are the same regardless of playback environment. There are HDR menus and SDR menus for menus, in the same way as video. These menus are configured as completely separate streams, so the MenuPID (PID of menu stream) differ as with the case of video streams. A menu stream has a command set to each button, in addition to the data structure of the subtitle stream.

Menu streams registered to each of Combi( ) and CombiExt_for_Cell( ) corresponding to each Cell should have the same attributes (values). Attributes (values) are Language (language of menus), and ISRC (copyright information of the content). The number of menus streams registered to each of Combi( ) and CombiExt_for_Cell( ) should be the same. Of M (where M is an integer of 1 or more) of menu streams listed in Combi( ), and M of menu streams listed in CombiExt_for_Cell( ), each in the same Cell, the attributes of same N'th (where N is any integer of one or more but M or less) menu stream in each should be the same. That is to say, menu streams of the same attributes should be registered in the same order in both Combi( ) and CombiExt_for_Cell( ). This also is necessary to provide menus of the same language, even under different playback environments, as described with FIG. 48.

4) Restriction Item Relating to Audio Stream (Audio # n( )): There is no change of audio streams due to HDR/SDR video, so the same audio streams should be available for use at both Combi( ) and CombiExt_for_Cell( ) corresponding to each Cell. Accordingly, the number of audio streams registered to Combi( ) and CombiExt_for_Cell( ) should be the same. Further, of M (where M is an integer of 1 or more) of audio streams listed in Combi( ), and M of audio streams listed in CombiExt_for_Cell( ), each in the same Cell, the attributes of the same N'th (where N is any integer of one or more but M or less) audio stream in each should be the same. That is to say, audio streams of the same attributes should be registered in the same order in both Combi( ) and CombiExt_for_Cell( ). The attributes are AudioPID (PID of audio stream), Coding (encoding format), Ch. (number of channels), SamplingFreq. (sampling frequency), language (language of the audio), and ISRC (copyright of the content).

Figure 51:
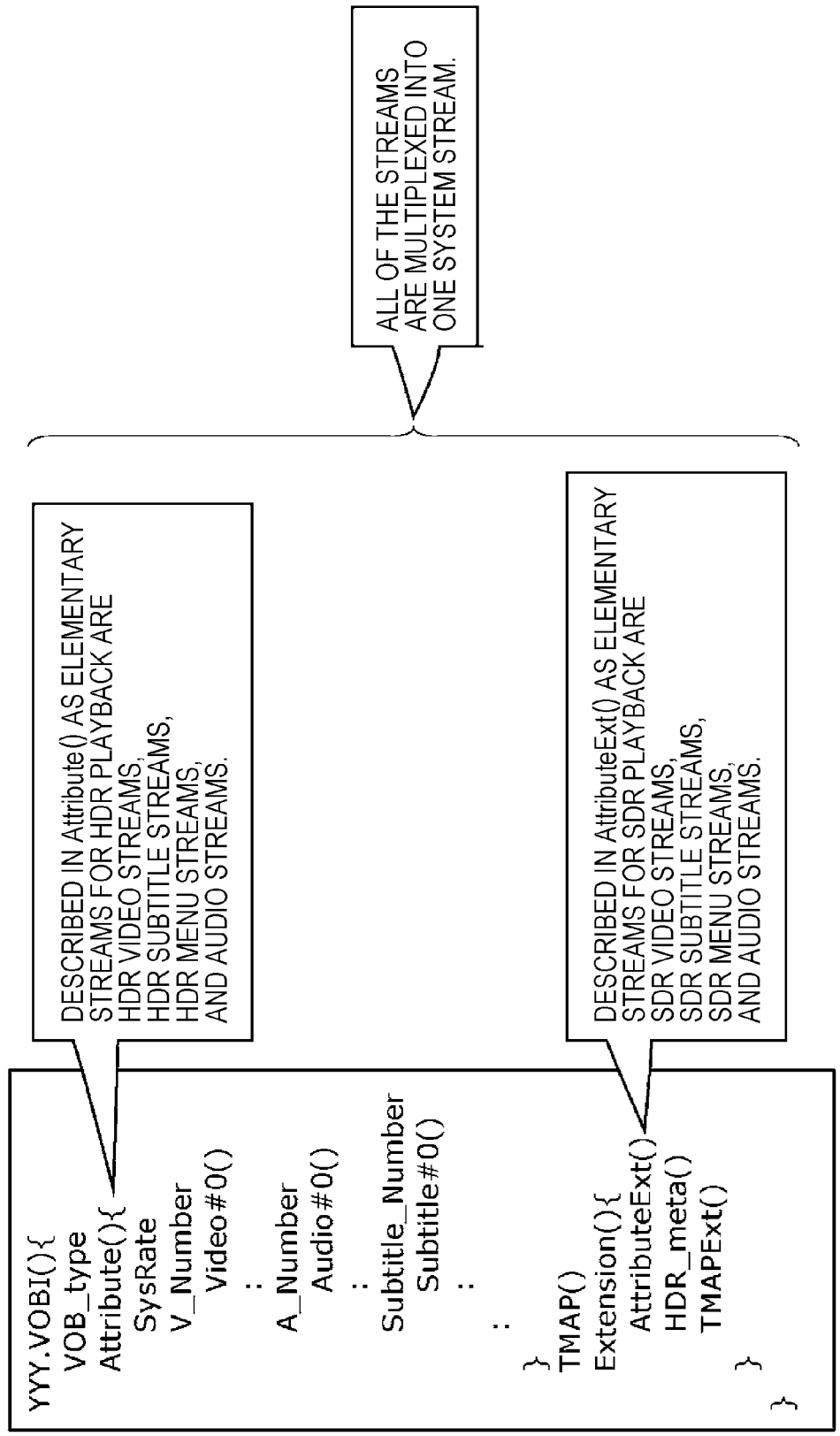
FIG. 51 is a diagram illustrating YYY.VOBI including both HDR video and SDR video stream sets.

FIG. 51 is a diagram illustrating an extension example where YYY.VOBI includes both stream sets of HDR video and SDR video. In FIG. 51 here, HDR video, HDR subtitles, HDR menus, SDR video, SDR subtitles, SDR menus, and audio and the like are contained in the system stream that the YYY.VOBI indicates. In such a case, elementary streams to be played along with the HDR video (HDR video, HDR subtitles, HDR menus, and audio) are registered in Attribute ( ). The content of description of this Attribute( ) may be the same as the content of description of Combi( ) illustrated in FIG. 49. On the other hand, elementary streams to be played along with the SDR video (SDR video, SDR subtitles, SDR menus, and audio) are registered in AttributeExt( ). The content of description of this AttributeExt( ) is the same format as Attribute( ).

The elementary streams registered in Attribute( ) and AttributeExt( ) are each stored in a single corresponding system stream. Note that just menu streams may be formed as a separate system stream.

In this way, the disc according to the present embodiment has recorded therein a VOB stream file including SDR video expressed by a first dynamic range, HDR video expressed by the luminance of a second dynamic range that is broader than the first dynamic range, and a playlist file (xxx.PL( )) for controlling playback of the VOB stream file. Described in the playlist file are Combi( ) and CombiExt_for_Cell( ), each representing combinations of elementary streams that can be played at the same time in the same Cell. CombiExt_for_Cell( ) lists elementary streams that can be played at the same time with SDR video in that Cell, and Combi( ) lists elementary streams that can be played at the same time with HDR video in that Cell. In the present embodiment, the number of elementary streams of a predetermined type listed in CombiExt_for_Cell( ) and the number of elementary streams of a predetermined type listed in Combi( ) are equal.

Accordingly, the number of elementary streams of the same kind is the same in Combi( ) and CombiExt_for_Cell( ). Thus, when playing SDR video for example, elementary streams of the same type as the elementary streams played at the same time with HDR video can be played at the same time with the SDR video. This means that elementary streams of the same type can be played under an HDR-compatible playback environment and an HDR-incompatible playback environment. As a result, users can be provided with the same viewing experiences other than viewing with regard to luminance, regardless of the playback environment.

Also, of M (where M is an integer of 1 or more) of elementary streams of the predetermined type listed in CombiExt_for_Cell( ), and M of elementary streams of the predetermined type listed in Combi( ), each in the same Cell, the attributes of the same N'th (where N is any integer of one or more but M or less) elementary stream in each is the same.

For example, the elementary streams of the predetermined type are subtitle streams. In this case, the above-described attribute is language of the subtitles. Specifically, the language of the N'th subtitle stream in CombiExt_for_Cell( ) and the language of the N'th subtitle stream in Combi( ) is the same (e.g., Japanese) in the same Cell.

Accordingly, the program can display on the display subtitles of a desired language (e.g., Japanese), without comprehending which of Combi( ) and CombiExt_for_Cell( ) is being played. That is to say, regardless of which of Combi( ) and CombiExt_for_Cell( ) is being played, the program can display subtitles in Japanese, for example, by specifying the N'th subtitle stream.

For example again, the elementary streams of the predetermined type are menu streams. In this case, the above-described attribute is language of the menu. Specifically, the language of the N'th menu stream in CombiExt_for_Cell( ) and the language of the N'th menu stream in Combi( ) is the same (e.g., Japanese) in the same Cell.

Accordingly, the program can display on the display menus of a desired language (e.g., Japanese), without comprehending which of Combi( ) and CombiExt_for_Cell( ) is being played. That is to say, regardless of which of Combi( ) and CombiExt_for_Cell( ) is being played, the program can display menus in Japanese, for example, by specifying the N'th menu stream.

Also for example, the elementary streams of the predetermined type are audio streams. In this case, the above-described attributes are encoding format of the audio, number of channels of the audio, sampling frequency of the audio, and language of the audio. That is to say, the encoding format and number of channels and so forth of the N'th audio stream in CombiExt_for_Cell( ) and the encoding format and number of channels and so forth of the N'th audio stream in Combi( ) are the same in the same Cell.

Accordingly, the program can play audio of the desired encoding format and number of channels and so forth, without comprehending which of Combi( ) and CombiExt_for_Cell( ) is being played. That is to say, regardless of which of Combi( ) and CombiExt_for_Cell( ) is being played, the program can play audio of the desired encoding format and number of channels and so forth, by specifying the N'th audio stream.

Also, the playback device according to the present embodiment reads out and plays streams from the above-described disc. In a case of playing SDR video, the playback device reads out one of the elementary streams listed in the CombiExt_for_Cell( ) of the playlist file, and plays at the same time of the SDR video. Further, in a case of playing HDR video, the playback device reads out one of the elementary streams listed in the CombiExt_for_Cell( ) of the playlist file, and plays at the same time of the HDR video.

Accordingly, when playing SDR video for example, the playback device can play elementary streams as the same type of the elementary streams being played at the same time as the HDR video, at the same time as this SDR video. As a result, users can be provided with the same viewing experiences as a case where HDR video is played, other than viewing with regard to luminance, regardless of the playback environment, and accordingly user confusion can be reduced.

Also, the playback device plays elementary streams of a predetermined type and of the same attribute in both a case where SDR video is played and a case where HDR video is played, by specifying the N'th. Accordingly, users can be provided with the same viewing experiences other than viewing with regard to luminance, both a case where SDR video is played and a case where HDR video is played.

It should be noted that the above description is only an example, and that one skilled in the art would be able to make various applications.

In the above embodiments, the components may be realized by a dedicated hardware configuration, or by executing a software program suitable for the components. The components may be realized by a program executing unit such as a CPU or like processor reading out and executing a software program recorded in a recording medium such as a hard disk or semiconductor memory or the like.

Although the recording medium, playback method, and playback device according to one or multiple forms has been described by way of embodiments, the present disclosure is not restricted to these embodiments. Embodiments of various modifications conceivable by one skilled in the art, and forms configured by combining components in different embodiments, may be included in the scope of the present disclosure without departing from the essence of the present disclosure. For example, the present disclosure may be realized as a recording medium manufacturing method (data recording method) or a recording medium manufacturing device (data recording device) as described above.

The present disclosure is applicable to an optical disc in which are recorded both a standard-luminance range video stream and a high-luminance range video stream, of which playback control of video streams is easy. The present disclosure is also applicable as a playback device that reads out and plays video streams from such an optical disc.

What is claimed is:

1. A playback method of reading out and playing streams from a recording medium, in which are recorded
   a stream file including a first luminance video expressed by luminance of a first dynamic range, and a second luminance video expressed by luminance of a second dynamic range that is broader than the first dynamic range, and
   a playlist file for controlling playback of the stream file, first and second combination information, representing combinations of elementary streams that each can be played at the same time in a same playback section, being described in the playlist file,
   elementary streams that can be played at the same time with the first luminance video in this playback section being all listed in the first combination information, and
   elementary streams that can be played at the same time with the second luminance video in this playback section being all listed in the second combination information,
   wherein all of the elementary streams that can be played at the same time with the first luminance video listed in the first combination information and all of the elementary streams that can be played at the same time with the second luminance video listed in the second combination information are included in the stream files including the first luminance video and the second luminance video,
   the playback method comprising:
      in a case of playing the first luminance video, reading out any one of the elementary streams listed in the first combination information of the playlist file, and playing at the same time with the first luminance video; and
      in a case of playing the second luminance video, reading out any one of the elementary streams listed in the second combination information of the playlist file, and playing at the same time with the second luminance video.

2. A playback device that reads out and plays streams from a recording medium, in which are recorded
   a stream file including a first luminance video expressed by luminance of a first dynamic range, and a second luminance video expressed by luminance of a second dynamic range that is broader than the first dynamic range, and
   a playlist file for controlling playback of the stream file, first and second combination information, representing combinations of elementary streams that each can be played at the same time in a same playback section, being described in the playlist file,
   elementary streams that can be played at the same time with the first luminance video in this playback section being all listed in the first combination information, and
   elementary streams that can be played at the same time with the second luminance video in this playback section being all listed in the second combination information,
   wherein all of the elementary streams that can be played at the same time with the first luminance video listed in the first combination information, and all of the elementary streams that can be played at the same time with the second luminance video listed in the second combination information are included in the stream files including the first luminance video and the second luminance video,
   the playback device comprising:
   a management information processing unit that
      in a case of playing the first luminance video, reads out any one of the elementary streams listed in the first combination information of the playlist file, and plays at the same time with the first luminance video; and
      in a case of playing the second luminance video, reads out any one of the elementary streams listed in the second combination information of the playlist file, and plays at the same time with the second luminance video.

* * * * *

UNITED STATES PATENT AND TRADEMARK OFFICE
CERTIFICATE OF CORRECTION

PATENT NO. : 10,770,115 B2  
APPLICATION NO. : 16/714132  
DATED : September 8, 2020  
INVENTOR(S) : Hiroshi Yahata et al.

Page 1 of 1

It is certified that error appears in the above-identified patent and that said Letters Patent is hereby corrected as shown below:

On the Title Page

Item (57)/Abstract (Line 2), please change "file." to -- file, --.

Signed and Sealed this  
First Day of December, 2020

Andrei Iancu  
*Director of the United States Patent and Trademark Office*